PROCESSOR FOR CODED DATA

Filed Dec. 18, 1963 15 Sheets-Sheet 1

INVENTORS
JOHN L. CRAFT
WARREN B. STROHM
BY Ronald J. Kransdorf
AGENT

PROCESSOR FOR CODED DATA

April 4, 1967

J. L. CRAFT ET AL 3,312,946

PROCESSOR FOR CODED DATA

Filed Dec. 18, 1963

15 Sheets-Sheet 8

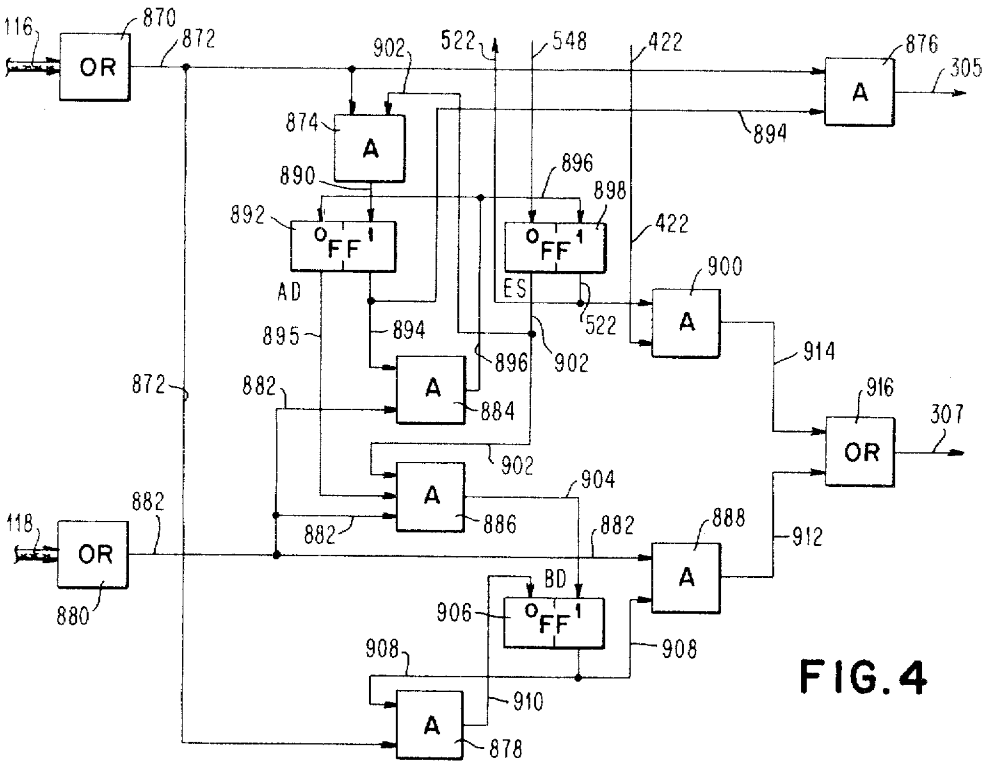

FIG. 4

IS WORD END OF SENTENCE?

(1) $\alpha_1 \alpha_2 \rho_1 \alpha_1 * \nu \nu Pt \tau \xi_A \mu \rho_2 \alpha_1 \alpha_2$ (2) $\alpha_1 \alpha_2 \rho_1 \alpha_1 \tau \gamma \xi_A \mu \rho_1 \alpha_1 \alpha_2$

IS WORD VERB OR BEGINING OF SENTENCE?

(3) $\alpha_1 \alpha_2 \rho_2 \alpha_1 * \nu \nu V \tau \xi_M \xi_A \delta_M \gamma \xi_M \mu \rho_3 \alpha_1 \alpha_2$ (4) $\alpha_1 \alpha_2 \rho_2 \alpha_1 Pt \tau (\text{INSTRUCTION}) \mu \rho_N \alpha_1 \alpha_2$ (5) $\alpha_1 \alpha_2 \rho_2 \alpha_1 \tau \xi_A \mu \rho_2 \alpha_1 \alpha_2$

3RD LOOP (PARTIAL)

(6) $\alpha_1 \alpha_2 \rho_3 \alpha_1 * \nu \nu C_V \tau \delta\rho 4M \delta_M \xi_A \delta\rho 3M \mu \rho_2 \alpha_1 \alpha_2$ (7) $\alpha_1 \alpha_2 \rho_3 \alpha_1 * \nu \nu C_S \tau \delta_M \xi_A \mu \rho_4 \alpha_1 \alpha_2$ (8) $\alpha_1 \alpha_2 \rho_3 \alpha_1 \tau \gamma \xi_A \mu \rho_3 \alpha_1 \alpha_2$

FIG. 6

April 4, 1967 J. L. CRAFT ETAL 3,312,946

PROCESSOR FOR CODED DATA

Filed Dec. 18, 1963 15 Sheets-Sheet 15

United States Patent Office 3,312,946

Patented Apr. 4, 1967

3,312,946
PROCESSOR FOR CODED DATA

John L. Craft, Beacon, and Warren B. Strohm, Wappinger Falls, N.Y., assignors to International Business Machines Corporation, New York, N.Y., a corporation of New York Filed Dec. 18, 1963, Ser. No. 331,553
24 Claims. (Cl. 340—172.5)

INDEX

| | Col. |
|---|---|
| Introduction | 5 |
| Generation of length tags | 5 |
| Circuit description | 5 |
| Operation | 6 |
| General description | 7 |
| General operation | 13 |
| Introduction | 13 |
| Specific example | 13 |
| Is word end of sentence | 14 |
| Is word a verb which takes a complement | 20 |
| Is word a verbal complement | 23 |
| Detailed circuit description | 25 |
| Scan control circuit | 38 |
| Detailed operation | 38 |
| Is word end of sentence | 38 |
| Is word a verb which takes a complement | 51 |
| Is word a verbal complement | 55 |
| Matching on subordinate conjunction | 58 |
| Part of speech problem | 58 |
| Use of the $\delta_N$ instruction | 59 |
| Final readout operation | 59 |

This invention relates to a device for manipulating and processing coded data units and more particularly to a device which is particularly adapted to manipulate and process non-numeric data.

There are numerous situations where it is desired to convert units of data from one coded form to another or to, in some other way, operate upon units of coded data as for example, to edit, collate, or extract information from the coded sequence. While non-numeric data processing problems of the type described above may arise in many fields, as for example in cryptography, they occur most frequently when dealing with language data.

In the field of language processing, efforts are being made to increase and improve the capacity of machines to perform the numerous operations previously performed only by specialized personnel. While the term "language processing" covers a multitude of functions as for example the machine abstracting of articles, and the machine editing of text, by far the most needed and the most investigated aspect of language processing is language translation.

It is well known that scientific, technical, and cultural knowledge is recorded in a multitude of languages. This state of affairs leads to very costly duplication of efforts in science and technology, to a lack of understanding in cultural matters, and often to a dangerous lack of communication and understanding among nations. The almost infinitesimal number of documents which are translated from, for example, Russian or Chinese into English at the present time results from the high cost of human translation and from the fact that qualified technical translators are difficult to obtain.

Initial efforts at automatic translation involved the storing of a dictionary and the provision of circuitry for comparing an input word with a dictionary entry and for recording the corresponding function entry when a match was had. The result was a word-for-word translation which proved highly unsatisfactory for a number of reasons. One reason why a word-for-word translation is unsatisfactory is that many words, as for example the words lie and tie in the English language, have more than one meaning and it is impossible without looking at the context in which the word is used to determine just what its meaning is. Secondly, the order in which words appear varies with different languages. For example, in English, an adjective generally precedes a noun, whereas in French, the adjective generally follows the noun. A third reason why such translations are unsatisfactory is that some words or parts of speech which appear in one language are not used at all in another. For example, the articles "a," "an," and "the" which are so much a part of the English language, do not appear at all in the Russian language. While a translation not containing these articles would be understandable to the reader, their absence is disturbing and a better and smoother translation is obtained if they are included. Another problem arises where two words have substantially the same meaning but a completely different connotation as for example, the words "resting" and "loafing." It is quite conceivable that in the translation of a political document, the use of a word having the proper meaning but the wrong connotation could lead to an international incident. Finally, there is the problem of idioms. Each language has its own idioms which, if literally translated, would either be meaningless or would give a completely erroneous impression as to what the writer or speaker intended to say.

Efforts to solve the above problems have heretofore been only moderately successful, and then only on a limited text sample. The complete solution of the above problems involves a three-step operation including lexical recognition, syntactic analysis, and semantic analysis. These steps are by no means independent, but to some extent they can be performed sequentially.

Of the three steps, lexical recognition is generally performed first. This is basically a dictionary look-up which, for a given input word, indicates all the possible words in a target language which it could mean. This step may also be used to supply certain additional information as for example, what part of speech the various possible meanings are and this step could also be used to solve the idiom problem by including all known idioms in the dictionary. Syntactic analysis of inflectional endings and word order can then be employed to determine the part of speech that a particular word is being used as and also such information as its case, number, and gender. This will often be sufficient to resolve word ambiguities and generally is sufficient for a problem such as word orientation. Finally, a semantic analysis is made of the word and the words around it to resolve any remaining word ambiguities and to solve such problems as connotation. For example, if the object of a sentence was the word "blue," semantic analysis would determine from the use of either a personal or an impersonal subject, whether the word was being used to indicate a depressed state of mind or a color.

Circuitry for performing the lexical recognition function is shown in copending application Serial No. 248,379 filed December 31, 1962 on behalf of W. Strohm and J. Craft, entitled Analytic Bounds Detector and assigned to the assignee of the instant application. That circuit is also capable of determining sentence boundaries. That circuit is not however, capable of performing either syntactic or semantic analysis. That circuit when used alone can therefore give a mere word-for-word translation.

It is, therefore, an object of this invention to provide an improved circuit for processing coded data units.

Another object of this invention is to provide a circuit for converting units of information from one form of coded notation to another form of coded notation.

A more specific object of this invention is to provide an improved language processor.

A further object of this invention is to provide a circuit for performing syntactic analysis on language data.

A still further object of this invention is to provide a circuit for performing sematic analysis on language data.

Another object of this invention is to provide a general purpose language translator which is capable of resolving word ambiguities.

Still another object of this invention is to provide a language translator which is capable of reordering words so as to provide a smooth-reading output.

A still further object of this invention is to provide a language translator which is capable of inserting or deleting particular words where required.

Still another object of this invention is to provide a language translator which is capable of selecting from possible words having the same meaning, the one having the proper connotation.

A more specific object of this invention is to provide a language translator, of the type described above which solves the above problems by use of semantic and syntactic analysis.

One manner of performing semantic or syntactic analysis is to form linkage between adjacent words. This is accomplished by looking at a given word and at the words preceding and following it and of in some way modifying these words when a desired linkage is found. For example, if linkages between nouns and adjectives were being sought, and a word which could be either a noun or a verb was found to be proceeded by an adjective, a bit would be placed in a particular position in the first word to indicate that it was probably a noun and a bit might also be placed in the adjective to indicate that it had been linked to a noun. If for example, the translation were being made from English to French, the bit placed in the adjective word might also be used subsequently to indicate that this word should be placed after the word following it.

It can be seen that to perform the linkages described above, it is necessary to jump back and forth in the sentence, skipping over words or parts of words in the process. Therefore, to effectively perform semantic or syntactic analysis on stored language data, it is necessary to have a circuit which is capable of jumping into a sentence at any desired point and of scanning words either to the right or left of this point in search of a word having a desired characteristic. To perform these operations quickly and efficiently, the circuit must be capable of skipping over words or parts of words where desired and of masking out undesired data. The circuit must at all times know at what point in the sentence it is and be capable of getting back to desired points in the sentence immediately.

The above requirements are complicated by the inherent variable length of language data units, requiring variable length entries to be used to make full, efficient use of available storage.

It is therefore an object of this invention to provide a circuit which is capable of scanning stored data, starting at any given point in the stored data and proceeding either to the right or left with the scan.

Another object of this invention is to provide a circuit of the type described above, which is capable of skipping over all or parts of given data units during a scan operation.

A further object of this invention is to provide a circuit of the type described above which is capable of masking out undesired data.

A still further object of this invention is to provide a circuit capable of performing the above manipulations on variable length data units.

Another object of this invention is to provide a circuit which is capable of performing the above functions rapidly while using a minimum amount of equipment.

In accordance with these objects, this invention provides first of all, a device for manipulating coded variable-length units of data. This device includes a circuit for applying length tags to the coded data units. There are generally two length tags associated with each data unit, one indicating the number of characters between itself and the beginning of the next information unit and the other indicating the number of characters between itself and the beginning of the preceding information unit. These length tags are generated before the word is stored and are stored with the words. The length tags are generated by counting the number of characters in the word as it is applied to a register or delay and inserting the contents of the appropriate counter at the beginning and end of the word.

The device also includes an addressable store in which the coded data units, including the length tags, are stored. A register is also provided which records the address in this store of the data which is to be processed at a given time. When the coded-data processing device wants a new unit of data applied to it, it generates an instruction which causes a high speed adder to calculate the address in the addressable store of the beginning of the desired data unit by use of the existing address knowledge and of the length tags. Other instructions from the processor may cause the register to be incremented or decremented by discrete amounts causing intervening data to be masked over.

The processor includes a large capacity storage element in which a table of entries having arguments and functions is stored. The arguments are of a form to match either in whole or in part coded data units stored in the addressable store. The arguments and functions of the entries may include instruction characters. The data contained at the address in the addressable store indicated by the register is applied as one input to a comparator, the other input of which is supplied by the table storage device. When a match is detected between the whole or part of the data unit and the argument of a table entry, thus indicating that the matched-on data unit has a particular characteristic, the instruction characters in the matched-on table entry cause the address of a new data unit to be applied to the register and may also cause part of the entry function to be applied to particular addresses in the addressable store to modify the data units stored therein. A mismatch signal from the comparator causes a new table entry argument to be applied to the comparator. Details of the above basic operations and of others will be described later.

The foregoing and other objects, features and advantages of the invention will be apparent from the following more particular description of a preferred embodiment of the invention, as illustrated in the accompanying drawings.

In the drawings:

FIG. 1 indicates the arrangement of FIGS. 1*a*–1*b* to form a general schematic diagram showing major elements in a preferred embodiment of the invention.

FIGS. 1*a*–1*b* when taken together form a general schematic diagram showing the major elements of a preferred embodiment of the invention.

FIG. 2 is a schematic diagram of a circuit for generating length tags.

FIG. 3 indicates the arrangement of FIGS. 3*a*–3*i* to form a composite detailed schematic of the circuit which is a preferred embodiment of this invention.

FIGS. 3*a*–3*i* when taken together form a composite detailed schematic of the circuit which is a preferred embodiment of this invention.

FIG. 4 is a block diagram of a scan control circuit suitable for use with the circuit shown in FIGS. 1*b* and 3*h*.

FIG. 6 is a set of instructions for performing the first few operations indicated in the flow of diagram of FIG. 5.

INTRODUCTION

Figures 1, 1A:
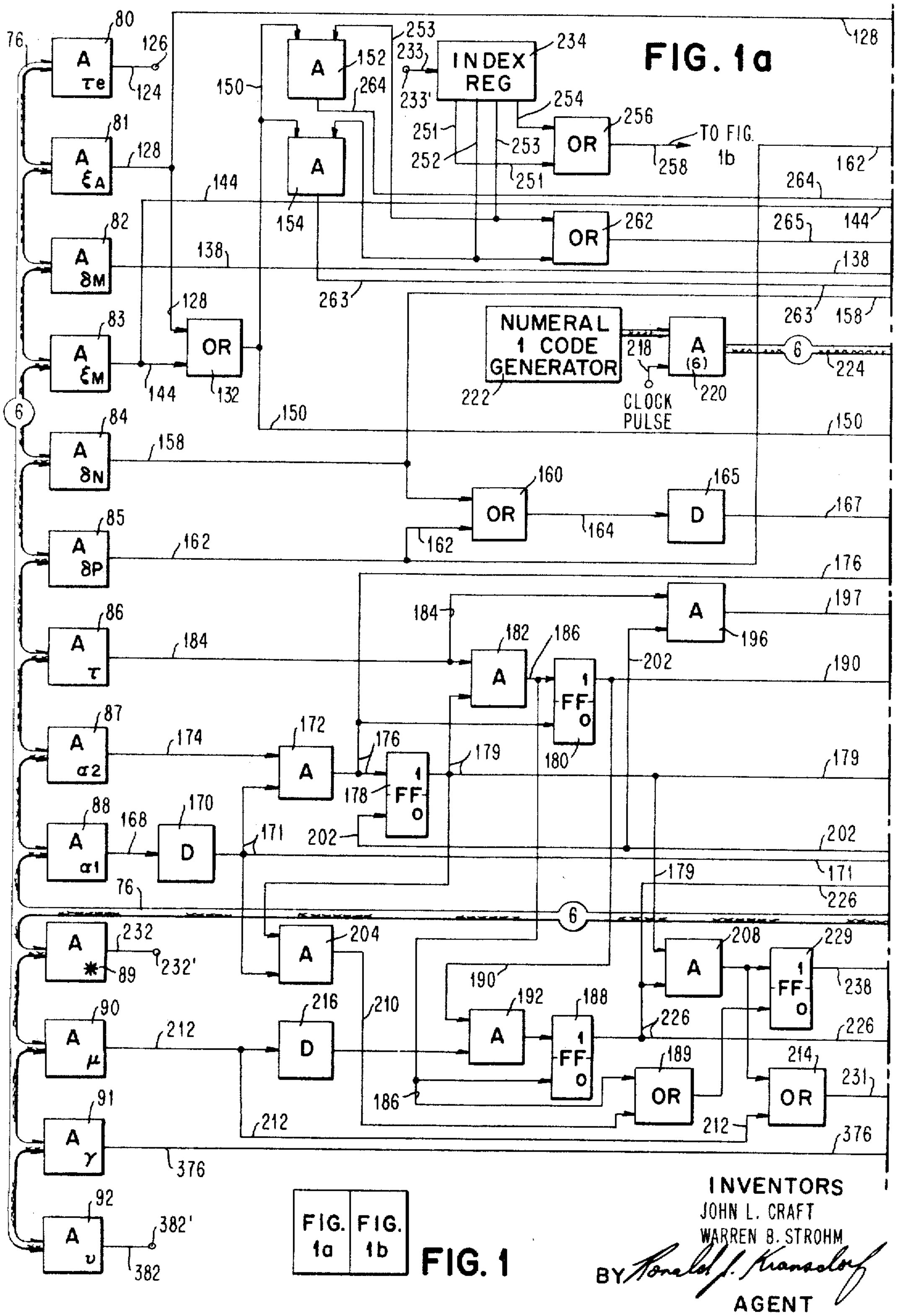
Figure 1B:
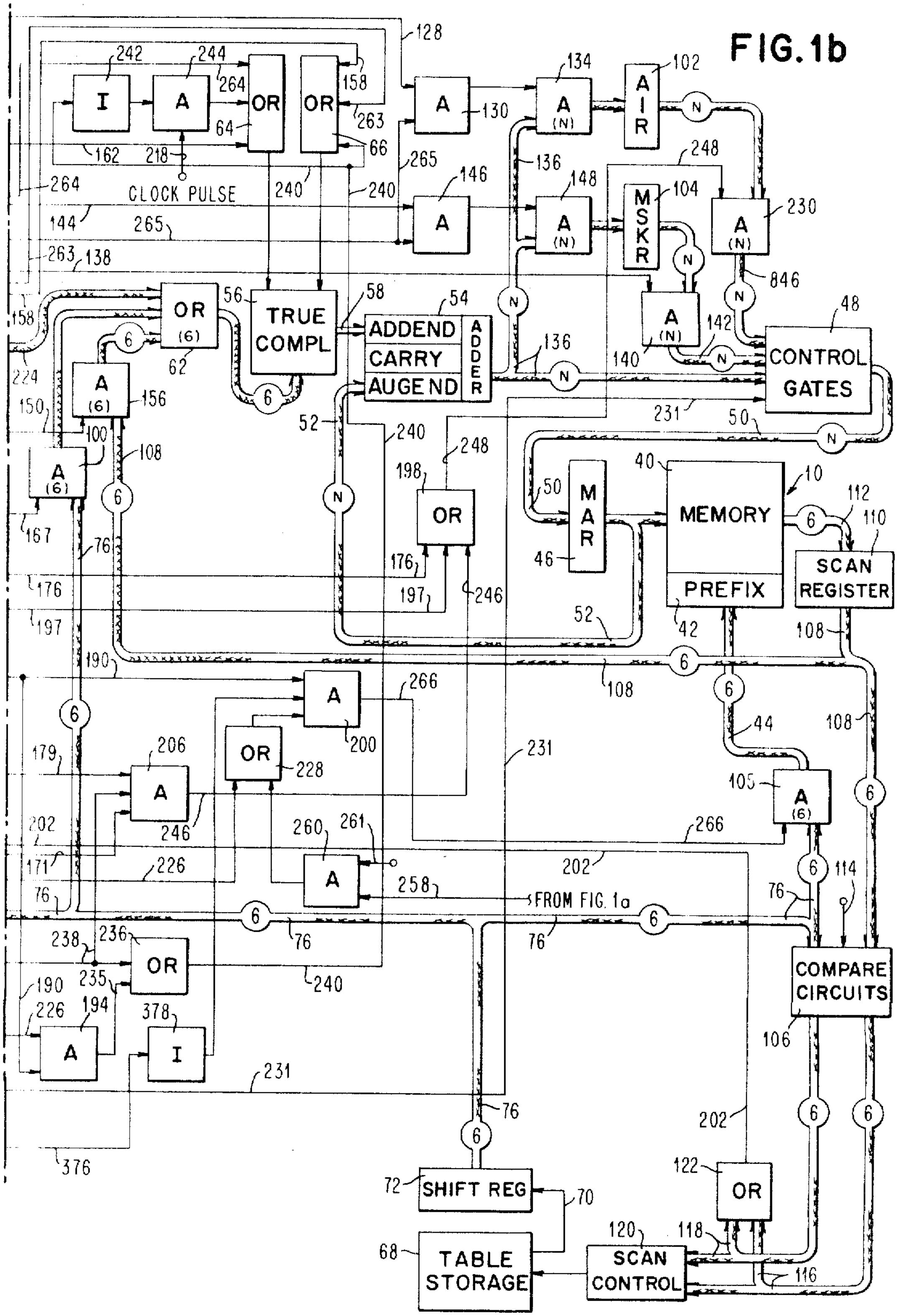

FIGS. 1*a*–1*b* show the major elements of a language processor in accordance with this invention and the general relationship of these elements to each other. While the circuit of these figures is by no means complete, it is felt that reference to them will give a general familiarity with the principles of the invention. Additional elements and the details of the interconnections are shown in FIGS. 3*a*–3*i*.

Referring to FIG. 1*b*, the language data to be processed is initially in an addressable memory 10. In the following discussion, it will be assumed that memory 10 is a magnetic core matrix memory array. The information initially stored in this memory is in the following form -- *$L_bL_f$S*bbb*---*gg*--- *$L_bL_f$S*bbb*--*gg*-- *$L_bL_f$S*bbb*--*gg*-- *$L_bL_f$-- where

"*" signifies the beginning and the end of a word,

"$L_b$" is a backward length tag,

"$L_f$" is a forward length tag,

"S" is a code character signifying the part of speech of the word,

"*bbb*--" are blanks which are left in the word to be filled in during the processing operation, there being one blank for each processing operation which is to be performed on a word of that type (of that part of speech), and "*ggg*---" are bytes representing additional information as to the word as for example, its translated meaning or possbile translated meanings.

Each of the characters above represents a byte which is made up of six binary bits. For the purpose of the present discussion, it will be assumed that the information in memory 10 was derived by a lexical recognition process of the type indicated in the beforementioned copending application Serial No. 248,379, memory 10, being the process store of that application. However, while this assumption is convenient for present purposes, it is in no way to be considered a limitation on the possible ways in which information may be applied to memory 10.

Of the characters in the above word, the only ones which it is felt need further explanation are the forward and backward length tags $L_b$ and $L_f$. Following the asterisk (*) in each word in the store is a backward length tag $L_b$. This byte is a number which represents the number of characters between this length tag and the asterisk (*) starting the preceding word. For example, considering the S, the *b*'s and the *g*'s all as characters, assume that the preceding word has a total of seven characters. $L_b$ would then be eleven, seven characters plus two asterisks, plus two length tags. In other words, if eleven were to be subtracted from the address of the backward length tag, the address of the asterisk of the preceding word would be obtained. Similarly, the forward length tag of a word is a byte representing the number which must be added to the address of the forward length tag to obtain the address of the asterisk starting the next succeeding word. If, for example, the word containing the forward length tag has seven characters, the forward length tag is eight. This represents the seven characters plus the asterisk. It can again be seen that if eight is added to the address of this forward length tag, the address of the asterisk for the next succeeding word is obtained.

GENERATION OF LENGTH TAGS

*Circuit description:*

Figure 2:
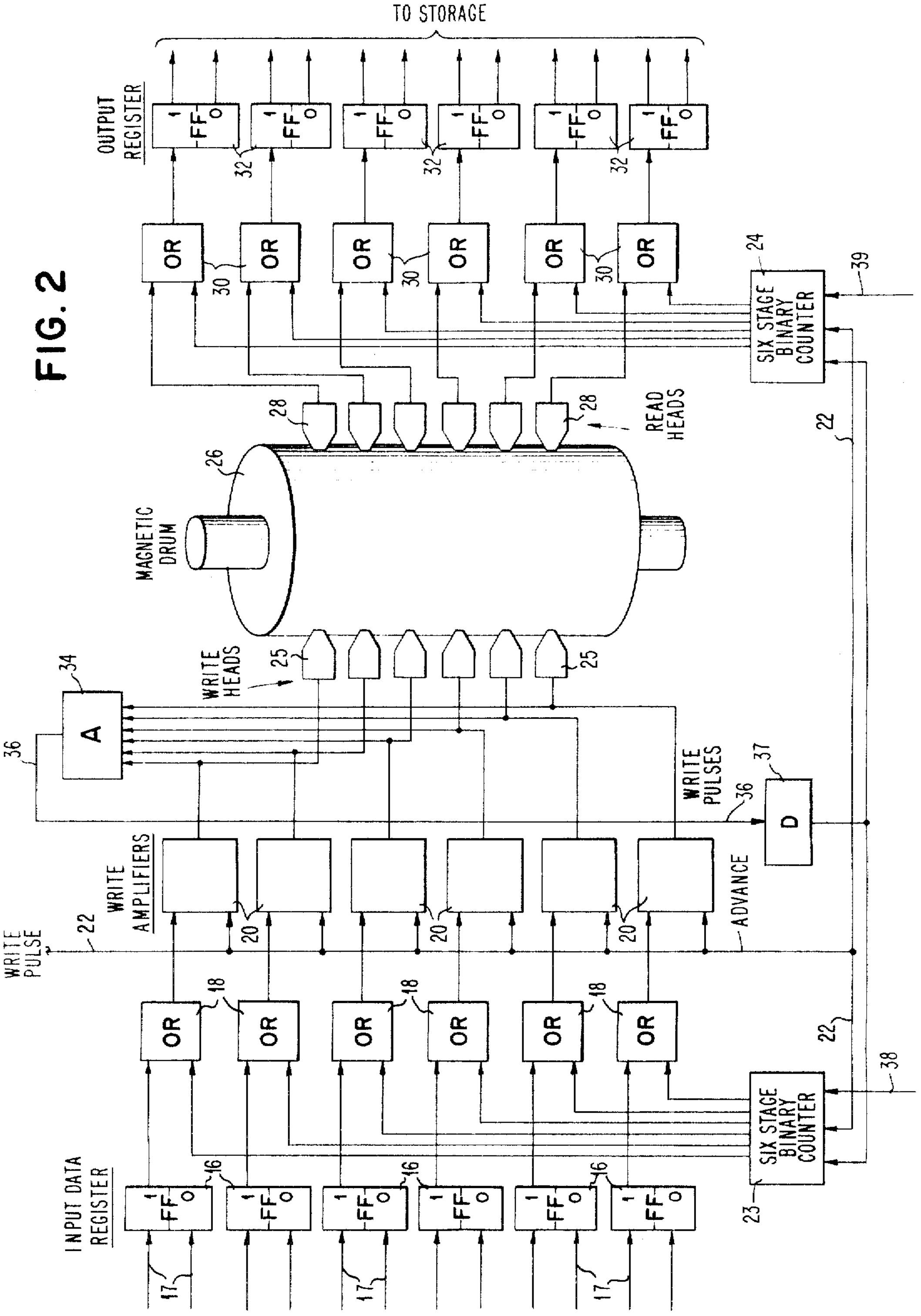

FIG. 2 shows a simple circuit for generating these length tags. To appreciate how the circuit of FIG. 2 operates, it is necessary to consider briefly how information is applied to memory 10. This information when applied to the memory is in the following form:

$L_f$ C1 C2 C3 C4 C5 C6 C7 *$L_b$ where C1–CN represent characters of the word which may be part of speech characters (S), blanks to be filled in (*b*), or additional information bytes (*g*).

From the preceding section, it was seen that the forward length tag equals the number of characters plus 1 whereas the backward length tag equals the number of characters plus 4. This will always be true regardless of the number of characters in the word. Therefore, in the above example, $L_f$ would be 8 and $L_b$, 11. Once a word has been applied to memory 10, the manner in which the words and length tags are used causes the asterisk and the backward length tag of an input word to be associated with the word following it so that, in memory 10, the words have the form indicated in the introductory section.

*$L_bL_f$ C1 C2 C3 C4 C5 C6 C7 *$L_b$ $L_f$ . . . .

Before length tags are applied to the word, it has the form

C1 C2 C3 C4 C5 C6 C7 *

Referring now to FIG. 2, the circuit consists of an input data register 16 which, since each input byte is made up of six binary bits, has a six flip-flops. Pulse inputs are applied to these flip-flops over lines 17. The outputs from the ONE sides of these flip-flops are applied through a bank of OR gates 18 to condition six write amplifiers 20. A write pulse applied to line 22 is applied to each of the write amplifiers causing such of them as are conditioned to generate output signals and is also applied to the stepping inputs of six-stage binary counters 23 and 24. The outputs from write amplifiers 20 are applied to write heads 25. Write heads 25 record on the surface of rotating magnetic drum 26. Read heads 28 are spaced a predetermined distance from write heads 25 on the surface of drum 26. A bank of erase heads (not shown) are positioned between read heads 28 and write heads 25.

The outputs from read heads 28 are applied through a bank of OR gates 30 to output register 32. Like input register 16, output register 32 consists of six flip-flops. Information is retained in output register 32 until new information is supplied to it. The information in it is then transferred to a dictionary storage device.

The output signals from write amplifiers 20 are also applied to AND gate 34. This AND gate generates an output signal only when the combination of bits representing an asterisk is being applied to write heads 25. The output from AND gate 34 is applied through line 36 and one unit delay 37 to cause the count in counter 23 to be applied through OR gates 18 to write amplifiers 20 at the same time that the next write pulse is applied to line 22 and to cause the count in counter 24 to be applied through OR gates 30 to output register 32. As the first character is appjlied to input register 16, a signal is applied to line 38 to set counter 23 to a count of three and to line 39 to set counter 24 to a count of zero.

OPERATION

To illustrate the operation of the circuit shown in FIG. 2, assume that a seven-character word followed by an asterisk is serially applied to input register 16, signals being applied to lines 38 and 39 to set counters 23 and 24 to a count of three and zero, respectively, as the first character is applied to register 16. Each character applied to register 16 is applied through OR gates 18 to condition selected ones of write amplifiers 20. When a write pulse is applied to line 22, the character stored in register 16 is recorded on drum 26 by write heads 25 and both counters 23 and 24 are advanced. Therefore, as characters C1–C7 are applied to drum 26, counter 23 is incremented from its initial count of three to a count of ten while counter 24 is incremented from its initial count of zero to a count of seven. The asterisk is then applied through OR gates 18 to write amplifiers 20. The next write pulse on line 22, in addition to causing the asterisk to be recorded by write heads 25 on the surface of drum 26, and to incrementing counter 23 to a count of eleven and counter 24 to a count of eight also causes AND gate 34 to be fully conditioned. The resulting output signal on line 36 is delayed one time unit in delay 37 and then applied to counter 23 to cause its existing contents, eleven, to be applied through OR gates 18 to write amplifiers 20 coincident with the application of the next write pulse to line 22. The count in counter 23, which it can be seen is the proper count for the backward length tag in this instance, is therefore stored on drum 26 by write heads 25 at this time. This character is recorded just after the asterisk which is the proper position for the backward length tag. The signal out of delay 37 also causes the contents of counter 24, eight at this time, to be applied through OR gates 30 to output register 32. It can be seen that this is the proper count for the forward length tag. This count remains in output register 32 until character C1 is read by read heads 28 at which time is transferred to the dictionary storage device ahead of the character C1 which is in its proper position.

When a new word is applied to lines 17, signals are again applied to lines 38 and 39 to properly set counters 23 and 24, to start generating a new backward and forward length tag respectively.

GENERAL DESCRIPTION

Referring back to FIG. 1*b*, memory 10 has two regions, an input region 40 and a prefix region 42. The significance of these two regions will be apparent later. Data is applied to memory 10 a byte at a time over lines 44. The address in memory 40 to which information is to be applied or from which it is to be read out is controlled by memory address register (MAR) 46. Address information is applied to MAR through control gates 48 and lines 50. The number of lines 50 leading into MAR and the number of lines 52 leading out of MAR will vary with the size of memory 10.

The address in MAR 46 is also applied through lines 52 to the augend input of adder 54. The augend input to adder 54 is applied by true-complement circuit 56 through lines 58. The carry input to adder 54 is internally derived. OR gates 62 apply the other quantity to be either added or subtracted from the address in MAR to true-complement circuit 56. There are six OR gates 62, one for each of the six lines in the cables applied to them. Where, as with OR gates 62, a single box is used in FIGS. 1*a*–1*b* to represent a bank of gates, a numeral is inserted in the box to indicate the number of gates in the bank. OR gate 64 applies the other input to true-complement circuit 56 if the quantity applied by OR gate 62 is to be added to the address in MAR and OR gate 66 applies the other input to the true-complement circuit if this quantity is to be subtracted from the address in MAR.

Memory 10 and adder 54 are two of the major elements of this device. A third major element of this device is table storage 68 (FIG. 1*b*). For the purposes of this description, table storage 68 will be considered to be a photographic disc having entries stored on it in concentric rings. Each entry is of the following form:

$$\alpha_1\alpha_2\rho_x\alpha_1A_1A_2 \; . \; . \; . \; A_n\tau F_1F_2 \; . \; . \; . \; . \; F_n\mu\rho_y\alpha_1\alpha_2$$

where:

$\rho_x$ is a prefix character indicating what operation is now being performed;

$A_1A_2 \; . \; . \; A_n$ are argument characters which may be instruction characters but which generally are characters to be matched with characters stored in memory 10;

$\tau$ is a special character indicating the end of the argument region of the entry and the beginning of the function region;

$F_1, F_2 \; . \; . \; F_n$ are function characters which may either be instruction characters to be described later or may be characters to be read into memory 10 to alter the contents thereof;

$\mu$ is a special character indicating the end of function characters and the beginning of prefix characters;

$\rho_y$ is a prefix character indicating the next operation to be performed; and $\alpha_1\alpha_2$ is a two-byte special character which signifies the end of one table entry and the beginning of another. The code for $\alpha_1\alpha_2$ is chosen to be unique so that no other 12-bit sequence forming either the whole of two character or parts of three other characters will conform to this code configuration. The reason for this will be apparent later. The functions of the above characters will be apparent from later discussion in which they will be gone into in much greater detail.

The entries in table storage 68 are read out a bit at a time by a read head (not shown) positioned over a selected track and are applied by this read head through line 70 to six-bit shift register 72.

The contents of register 72 are applied through lines 76 to a plurality of detector AND gates 80–92 (FIG. 1*a*) and through AND gates 100 (FIG. 1*b*) to OR gates 62. The special characters detected by AND gates 80–92, respectively, and the functions which these characters perform are as follows:

And gate 80 recognizes the special character $\tau_e$. This character when appearing alone in the function of a table entry means that the bytes to follow are the translated word and are to be stored in an output register (not shown). The $\tau_e$ follows immediately after a $\tau$, this means that the translated word which is read out following it is the last word of a sentence and that processing is to cease after this word has been read out.

AND gate 81 recognizes the special character $\epsilon_A$. The character $\epsilon_A$ is a compute instruction which causes the address of the beginning of a new word to be computed in adder 54 in a manner to be described later and causes this new address to be stored in an argument index register (AIR) 102 (FIG. 1*b*).

AND gate 82 recognizes the special character $\delta_M$. This is a transfer instruction which causes the contents of a mask register (MSKR) 104 (FIG. 1*b*) to be transferred to MAR 46.

AND gate 83 recognizes the special character $\epsilon_M$. The character $\epsilon_M$ is a compute instruction similar to $\epsilon_A$, the the only difference being that with $\epsilon_M$, the results of the computation are transferred to mask register 104.

AND gate 84 recognizes the special character $\delta_N$. The special character $\delta_N$ is always followed by a byte coded to represent a number. $\delta_N$ causes this number to be subtracted from the address stored in MAR in adder 54 and the results of this computation to be transferred back into MAR.

AND gate 85 recognizes the special character $\delta_P$. The character $\delta_P$ is also always followed by a number. The $\delta_P$ instruction causes this number to be added to the contents of MAR and the results of this computation to be transferred back into MAR.

AND gate 86 recognizes the special character $\tau$. As previously indicated $\tau$ indicates the end of the argument portion of a table entry and the beginning of the function portion.

AND gate 87 recognizes the special character $\alpha_2$ and AND gate 88 the special character $\alpha_1$. As indicated previously, the sequential occurrence of the characters $\alpha_1\alpha_2$ indicates the end of one table entry and the beginning of another. The character $\alpha_1$ alone also has some functions which will be described later.

AND gate 89 recognizes the asterisk (*). This is the character in memory 10 which indicates the end of one stored word and the beginning of another. There are some situations where an asterisk will also appear in a table entry, these situations generally being when a match is sought on an asterisk (*) in memory 10.

AND gate 90 recognizes the special character $\mu$. As indicated previously, this character indicates the end of function data and the beginning of prefix data in the function of a table entry.

AND gate 91 recognizes the special character $\gamma$. This is a copy-not instruction which, when it appears in the function of a table entry, inhibits the copying of the character stored in register 72 (FIG. 1*b*) into memory 10.

AND gate 92 recognizes the special character $\nu$. This is a universal character which matches on any character stored in memory 10 during a compare operation.

The above are the primary special characters employed in the system. There is one additional special character which is detected and used in the more detailed circuit diagram shown in FIGS. 3*a*–3*i*.

Referring back to FIG. 1*b*, the lines 76 out of shift register 72 are also applied as the information input to AND gates 105 and as one input to compare circuits 106. Output lines 44 from AND gates 105 are the information input to memory 10. The other information input to compare circuits 106 is output lines 108 from scan register 110. At any given time, scan register 110 contains the information stored at the address in memory 10 indicated by MAR 46. Information is applied to scan register 110 over lines 112. The compare operation is performed in compare circuits 106 only when there is a signal on line 114. The details of how this signal is derived will be described with reference to FIGS. 3*a*–3*i*. For present purposes, it is sufficient to say that this signal appears when argument data is being applied to shift register 72 by table storage 68 and neither a $\delta_P$, a $\delta_N$, a $\tau$ or a $\nu$ has been detected.

When a compare operation is performed in compare circuits 106, if the contents of scan register 110 is greater than the contents of shift register 72, there is a mismatch output signal on one of six lines 116. Similarly, if during a compare operation it is found that the contents of scan register 110 are less than the contents of shift register 72, an output signal appears on one of six lines 118. The signals on lines 116 and 118 are applied to a scan control circuit 120 and are also applied to an OR gate 122.

To understand the operation of scan control circuit 120, it is necessary first to investigate the scan philosophy used with table storage 68. Searching in table storage 68 is done on the principle of longest match. This means that a word like "attendance" would be looked at before words like "attend," "at," or "a," and that idioms like "sight for sore eyes" would be looked at before the initial words "sight." To effectuate this, the general search plan is to start on any one of the concentric tracks of the memory and to compare the first entry on that track which passes the transducer with the input word. If the initial entry scanned is less than the entry stored in register 110, the search is continued on the next higher value track. This jumping to higher value tracks continues until an entry is found the argument of which is greater than the information applied to register 110. The scan then continues on that track until a match is obtained or until the end of the track is reached. If the end of the track is reached, the scan then proceeds on the next lower value track until a match is obtained. If the particular word applied to register 110 is not in table storage 68, a match will utimately be had on what is referred to as a break-point entry. More will be said about break-point entries later.

If the entry argument originally scanned in table storage 68 is greater than the word applied to register 110, the search continues on a lower value track. This dropping to lower valued tracks continues until an entry is found which is less than the word stored in scan register 110. When this occurs, the transducer is moved back to the next higher track and a detailed scan is started in the same manner indicated above.

If at any time prior to the commencement of a detailed scan a matching entry is found, this is interpreted as a less-than entry and the scan proceeds accordingly. The reason for this is that the match might have, for example, been on the entry "at," when the input word is in fact "attend."

With the above search plan in mind, it can be seen that when scan control circuit 120 receives a signal on one of the lines 116, it causes the transducer to advance to a higher valued track. When the scan control circuit receives a signal on one of the lines 118, it causes the transducer to be positioned over the next lower track unless a signal has been received prior to this indicating that the entry on the next lower track is too low. In this case, the scan control circuit causes what will be referred to as an entry search to be initiated on the track which it is then positioned over.

Referring back to the recognizer AND gates 80–90 (FIG. 1*a*), an output signal from AND gate 80 is applied through line 124 and hub 126, to circuitry (not shown) for causing the subsequently appearing target language characters to be applied to the output register and to terminate the processing when the output signal on line 124 follows an output signal from AND gate 86. Detailed circuitry for performing these functions is shown in FIG. 3*a*–3*i* and described later.

An output signal from AND gate 81 is applied through line 128 as one input to AND gate 130 (FIG. 1*b*) and as one input to OR gate 132 (FIG. 1*a*). The other input to AND gate 130 will be described later. The output from this AND gate is applied as the conditioning input to AND gates 134. When AND gates 134 are conditioned, they allow the output from adder 54 on lines 136 to be applied to AIR 102.

The output from AND gate 82 on line 138 is applied as the conditioning input to AND gates 140 (FIG. 1*b*). When AND gates 140 are conditioned, they pass the contents of MSKR 104 through lines 142 to control gates 48. As previously indicated, the output from control gates 48 is applied through lines 50 to MAR 46.

The output from AND gate 83 on line 144 is applied as the other input to OR gate 132 and is also applied as one input to AND gate 146 (FIG. 1*b*). The other input to AND gate 146 will be described later. The output signal from AND gate 146 is applied as the conditioning input to AND gates 148. When AND gates 148 are conditioned, they pass the output from adder 54 on lines 136 through to MSKR 104.

It will be seen that OR gate 132 has an output when either an $\epsilon_A$ or an $\epsilon_M$ instruction appears. This means that OR gate 132 has an output whenever a computation involving a length tag is to be performed. The output from OR gate 132 is applied through line 150 as one input to AND gates 152, 154 and 156. AND gates 152 and 154 will be discussed later. The other input to AND gates 156 are the lines 108 from scan register 110. The outputs from AND gates 156 are applied through OR gates 62 to true-complement circuit 56. The function of the gates 156 is therefore to gate the length tag information applied to scan register 110 from memory 10 through to adder 54 when an $\epsilon_A$ or $\epsilon_M$ computation instruction occurs.

An output signal from AND gate 84 on line 158 is applied as one input to OR gate 160 and as one input to OR gate 66. An output signal on line 162 from AND gate 85 is applied as the other input to OR gate 160 and as one input to OR gate 64. The output from OR gate 160 is applied through line 164, one-byte delay 165, and line 167 as the conditioning input to AND gates 100. Therefore, if AND gate 84 has been fully conditioned, true-complement circuit 56 is set to perform a subtract operation while if AND gate 85 is fully conditioned, true-complement circuit 56 is set to perform an add operation. If either of these AND gates is conditioned, AND gates 100 are conditioned to apply the number following it in shift register 72 to the information input of true-complement circuit 56.

For convenience, the order of considering the outputs from the gates will be reversed here. The output from AND gate 88 on line 168 is applied through a one-byte delay 170 and line 171 to one input of AND gates 172, 204 and 206 (FIG. 1*b*). The other input to AND gate 172 is output line 174 from AND gate 87. This means that AND gate 172 generates an output signal on line 176 when an $\alpha_1$ is followed immediately by an $\alpha_2$, or, in other words, at the beginning and the end of a table entry. The signal on line 176 is applied to the ONE-side input of flip-flop 178, the ZERO-side input of flip-flop 180, and as one input to OR gate 198 (FIG. 1*b*). Output line 179 from the ONE-side of flip-flop 178 is connected as one input to AND gate 182. The other input to this AND gate is output line 184 from AND gate 86. AND gate 182 therefore generates an output signal on line 186 when, at the end of the comparison on a table entry argument, the special character $\tau$ is detected. The signal on line 186 is applied to the ONE-side input of flip-flop 180, to the ZERO-side input of flip-flop 188, and as one input to OR gate 189. An output from the ONE side of flip-flop 180 on line 190 therefore indicates that the function of a table entry is being applied to shift register 72 from table storage 68. Line 190 is connected as one input to AND gates 192, 194, and 200.

Output line 184 from $\tau$-detector AND gate 86 is also connected as one input to AND gate 196. The other input to this AND gate is output line 202 from OR gate 122. A signal on line 202, which is also applied to the ZERO-side input of flip-flop 178, indicates that a mismatch has occurred in compare circuits 106. The output from AND gate 196 is applied through line 197 as a second input to OR gate 198.

In addition to being connected as one input to AND gate 182, output line 179 from the ONE side of flip-flop 178 is also connected as one input to AND gates 204, 206, and 208, and as one of the inputs to line 114 (connection not shown). The other input to AND gate 204 is output line 171 from delay 170. Output line 210 from AND gate 204 is connected as the other input to OR gate 189.

Skipping for a moment detector AND gate 89, output line 212 from $\mu$ detector AND gate 90 is connected as one input to OR gate 214 and through one-byte delay 216 as the other input to AND gate 192. The output from AND gate 192 is connected to the ONE-side input of flip-flop 188. ONE-side output line 226 from flip-flop 188 is connected as one input to OR gate 228 and as the second input to AND gates 208 and 194. The output from AND gate 208 is connected to the ONE-side input of flip-flop 229 and as the second input to OR gate 214. Output line 231 from OR gate 214 is connected to control gates 48. When a signal appears on line 231 control gates 48 cause the last address in prefix region 42 to be applied through line 50 to MAR 46.

Output liine 235 from AND gate 194 is connected as one input to OR gate 236. Output line 238 from the ONE side of flip-flop 229 is connected as the other input to this OR gate and is also connected as the third input to AND gate 206. Output line 240 from OR gate 236 is connected as the second input to OR gate 66 and through inverter 242 as one input to AND gate 244. The other input to AND gate 244 is a clock pulse on line 218. The significance of the clock pulses and the manner in which they are derived will be described with reference to FIGS. 3*a*–3*i*. The output from AND gate 244 is connected as a second input to OR gate 64. The clock pulse on line 218 is also applied as one input to AND gates 220 (FIG. 1*a*). The other input to these AND gates is the output from numeral-one code generator 222. Code generator 222 is merely a bank of triggers which is set to generate the 6-bit code for the numeral one. Output lines 224 from AND gates 220 are connected as the third input to OR gates 62.

Output line 246 from AND gate 206 (FIG. 1*b*) is connected as the third input to OR gate 198. Output line 248 from OR gate 198 is connected as the conditioning input to AND gates 230. When AND gates 230 are conditioned, they pass the contents of AIR 102 through lines 846 to control gates 48.

Referring back to AND gate 89, it is seen that its output line 232 is connected to a hub 232'. The hub 232 forms one of the inputs to hub 233' at the top of FIG. 1*a*. Output line 233 from hub 233' is connected to index register 234 to set this register to a desired value. Index register 234 may be considered to be a four condition shift register which increments once each byte time after it is set until it reaches its fourth condition in which condition it remains until it is set to a new condition by a signal on line 233. Index register 234 generates an output signal on line 251 when it is in its first condition, on line 252 when it is in its second condition, on line 253 when it is in its third condition, and on line 254 when it is in its fourth condition. When as asterisk is detected by AND gate 89, the resulting signal applied to line 233 causes index register 234 to be set to its first condition. Referring back to the word format in memory 10 shown in the introductory section, it is seen that the byte following the asterisk is always a backward length tag and that the byte following the backward length tag is always a forward length tag. Therefore, since index register 234 is reset to its first condition on the occurrence of an asterisk, and incremented at each byte time thereafter, this register may be used to indicate the presence of a backward length tag or a forward length tag in scan register 110. A signal on line 251 therefore means an asterisk is in scan register 110; a signal on line 252 means a backward length tag is in scan register 110; and a signal on line 253 means that a forward length tag is in scan register 110. A signal on line 254 means that neither an asterisk, a backward length tag, or a forward length tag is in scan register 110. There are occasions when a backward or a forward length tag are applied to scan register 110 without an asterisk first being applied to this register. Under these conditions, a suitable signal is applied to line 233 in a manner to be described later with reference to FIGS. 3*a*–3*i* to set index register 234 to properly indicate the character in scan register 110.

The signals on lines 251 and 254, the signals indicating that neither a backward or a forward length tag are in scan register 110, are applied through OR gate 256 and line 258 to one input of AND gate 260. The other input to AND gate 260 is a control signal on line 261. The presence of a signal on line 261 indicates that there are no control instructions in shift register 72 and that the contents of register 72 are to be read into memory 10 at the address indicated in MAR 46. Details of the signals which go to make up the signal on line 261 are shown in FIGS. 3*a*–3*i* and described with reference thereto.

Line 252 is connected as the other input to AND gate 154 and as one input to OR gate 262. The output from AND gate 154 is applied through line 263 as the third input to OR gate 66. Therefore, when a backward length tag is in scan register 110, adder 54 can perform only a subtract operation. Line 253 is connected as the other input to AND gate 152 and as the other input to OR gate 262. Output line 264 from AND gate 152 is connected as the third input to OR gate 64. Therefore, when a forward length tag is in scan register 110, only an add operation can be performed. Output line 265 from OR gate 262 is connected as the other input to AND gates 130 and 146. Therefore, the $\epsilon_A$ and $\epsilon_M$ compute instructions can be performed only when either a backward or forward length tag is in scan register 110.

The output from $\gamma$ detector AND gate 91 is applied through line 376 and inverter 378 as a second input to AND gate 200. The third input to this AND gate is the output from OR gate 228, the second input to this OR gate being the output from AND gate 260. Output line 266 from AND gate 200 is connected as the conditioning input to memory-input AND gates 105. Therefore, there can be an input to memory 10 only when the special character $\gamma$ is not in shift register 72.

The output from $\nu$ detector AND gate 92 is connected through line 382 to hub 382'. Hub 382' forms one of the inputs to line 114 which is an input to compare circuits 106. The presence of a signal on line 382 inhibits the application of a signal to line 114, thereby preventing a compare operation from being performed.

GENERAL OPERATION

*Introduction:*

The purpose of the following discussion is to indicate what operations are being performed and, in a very general way, how they are being performed. Problems such as timing are not considered in this discussion and it should always be assumed that a signal occurs at the time it is required. It is felt that the general understanding of the circuit and its operation gained from the skeletonized diagram of FIGS. 1*a* and 1*b* and the following discussion will aid the reader in understanding the detailed description to be given with reference to FIGS. 3*a*–3*i*. Problems such as timing are considered and resolved in that discussion.

Before illustrating the operation of the circuit of FIGS. 1*a*–1*b* with a specific example, it would be well to consider generally the functions which this circuit is capable of performing. As was indicated previously, each input word was matched with a dictionary entry during a previous operation so that the word stored in memory 40 contain a considerable amount of information about the words to be translated. The general scheme for performing semantic and syntactic analysis in the circuit is to find linkages between various words now stored in memory 40. The finding of linkages is a parsing operation which maches an adjective with the noun it modifies, a subject with its verb, etc. Linkages are found by applying part of each word stored in memory 40 to compare circuits 106 and attempting to match these words, a byte at a time, with bytes applied to shift register 72 by table storage 68. When a match is not had, scan control circuit 120 changes the entry applied by table storage 68 to shift register 72 in a manner previously described. When a match is had, the instruction characters in the function of the match-on entry in table storage 68 are applied to shift register 72. These instruction characters cause operations to be performed which operations generally include the modification of the word stored in memory 40 by applying a character from table storage 68 through shift register 70 and AND gates 105 to a selected address position in memory 40.

MAR 46 always contains the address in memory 10 which is presently being accessed. The address in MAR 46 is generally incremented one position for each unit of time by adding a numeral 1 from numeral 1 code generator 222 to the address in MAR applied to adder 54 through lines 52. In doing the matching operations indicated above, it is generally necessary to skip over one or more words or parts thereof. This is accomplished by reading a new address into MAR from either AIR 102 or MSKR 104, or by computing a new address in adder 54 under control of a $\delta_P$ or $\delta_N$ instruction.

*Specific example:*

With the above general discussion as a guide, the manner in which the circuit operates to perform a specific step in the syntactic analysis of a sentence will now be considered.

Figure 5:
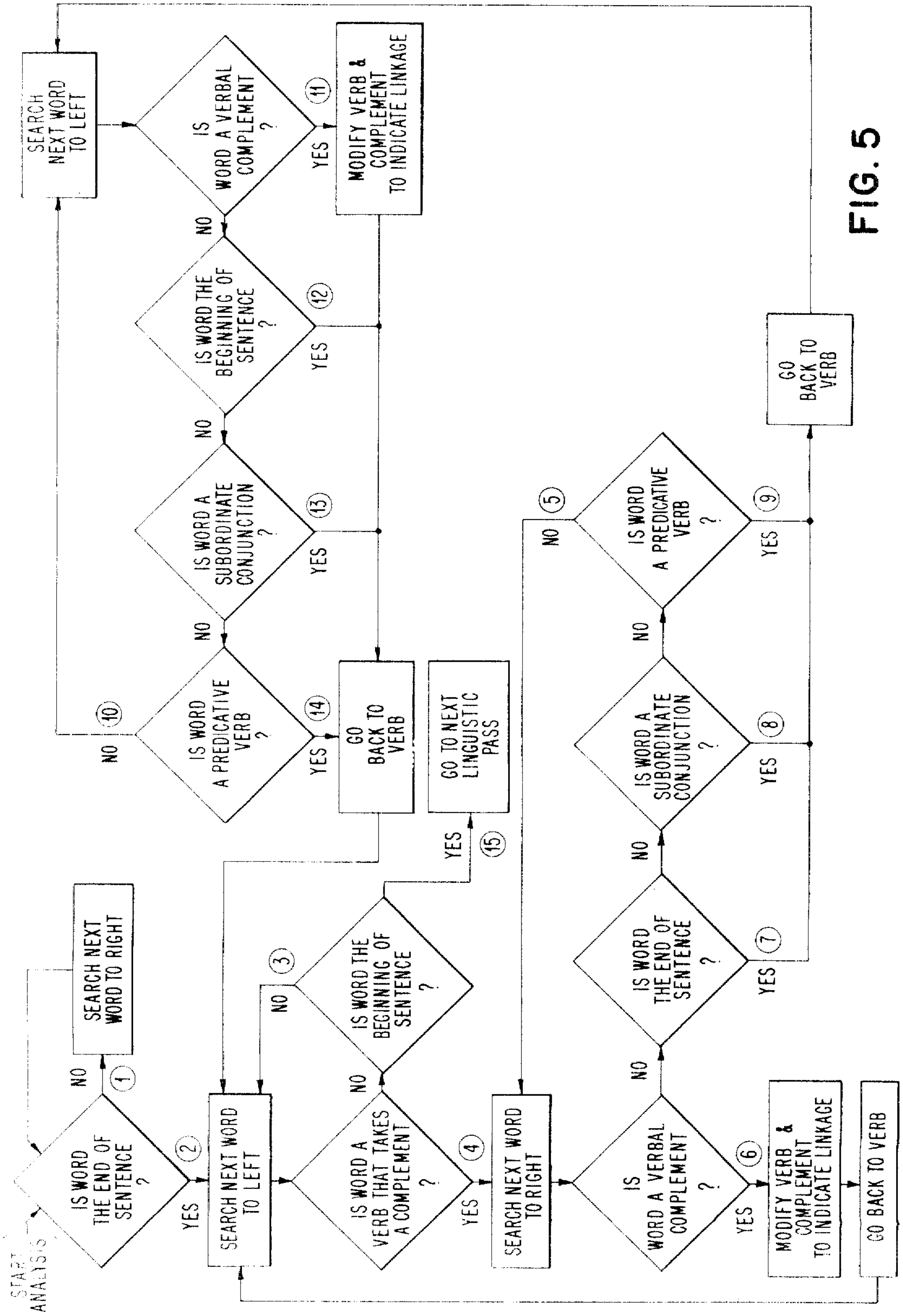
FIG. 5 is a flow diagram of an illustrative pass in a multi-pass language translation operation.

FIG. 5 is a flow diagram for an illustrative step in the syntactic analysis of a sentence. The primary purpose of this step is to form linkages between verbs and verbal complements.

*Is word end of sentence:*

Looking at FIG. 5, it is seen that the first operation to be performed is that of finding the end of the sentence. It is apparent that this step is necessary, since the search must be an ordered one, and, as will be seen later, having started at the end of a sentence, the search can be terminated when the beginning of the sentence is reached. Having found the end of the sentence, the search then reverses direction and proceeds to look to the left until a verb which takes a complement is found. If no such word can be found then, when the beginning of sentence is found, this step ends and the next step, whatever it may be, starts.

Assuming that a verb which takes a complement is found, the search again reverses direction and proceeds to the right in search of a verbal complement. Since it is possible that the verb will not have a complement or the complement will proceed rather than follow the verb, this scan is also looking for an end-of-sentence, a subordinate conjunction, or a predicative verb. If an end-of-sentence, subordinate conjunction or a predicative verb is found, this means that there is no verbal complement to the right of the verb and the search again reverses direction, going back to the verb and searching left from that point for a verbal complement. If a verbal complement is found either in the search right or the search left, a byte indicating the match is inserted in a predetermined blank in both the verb and the verbal complement and a search left for any additional verbs in the sentence is initiated starting with the previous verb which was found. If on the search left for a verbal complement, a beginning-of-sentence, a subordinate conjunction, or predicative verb is found, this means that the verb which was found does not have a complement. If this occurs, a search left for additional verbs is also initiated starting with the previous verb found. The above sequence of operations is repeated for each verb in the sentence until, during a search left for a verb, the beginning of the sentence is located.

FIG. 6 shows the table entries which would be used in performing the first few operations shown in FIG. 5. These instructions will be explained as they are used.

Referring back to FIGS. 1*a*–1*b*, assume that the sentence stored in memory 10 is "he went home and ate lunch." Assume further that AIR contains the address of the asterisk for the word "he," that MAR and MSKR have some indeterminate addresses stored in them, that flip-flop 188 is in its ONE state, that all other flip-flops are in their ZERO state, and that prefix region 42 of memory 10 has in its last address position, the prefix character $\rho_1$ and in its next-to-the-last address, the character $\alpha_1$. The characters $\rho_1$ and the $\alpha_1$ would have been inserted into prefix region 42 and flip-flop 188 would have been set during the preceding step in the analysis in a manner to be described later.

As the disc of table storage 68 rotates, the transducer (not shown) positioned over one of its tracks senses an $\alpha_1\alpha_2$ character combination. The $\alpha_1$ character being in shift register 72 conditions AND gate 88 to generate an output signal on line 168. This signal is delayed one byte time in delay 170, a byte-time being defined as the time required for a 6-bit byte to be shifted through shift register 72. One byte time later, the $\alpha_2$ character is in shift register 72 causing AND gate 87 to be fully conditioned to generate an output signal on line 174. The coincident occurrence of the signal from delay 170 on line 171 and the signal on line 174 fully conditions AND gate 172 to generate an output signal on line 176. This signal switches flip-flop 178 to its ONE state.

Flip-flops 178 and 188 both being in their ONE state cause conditioning signals to be applied to both inputs of AND gate 208. The resulting output signal from AND gate 208 is applied through OR gate 214, and line 231 to control gates 48. This signal causes the control gates to apply the last address in memory 10, this also being the last address of prefix region 42, to MAR 46. The prefix character $\rho_1$ stored in this address is read out into scan register 110. The output from AND gate 208 is also applied to switch flip-flop 229 to its ONE state. The resulting output signal on line 238 is applied through OR gate 236, line 240, and OR gate 66 to switch true-complement circuit 56 to its subtract mode.

As long as flip-flop 178 remains in its ONE state, a signal is applied to line 114 as each full character is applied to shift register 72. This allows compare circuits 106 to compare the character in shift register 72 with the character stored in register 110, the $\rho_1$ character in this instance. The first two entries shown in the table of FIG. 6 are the only two entries which have as their first character the prefix character $\rho_1$. Since the circuit connections are such as to cause the prefix character stored in the last address of region 42 to be applied to scan register 110 at the beginning of each attempted match operation, the prefix characters may be used to indicate what step, and what part of what step are being performed or are to be performed at any given time.

Referring to FIG. 5, it is seen that at the beginning of the process step diagrammed therein, the first operation is to find the end of the sentence. As will now be seen, the first two entries in the table of FIG. 6 perform this function.

Assume that the first character read from the table is less than the character $\rho_1$. A signal will therefore appear on a line 116 which signal, when applied to scan control circuit 120 causes the transducer (not shown) to advance to the next higher track of table storage 68. The signal on a line 116 is also applied through OR gate 122 and line 202 to reset flip-flop 178 to its ZERO state, thus indicating the end of a matching operation. The switching of flip-flop 178 to its ZERO state serves to inhibit the application of pulses to line 114, thereby preventing further comparisons from being performed.

When the first $\alpha_1\alpha_2$ character combination is detected on the next higher track by AND gates 88 and 87, flip-flop 178 is again switched to its ONE state. Since flip-flop 188 is still in its ONE state, AND gate 208 is again fully conditioned, causing a signal to be applied through OR gate 214, and line 231 to control gates 48 to force the address of the last position in prefix region 42 to be reapplied to MAR 46. The $\rho_1$ prefix is therefore reapplied to scan register 110. The output from AND gate 208 also is applied to switch flip-flop 229 to its ONE state, thereby restoring true-complement circuit 56 to its subtract mode.

Assume that the argument character now being compared with $\rho_1$ is greater than $\rho_1$. When a signal is applied to line 114, compare circuits 106 therefore generate an output signal on a line 118 which now causes scan control circuit 120 to shift from track search to entry search and again resets flip-flop 178 to its ZERO state.

Since the first entry shown in FIG. 6 would give a more significant match than the second entry, this entry would be scanned first. Assume that the first entry shown in FIG. 6 is now applied to shift register 72. The detection of the $\alpha_1\alpha_2$ character combination again causes flip-flop 178 to be switched to its ONE state and, since flip-flop 188 is also in its ONE state, the $\rho_1$ character is again applied to scan register 110, and flip-flop 229 is again switched to its ONE state, setting true-complement circuit 56 to its subtract mode. When the $\rho_1$ character from the table entry has been completely applied to shift register 72, a signal is applied to line 114 causing a compare operation to be performed. Since there is a successful comparison, no output signal is generated by compare circuits 106. Shortly after the signal is applied to line 114, a clock pulse is applied to line 218 conditioning AND gates 220 (FIG. 1*a*) to pass a signal representing the numeral one through lines 224 and OR gates 62 to true-complement circuit 56. Since true-complement circuit 56 is in its subtract mode at this time due to the signal on line 240, the numeral one is subtracted from the address in MAR 46 in adder 54 and the resulting address is applied through lines 136, control gates 48, and lines 50 to MAR.

MAR now contains the address of the next-to-the-last position in prefix region 42, the address in which $\alpha_1$ is stored. The character $\alpha_1$ is therefore applied to scan register 110. Since table storage 68 has applied the character $\alpha_1$ to shift register 72 at this time, compare circuit 106 again indicates a match when a signal is applied to line 114. The detection of the $\alpha_1$ character in shift register 72 by AND gate 88 also causes a signal on line 168 which is applied to one-byte delay 170. One byte time later when the $\alpha_1$ character has been shifted out of shift register 72 and the asterisk (*) shifted in, delay 170 applies a signal through line 171, conditioned AND gate 204, line 210 and OR gate 189 to reset flip-flop 229 to its ZERO state and through line 171, conditioned AND gate 206, line 246, OR gate 198 and line 248 to condition AND gates 230 to apply the contents of AIR 102 through control gates 48 and lines 50 to MAR 46. The resetting of flip-flop 229 to its ZERO state removes the signal from line 240 allowing true-complement circuit 56 to return to its add mode and the application of the contents of AIR to MAR causes the address of the asterisk for the word "he" in the sentence being processed to be in MAR. Since shift register 72 also contains an asterisk at this time, when a signal is applied to line 114, compare circuits 106 again indicate a match.

However, when a clock pulse is now applied to line 218, AND gate 244 is conditioned by an output signal from inverter 242 (there not being a signal on line 240 at this time). OR gate 64 therefore generates an output signal to set true-complement circuit 56 to its add mode. The coded-numeral-one signal from generator 222 passing through AND gates 220, lines 224, and OR gates 62 to true-complement circuit 56 is therefore added to the contents of MAR in adder 54 and the resulting address is applied through lines 136, gates 48, and lines 50 to MAR. The circuit is in this way updated to bring the address of the next character in memory 10, the backward length tag for the word "he" into MAR and to cause this backward length tag to be applied to scan register 110.

Referring to FIG. 6, it is seen that the table character now applied to shift register 72 is the special character $\nu$. The resulting output from AND gate 92 on line 382 inhibits the application of a signal to line 114. Therefore, no attempt is made to match on the backward length tag; however, since $\nu$ is a "match-on-anything" symbol, the circuit proceeds as if a match had been made. Therefore, at the proper time, a clock pulse is applied to line 218 to cause the address in MAR to again be updated one position. This brings the forward length tag for the word "he" into scan register 110. Again, the character $\nu$ is detected in shift register 72 inhibiting a mismatch and, at the next clock pulse, MAR is updated to the first information character of the word "he." Shift register 72 at this time contains the character $P_t$, which is the character used to represent the end of a sentence. Since the character in shift register 72 and that in scan register 110 are not the same, compare circuit 106 generates an output signal on a line 116 or 118 when a signal is applied to line 114 causing scan control circuit 120 to apply the next table entry, the second entry shown in FIG. 6, to shift register 72. The signal on line 116 or 118 is also applied through OR gate 122 and line 202, to reset flip-flop 178 to its ZERO state, thereby preventing further comparisons.

Having failed to match on the end-of-sentence entry, the first entry in the table on FIG. 6, the circuit now attempts to match on the second entry in the table. An entry of this form is referred to as a break-point entry. Such an entry has only the prefix character in its argument and is matched on only when all other entries containing that prefix character have been tried and failed. A match on a break-point entry indicates that the desired match cannot be made on the word, the first address of which is presently stored in AIR 102, and that either the operation cannot be performed, or that, if it is to be performed, it must be on another word in memory 10. In the particular situation under consideration, the match on the break-point entry merely means that the word being matched on, the word "he," is not the end of a sentence, and that the word following "he" must be looked at.

It should be remembered that flip-flop 188 is still in its ONE state at this time. Therefore, when flip-flop 178 is switched to its ONE state by the detection of the $\alpha_1\alpha_2$ characters which start the second table entry in FIG. 6, the resulting output from flip-flop 178 on line 179 is applied through conditioned AND gate 208 to switch flip-flop 229 to its ONE state. The matching on the $\rho_1$ and $\alpha_1$ characters then proceeds as it did for the first entry in the table of FIG. 6. After the $\alpha_1$ character has been matched on, the asterisk for the word "he" is applied to scan register 110 in a manner previously described while the character $\tau$ is applied to shift register 72. The detection of the character $\tau$ by AND gate 86 causes a signal on line 184 which is applied through conditioned AND gate 182 and line 186 to switch flip-flop 180 to its ONE state and to switch flip-flop 188 to its ZERO state. The signal on line 186 is also applied through OR gate 189 to the Zero side input of flip-flop 229, but this is a mere perfunctory act at this time, flip-flop 229 having already been switched to its ZERO state when the $\alpha_1$ character was detected following the $\rho_1$ character. Since flip-flop 178 is still in its ONE state, a signal is also applied to line 114 to cause a compare operation at this time, the resulting mismatch signal being applied through OR gate 122 and line 202 to reset flip-flop 178 to its ZERO state. The switching of flip-flop 178 to its ZERO state prevents further compare signals from being applied to line 114. The signals on lines 184 and 202 fully condition AND gate 196 to generate a signal on line 197 which is applied through OR gate 198 and line 248 to condition AND gate 230 to pass the address stored in AIR 102, the address of the asterisk for the word "he," into MAR 46.

One byte time later, MAR 46 contains the address of the backward length tag for the word "he" and shift register 72 contains the special character $\gamma$. The detection of this character by AND gate 91 prevents inverter 378 from applying a conditioning signal to AND gate 200 and therefore prevents the character in shift registers 72 from being read through lines 76 and AND gates 105 into memory 10.

Since flip-flop 229 is in its ZERO state, there is no signal on line 240; inverter 242 is therefore applying conditioning signals to AND gate 244. Therefore, as each clock pulse is applied to line 218, the contents of MAR is incremented one position. Therefore, one byte time later, MAR contains the address of the forward length tag for the work "he" and this length tag is applied to scan register 110. At this time, shift register 72 contains the special character $\epsilon_A$. This character is detected by AND gate 81 causing an output signal to appear on line 128. The signal on line 128 is applied as one input to AND Gate 130 and is also applied through OR gate 132 and line 150 to condition AND gates 152 and 156. When the $\tau$ character was detected, the resulting output signal on output line 197 from AND gate 196 was applied to properly set index register 234 so that it now is set to its third state, there being a forward length tag in scan register 110, and there is an output signal on line 253. The signal on line 253 is applied to fully condition AND gate 152 causing an output signal on line 264 which is passed through OR gate 64 to set true-complement circuit 56 to its add mode. The signal on line 253 is also applied through OR gate 262 and conditioned AND gate 130 to condition AND gates 134. And gates 156 are conditioned to pass the forward length tag in scan register 110 through OR gates 62 to true-complement circuit 56. The forward length tag is therefore added to the address in MAR and the results of this addition are applied through lines 136 and conditioned AND gates 134 to AIR 102. This brings the address of the asterisk for the word "went" into AIR 102. This operation sets the circuit to test the word "went" to determine if it is the end of the sentence.

Since no further significance is attached to the characters applied to scan register 110 for the rest of this operation, only the characters applied to shift register 72 will be considered. During the next byte time, the special character $\mu$ is applied to shift register 72. This character is detected by AND gate 90 causing an output signal on line 212 which is passed through one-byte delay 216 and conditioned AND gate 192 to switch flip-flop 188 to its ONE state and is also applied through OR gate 214 and line 231 to control gates 48 to set the address of the last position in prefix region 42 into MAR 46. The switching of flip-flop 188 to its ONE state causes a signal to be applied through line 226, OR gate 228, conditioned AND gate 200 and line 266 to condition AND gates 105. At the next byte time, the character $\rho_1$ is in shift register 72. This character is applied through lines 76 and conditioned AND gates 105 to the address in prefix region 42 contained in MAR (the last address in the prefix region). Since flip-flops 180 and 188 are in their ONE states, AND gate 194 is fully conditioned to generate an output signal on line 235 which signal is applied through OR gate 236 and line 240 to switch true-complement circuit 56 to its subtract mode. The one-bit applied to true-complement circuit 56 when a clock pulse is applied to line 218 is therefore subtracted from the contents of MAR, causing the address of the next-to-the-last-position in memory 10 to be applied to MAR 46. During the next byte time, the character $\alpha_1$ appears in shift register 72 and this character is stored in the address indicated in MAR. This character is also detected by AND gate 88, causing a signal to be applied through line 168 to delay 170. During the next byte time, the character $\alpha_2$ is applied to scan register 72, causing an output signal from AND gate 172 which switches flip-flop 178 to its ONE state and switches flip-flop 180 to its ZERO state. The circuit is now ready to determine whether the word "went" is the end of the sentence.

The circuit proceeds through the words "went," "home," "and," "ate," "lunch," in the same manner as that described for the word "he." After the failure to match on the word "lunch," the address of the asterisk for the "period" word is stored in AIR 102 and the prefix characters $\rho_1\alpha_1$ are again stored in prefix region 42 of memory 10.

Again a search is made to find the first entry starting with a $\rho_1$ prefix. Since the transducer (not shown) for reading table storage 68 (FIG. 1*b*) should be positioned over the proper track of the storage disc at this time, this search should be a relatively short one. The first entry shown in FIG. 6 is the first entry sensed which contains the $\rho_1$ prefix. A match is made on the $\rho_1$ and $\alpha_1$ characters of this entry in a manner previously described. The detection of the $\alpha_1$ character causes a signal on line 168 which is applied through delay 170, line 171, conditioned AND gate 204, line 210 and OR gate 189 to reset flip-flop 229 to its ZERO state and through line 171, conditioned AND gate 206, OR gate 198, and line 248, to condition AND gate 230 to pass the contents of AIR 102 into MAR 46. As mentioned previously, AIR 102 contains the address of the asterisk for the word representing the period in region 40 of memory 10. This asterisk is therefore read into scan register 110 where it matches on the asterisk of the first table entry of FIG. 6. The address in MAR is incremented in a manner previously described to bring the backward length tag and the forward length tag for the end-of-sentence-word successively into scan register 110 where these characters are matched with on the universal characters $\nu$.

The next incrementing of MAR brings the character $P_t$ into scan register 110. This character is used to indicate that the word ends a sentence. Referring to FIG. 6 it is seen that the same character is applied to shift register 72 at this time. The resulting match allows the special character $\tau$ to be applied to shift register 72. The detection of this character by AND gate 86 causes an output signal to be generated on line 184 which is applied through conditioned AND gate 182 and line 186 to set flip-flop 180 to its ONE state and to set flip-flop 188 to its ZERO state. The mismatch signal which occurs when an attempt is made to match on the $\tau$ character causes a signal on line 202 which is applied to reset flip-flop 178 to its ZERO state and through conditioned AND gate 196, line 197, OR gate 198 and line 248 to condition AND gates 230 to reapply the contents of AIR 102 to MAR 46. This causes the address of the asterisk for the end-of-sentence word to be reapplied to MAR.

Subsequent to this operation, a clock pulse is applied to line 218, causing the address in MAR to be updated one position in the manner previously described. This brings the address of the backward length tag for the end-of-sentence-word into MAR and causes this backward length tag to be applied to scan register 110. As will be seen later, the combined occurrence of this clock pulse and the detection of a $\tau$ in shift register 72 causes a signal on line 233 which sets index register 234 to its second state. Since flip-flop 178 is reset, there are no signals on line 114 and therefore no compare operations are performed. However, at this time, the special charater $\epsilon_A$ is applied to shift register 72 by table storage 68. This character is detected by AND gate 81, causing a signal to appear on line 128. Since index register 234 is in its second state, it is now generating an output signal on line 252. This signal is applied to condition AND gate 154 and is applied through OR gate 262 and line 265 to condition AND gate 130. The signal on line 128 is applied as the other input to AND gate 130, causing a conditioning signal to be applied to AND gates 134. The signal on line 128 is also applied through OR gate 132 and line 150 as the other conditioning input to AND gate 154 and to condition AND gates 156 to apply the contents of scan register 110 (the backward length tag) on line 108 through OR gates 62 to true-complement circuit 56. Since AND gate 154 is fully conditioned, a signal is applied through line 263 and OR gate 66 to switch true-complement circuit 56 to its subtract mode. Adder 54 therefore subtracts the backward length tag stored in scan register 110 from the existing contents of MAR and applies the result of the subtraction through lines 136 and conditioned AND gates 134 to AIR 102. The address thus stored in AIR is the address of the asterisk for the word in memory 10 preceding the end-of-sentence-word, in this case, the asterisk for the word "lunch." The storing of the address in AIR sets the circuit up for the search-left operation to follow.

The special character $\mu$ is then applied to shift register 72, causing AND gate 90 to generate an output signal on line 212 which is applied through OR gate 214 and line 231 to control gates 48 to cause the last address in memory 10 to be applied to MAR 46 and through one-byte delay 216 and conditioned AND gate 192 to set flip-flop 188 to its ONE state. As mentioned previously, the setting of flip-flop 188 to its ONE state conditions AND gate 200 to permit the contents of shift register 72 to be read through AND gates 105 into memory 10 at the address indicated in MAR 46. The prefix character $\rho_2$ is now applied to shift register 72 and is read into the last address in prefix region 42. During the next byte time, the $\alpha_1$ character is stored in the next-to-the-last address position in prefix region 42 in a manner previously described. The detection of the $\alpha_2$ character then causes AND gate 172 to generate an output signal on line 176 which is applied through OR gate 198 to condition AND gates 230 to apply the contents of AIR to MAR and which switches flip-flop 178 to its ONE state, and flip-flop 180 to its ZERO state, thereby terminating the function operation and starting a new search operation.

*Is word a verb which takes a complement:*

Referring back to FIG. 5, it is seen that, having found the end of the sentence, a search left is initiated to find the first verb which takes a complement. Entries 3–5 (FIG. 6) are the entry-subset which is used in performing this operation.

Since flip-flop 188 is in its ONE state, the switching of flip-flop 178 to its ONE state causes a signal to be applied through AND gate 208, OR gate 214 and line 231 to cause the address of the last position in memory 10 to be applied to MAR 46. The prefix $\rho_2$ stored in this address is therefore read into scan register 110. An attempt is made to match this prefix character with prefix characters being applied by table storage 68 to shift register 72, with successive mismatch signals on lines 116 and 118 being used by scan control circuit 120 to adjust the scan of table storage 68 in a manner previously described until a table entry starting with the $\rho_2$ prefix is found. The most significant entry having the $\rho_2$ prefix is entry 3. Therefore, this entry is scanned before entry 4 which in turn is scanned before the break-point entry 5.

When entry 3 is found on table storage 68, a match is had on the $\rho_2$ prefix character and on the $\alpha_1$ character. The detection of the $\alpha_1$ character causes a signal to be applied to delay 170. One byte time later, the output from this delay is applied through line 171, conditioned AND gate 206, line 246, OR gate 198 and line 248 to condition AND gates 230 to apply the contents of AIR 102 to MAR 46. The signal out of delay 170 is also applied to AND gate 204 which is, at this time, conditioned by the signal on line 179, causing an output signal on line 210 which is applied through OR gate 189 to switch flip-flop 229 to its ZERO state. The asterisk for the word "lunch" is in this way, applied to scan register 110. Matching proceeds in a manner previously described on the asterisk, the forward length tag and the backward length tag of the word "lunch," the forward and backward length tags matching on universal characters ($\nu$'s).

The symbol for the part of speech of the word is now applied to shift register 72 and scan register 110. As seen from entry 3, the part of speech character applied to shift register 72 is a V, representing a verb which takes a complement. Since "lunch" is not a verb taking a complement, a mismatch occurs at this point, causing an output signal on line 202 which resets flip-flop 178 to its ZERO state, thereby stopping further comparison.

Entry 4 is now applied to shift register 72. Matching proceeds as with entry 3 until the character $P_t$ is applied to shift register 72. This is the special part-of-speech character for the word which begins or ends a sentence. Since the word "lunch" is not the word which symbolizes either the beginning or the end of a sentence, it does not contain the character $P_t$ at this position and a mismatch again occurs.

The break-point entry 5 in FIG. 6 is now applied to shift register 72. After matching is had on the two prefix characters of this entry in a manner similar to that previously described, the special character $\tau$ is applied to scan register 72. This character is detected by AND gate 86, causing an output signal on line 184, which is applied through conditioned AND gate 182 and line 186 to switch flip-flop 180 to its ONE state and to reset flip-flop 188 to its ZERO state. The resulting $\tau$-mismatch causes a signal on line 202 which is applied to reset flip-flop 178 to its ZERO state, thereby terminating the search operation and is also applied through conditioned AND gate 196, line 197, OR gate 198 and line 248 to condition AND gates 230 to pass the contents of AIR 102 (the address of the asterisk for the word "lunch") into MAR 46.

As previously indicated, index register 234 is set to its second condition with an output on line 252 one byte time after the character $\tau$ is detected in shift register 72. At the next byte time, the special character $\epsilon_A$ is in shift register 72, index register 234 to its second condition, and MAR 46 has been incremented to contain the address of the backward length tag for the word "lunch," causing this length tag to be applied to scan register 110. The $\epsilon_A$ character is detected by AND gate 81, causing an output signal on line 128, which is applied through OR gate 132 and line 150 to condition AND gates 154 and 156. AND gate 154 is fully conditioned at this time by the signal on line 252 from index register 234 causing an output signal on line 263 which is passed through OR gate 66 to put true-complement circuit 56 in its subtract mode. The conditioning of AND gates 156 allows the backward length tag in scan register 110 to be applied through OR gates 62 to true-complement circuit 56 from whence its complement is applied to adder 54 resulting in the subtraction of this length tag from the contents of MAR. The resulting difference, the address of the asterisk for the word "ate," is applied through lines 136 and conditioned AND gates 134 to AIR 102. AND gates 134 are conditioned at this time by the output signal from AND gate 130, which is itself fully conditioned at this time by the signals on lines 128 and 265. The $\rho_2$ and $\alpha_1$ characters are then restored to prefix region 42 in a manner similar to that described for the restoring of the $\rho_1$ prefix when a match was had on entry 2 in FIG. 6.

The circuit now attempts to determine whether the word "ate" is a verb which takes a complement. By a brief sequence of table look ups, entry 3 is again applied to shift register 72. At this time, flip-flop 188 is in its ONE state, the address of the asterisk for the word "ate" is in AIR 102, and the prefix character $\rho_2$ is in the last address of prefix region 42. The detection of the $\alpha_1\alpha_2$ characters for entry 3 causes an output signal from AND gate 172 which switches flip-flop 178 to its ONE state. The output from the ONE side of flip-flop 178 is applied in a manner previously described to set the address of the $\rho_2$ prefix into MAR 46. $\rho_2\alpha_1$* and the forward and backward length tag of the word "ate" are all matched on in a manner previously described. Since the word "ate" is a verb which takes a complement, the next byte applied to scan register 110 is the character V. This character matches the character being applied to shift register 72. The next character applied to shift register 72 is the special character $\tau$ indicating that a match has occurred. This character is detected by AND gate 86, causing an output signal on line 184 which is applied through conditioned AND gate 182 to set flip-flop 180 to its ONE state and to reset flip-flop 188 to its ZERO state, thereby indicating that a prefix operation is over. A $\tau$-mismatch occurs at this time which is used to reset flip-flop 178 and to condition AND gates 230 to pass the contents of AIR into MAR, thereby placing the address of the asterisk for the word "ate" into MAR.

Referring back to FIG. 5, it is seen that when a verb which takes a complement is found, a search right operation is initiated to find the verbal complement for the verb. It is noted that no matter what occurs in later operations, there will be a need to go back to the verb. Therefore, at the time a verb is found, two operations must be performed: First, the address at which the verb begins must be stored, and second, a search must be started beginning with the next word to the right. The function portion of entry 3 in FIG. 6 performs both of these operations.

It will be remembered that a half byte time after the character $\tau$ is detected in shift register 72, index register 234 is set to its second condition with an output signal on line 252. At the next byte time, the special character $\epsilon_M$ is in shift register 72. At this time, MAR 46 has also been incremented one position so that the backward length tag for the verb "ate" is in scan register 110. The detection of the $\epsilon_M$ character by AND gate 83 causes an output signal on line 144 which is applied as one conditioning input to AND gate 146 and is also applied through OR gate 132 and line 150 to condition AND gate 154 and to condition AND gates 156 to apply the backward length tag stored in scan register 110 through OR gates 62 to true-complement circuit 56. The signal on line 252 fully conditions AND gate 154 causing an output signal on line 263 which is applied through OR gate 66 to set true-complement circuit 56 to its subtract mode. The backward length tag in scan register 110 is therefore complemented in true-complement circuit 56 and applied in this form to adder 54. This results in the backward length tag being subtracted from the address in MAR in adder 56 and the resulting address, the address of the asterisk for the word "and," being applied through lines 136 to the information inputs of AND gates 148. The signal on line 252 is applied through OR gate 262 and line 265 to fully condition AND gate 146 at this time, causing a conditioning signal to be applied to AND gates 148. The address of the asterisk for the word "and" is therefore passed through AND gates 148 to be stored in MSKR 104.

At the next byte time, the character $\epsilon_A$ is stored in shift register 72, the forward length tag for the word "ate" is in scan register 110, and index register 234 has been incremented so that there is now an output signal on line 253. The resulting signal on line 150 from the detection of the $\epsilon_A$ character by AND gate 81 fully conditions AND gate 152, causing an output signal on line 264 which is passed through OR gate 64 to set true-complement circuit 56 to its add mode. The forward length tag in scan register 110 is therefore added to the address stored in MAR in adder 54 and the resulting address, the address of the asterisk for the word "lunch," is applied through conditioned AND gates 134 to AIR 102. This effects the performance of the second of the two functions mentioned above, namely the preparation for the start of a search-right operation.

At the next byte time, the special character $\delta_M$ is in shift register 72. The detection of this special character by AND gate 82 causes an output signal on line 138 which conditions AND gates 140 to apply the address stored in MSKR 104 through lines 142 and control gates 48 to MAR 46. The address of the asterisk for the word "and" is in this way applied to MAR 46. The detection of the $\delta_M$ signal also causes index register 234 to be set to its second condition with an output signal on line 252 during the next half byte time.

At the next byte time, shift register 72 has the special character $\gamma$ stored therein, scan register 110 has the backward length tag for the word "and" stored therein, and index register 234 has an output signal on line 252. The detection of the $\gamma$ signal by AND gate 91 causes an output signal on line 376 which prevents inverter 378 from applying a conditioning signal to AND gate 200. AND gates 105 are therefore not conditioned to pass the contents of shift register 72 into memory 10.

At the next byte time, shift register 72 again has the special character $\epsilon_M$ stored therein, scan register 110 has the forward length tag for the word "and" stored therein, and index register 234 has been incremented so that there is now an output signal on line 253. The combined occurrence of the $\epsilon_M$ character in shift register 72 causing an output signal on line 150 and the signal on line 253 fully conditions AND gate 152 to generate an output signal on line 264 which is applied through OR gate 64 to switch true-complement circuit 56 to its add mode.

The signal on line 150 also conditions AND gates 156 to apply the forward length tag in scan register 110 through OR gates 62 to true-complement circuit 56. This forward length tag is therefore added to the address stored in MAR in adder 54 and the resulting address, the address of the asterisk for the verb "ate" is applied through lines 136 and conditioned AND gates 148 to MSKR 104. The address of the asterisk for the verb "ate" is in this manner stored in MSKR 104.

During the next three byte times, the $\rho_3$ prefix and the $\alpha_1$ character are stored in the last address and the next-to-the-last address, respectively, of prefix region 42 in a manner identical to that described for other prefix characters.

*Is word a verbal complement:*

Referring momentarily to FIG. 5, it is seen that a search right is now started for the verbal complement of the verb "ate." Referring to FIG. 6, instructions 6, 7 and 8 are a few of the instructions involved in performing this operation. Instruction 6 is the most significant entry having the $\rho_3$ prefix and is the one which is matched on if a verbal complement is found. Instruction 7 is the instruction which is matched on if a subordinate conjunction is found and is typical of the three instructions which follow instruction 6. Instruction 8 is the break-point entry for this set of instructions.

At this time, the circuit conditions are as follows: AIR 102 contains the address of the asterisk for the word "lunch"; MSKR 104 contains the address of the asterisk for the word "ate"; flip-flops 178 and 229 are in their ZERO state, flip-flops 180 and 188 are in their ONE state, and the prefix character $\rho_3$ is stored in the last address of memory 10.

Assume that by a multiple trial and error operation of the type previously described, an entry containing the $\rho_3$ prefix is finally found in table storage 68. Since entry 6 is the most significant entry containing the $\rho_3$ prefix, this is the entry in table storage 68 which is located first. When entry 6 is applied to shift register 72, its $\alpha_1\alpha_2$ bits initially cause flip-flop 178 to be set to its ONE state, and, if it has not been previously reset, cause flip-flop 180 to be reset to its ZERO state, thereby switching the circuit to its compare state. Since flip-flop 188 is in its ONE state, the switching of flip-flop 178 to its ONE state causes an output signal from AND gate 208 which is applied through OR gate 214 and line 231 to cause the last address of prefix region 42 to be applied to MAR and is also applied to switch flip-flop 229 to its ONE state, thereby setting true-complement circuit 56 to its subtract mode. The $\rho_3$ prefix is therefore read into scan register 110. During the next two byte times, the $\rho_3$ prefix and the $\alpha_1$ character in the next-to-the-last address of the prefix region are matched on in a manner previously described.

As before, one byte time after the $\alpha_1$ character is detected, delay 170 applies a signal through conditioned AND gate 204, line 210 and OR gate 189 to switch flip-flop 229 to its ZERO state, thereby permitting true-complement circuit 56 to be restored to its add mode, and through line 171, conditioned AND gate 206, line 246, OR gate 198 and line 248 to condition AND gates 230 to set the address in AIR 102 into MAR 46. The address of the asterisk for the word "lunch" is in this way applied to MAR. The asterisk for the word "lunch" is then matched on and the forward and backward length tags for this word masked over by two $\nu$ characters in a manner previously described.

At the next byte time, the address of the part of speech character for the word "lunch," is stored in MAR 46. Since the word "lunch" is being used as a verbal complement, this byte is the $C_v$ character. This character is applied to scan register 110. At the same time, the same character is being applied to shift register 72 by table storage 68. Since these characters match, the next character applied to shift register 72 is the special character $\tau$.

This character is detected by AND gate 86 causing an output signal on line 184 which is applied to set flip-flop 180 to its ONE state and to reset flip-flop 188 to its ZERO state. The resulting mismatch signal on line 202 is applied to reset flip-flop 178 to its ZERO state and to set the adress in AIR, the address of the asterisk for the word "lunch" into MAR in a manner previously described.

It should be noted at this point that the word "lunch" may, for example, be used as a subject or a verb as well as a verbal complement. This means that several parts of speech bytes would be required and a mask instruction required to select the proper one. This problem and the solution thereto are considered near the end of the DETAILED DESCRIPTION OF OPERATION section to follow.

Referring back to FIG. 5, it is seen that when a match is had on a verbal complement, three things are done:

(1) The verb is modified to indicate the linkage;

(2) The verbal complement is modified to indicate the linkage;

(3) A search is started from the verb to the left to find the next verb which takes a complement.

The instructions in the function of entry 6, FIG. 6, perform these three operations.

At the next byte time, MAR 46 has been updated to contain the address of the backward length tag for the word "lunch," this backward length tag is in scan register 110, and shift register 72 has the special character $\delta_P$ stored therein. The detection of the $\delta_P$ character by AND gate 85 causes an output signal on line 162 which is applied through OR gate 64 to set true-complement circuit 56 to its add mode and is applied through OR gate 160 and line 164 to one-byte delay 165.

Assuming that the modifying character is to be placed in an address three positions advanced from the part of speech character, during the next byte time the numeral character 4 is applied to shift register 72. This character is gated through AND gates 100 which are conditioned at this time by the output from delay 165 to true-complement circuit 56 from which it is applied to be added to the contents of MAR in adder 54. MAR at this time has been incremented to contain the address of the forward length tag for the word "lunch." The resulting address which is the address three positions advanced from the part of speech code is stored in MAR 46. The incrementing of MAR is inhibited at the next half-byte time. Therefore, during the next byte time, this address is still in MAR. During this next byte time, the modifying character M is applied to shift register 72. At this time, a signal is applied to line 261 (FIG. 1*b*) and, since index register 234 is in its fourth condition, there is a signal on line 254 which is applied through OR gate 256 and line 258 to fully condition AND gate 260 to apply a signal through OR gate 228 and conditioned AND gate 200 to condition AND gates 105 to pass the modifying character through lines 44 to the address in memory 10 indicated in MAR. The modifying character M is in this way applied to the verbal complement "lunch."

During the next byte time, the $\delta_M$ character is applied to shift register 72. This character is detected by AND gate 82 causing an output signal to be generated on line 138 which is applied to condition AND gates 140 to pass the contents of MSKR 104 through lines 142, control gates 48 and lines 50 to MAR 46. It will be remembered that at this time, MSKR contains the address of the asterisk for the verb "ate." Therefore, MAR now contains the address of this asterisk.

The detection of the character $\delta_M$ causes a signal on line 233 during the next half byte time which signal sets index register 234 to its second condition with an output signal on line 252. At the next byte time, shift register 72 contains the $\epsilon_A$ character and scan register 110 contains the backward length tag for the verb "ate." As previously indicated, the detection of the $\epsilon_A$ character in shift register 72 when index register 234 is in its second condition, causes the address of the asterisk for the preceding word, in this case, the address of the asterisk for the word "and," to be computed and causes this computed address to be stored in AIR 102. The circuit is, in this way, prepared to perform the search-left operation for the next verb.

During the next three byte times, the $\delta_P$, 3, and M characters are applied to shift register 72. These three characters operate in the same manner to apply a modifying character to the third byte following the part of speech character in the word "ate" as they did to apply this modifying character to the word "lunch," the only difference being that, since the $\delta_P$ instruction now occurs when a forward length tag is in scan register 110 rather than a backward length tag as was the case for the word "lunch," a jump of only three rather than four positions is required. The second modifying function called for in the flow diagram of FIG. 5 is in this way accomplished.

Having performed the three required functions, the circuit now proceeds to store the prefix character $\rho_2$ and the $\alpha_1$ character in prefix region 42 in a manner previously described. Since the $\rho_2$ prefix is stored, the circuit is again attempting to match on entries 3, 4 and 5 in FIG. 6. It will be remembered that these are the entries which were used to search for a verb taking a complement. Therefore, the circuit is now searching left to find the next verb, in this case, the verb "went," and to determine whether it has a complement. The verb "went," and its complement "home" will as a result of the operations to follow, be modified in a manner similar to the way the verb "ate" and the complement "lunch" were modified in the preceding operations. After these words have been modified, the circuit will again search left seeking another verb, but, since there are no other verbs, the beginning of sentence character to the left of the word "he" will be found and matched on by entry 4 in FIG. 6. Referring to the function of this entry, it is seen that it contains some instructions, whatever instructions are necessary to implement the beginning of the next step, and that it causes the prefix character $\rho_N$ to be stored in prefix region 42. The prefix character $\rho_N$ is the prefix charatcer for the first operation of the next step.

If instead of the sentence "he went home and ate lunch" the sentence had been "he said that he went home," then, after finding the verb "said," instead of matching on entry 6 in the table of FIG. 6, a match would have been had on entry 7, this being the entry which is matched on when a subordinate conjunction such as "that," is found. The matching on such an entry is accomplished in a manner previously described. The matching on this entry means that the verb does not have a verbal complement to its right. The function of this entry therefore uses a $\delta_M$ instruction to get back to the verb and then uses an $\epsilon_A$ instruction to start a search to the left of the verb for a verbal complement. While such a construction might be a bit unusual in the English language, it is more common in some foreign languages.

The remaining operations which are performed in implementing the flow diagram of FIG. 5, very closely resemble operations already described and it is not felt that describing them would aid in understanding the circuit.

DETAILED CIRCUIT DESCRIPTION

FIGS. 3*a*–3*i* form a detailed schematic diagram of the circuit which is the preferred embodiment of the invention. Where possible, like numbers have been used for like elements in FIGS. 1*a*–1*b* and FIGS. 3*a*–3*i*; like numbers have in most cases, also been used for an element which performs an identical function in both figures, even though its exact inputs or outputs might differ very slightly. However, where a number of elements in FIGS. 3*a*–3*i* combine to perform the function of a single element in FIGS. 1*a*–1*b*, or where the functioning of the elements in the two figures is quite different, different numbers have been used. It is believed that there is a sufficient identity of numbers to enable the reader to easily correlate the two figures.

In describing the circuit of FIGS. 3*a*–3*i* it has been assumed that the flip-flops employed are of a type requiring a finite time to switch from one state to the other. This fact can be seen from the timing chart of FIG. 7. This means that a flip-flop may perform a conditioning function during the same time interval that it is being reset.

Figures 3, 3A:
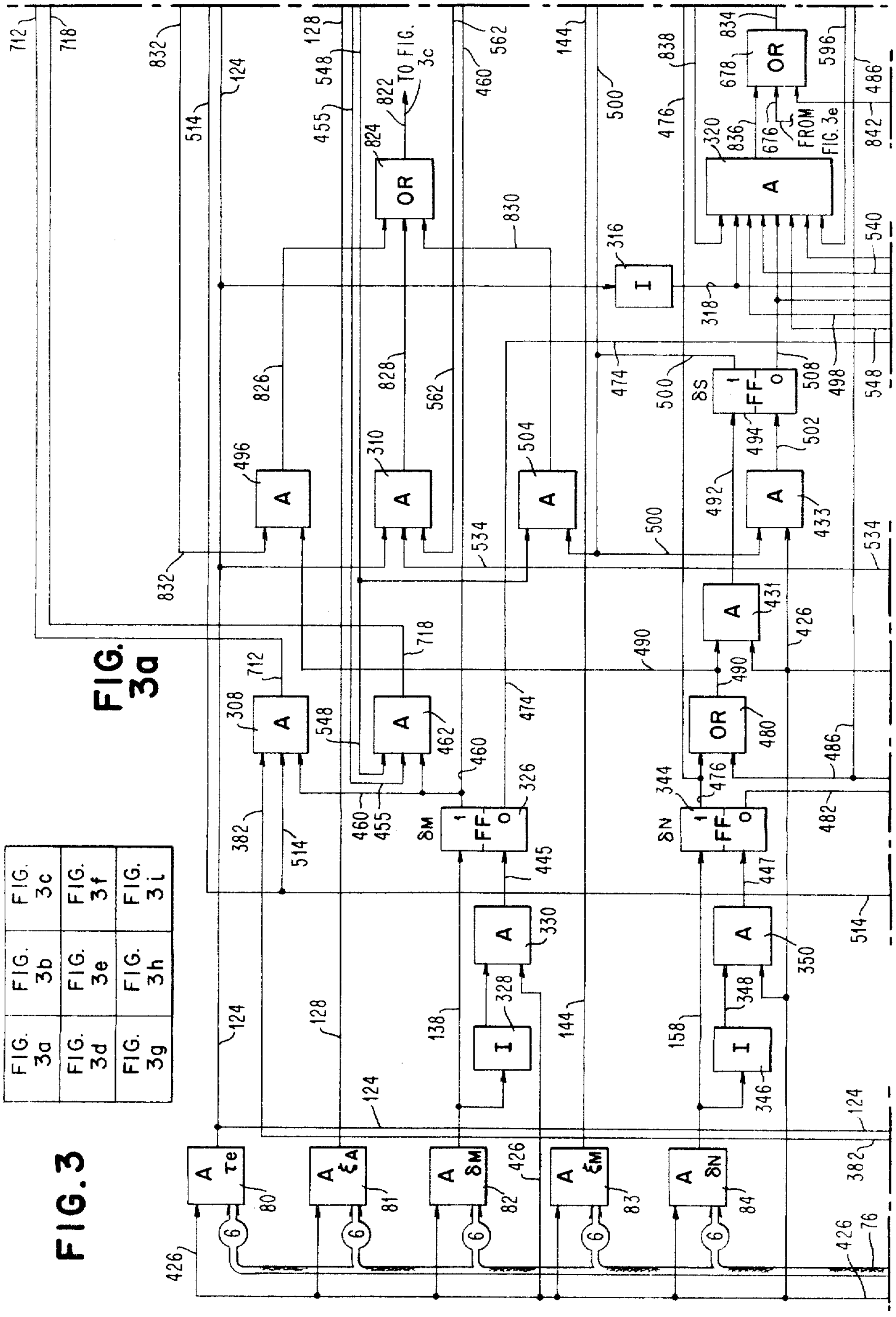
Figure 3B:
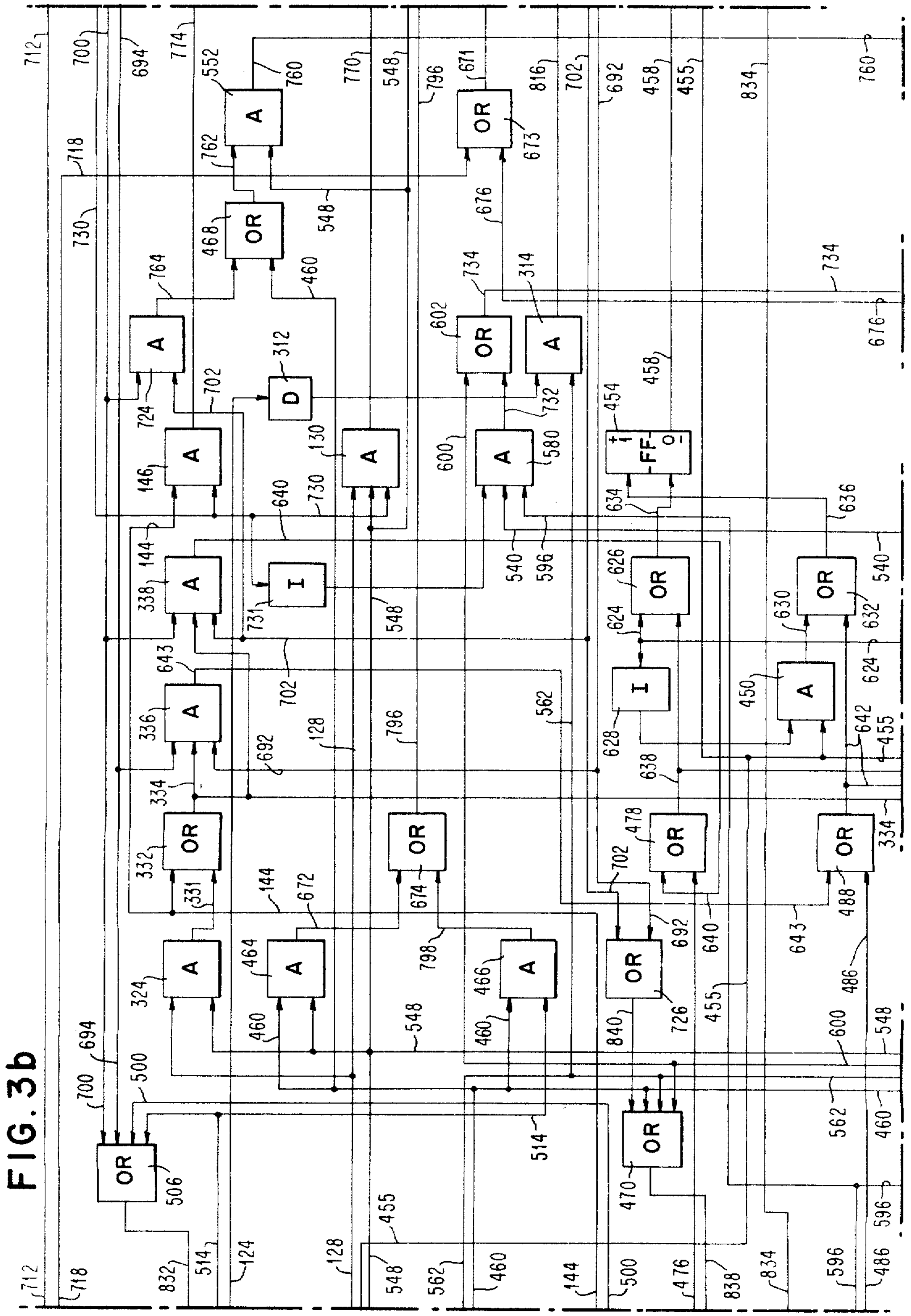
Figure 3C:
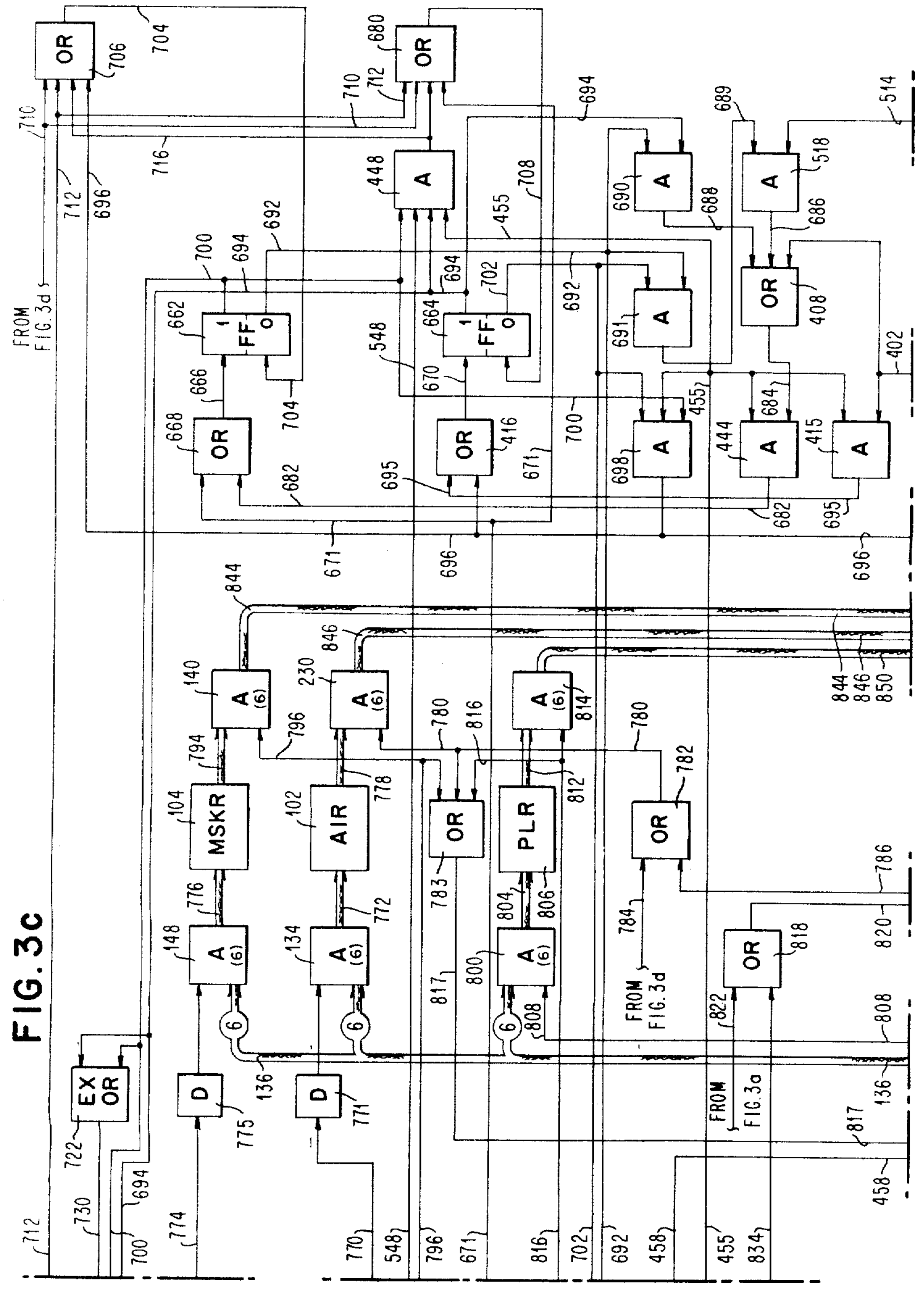
Figure 3D:
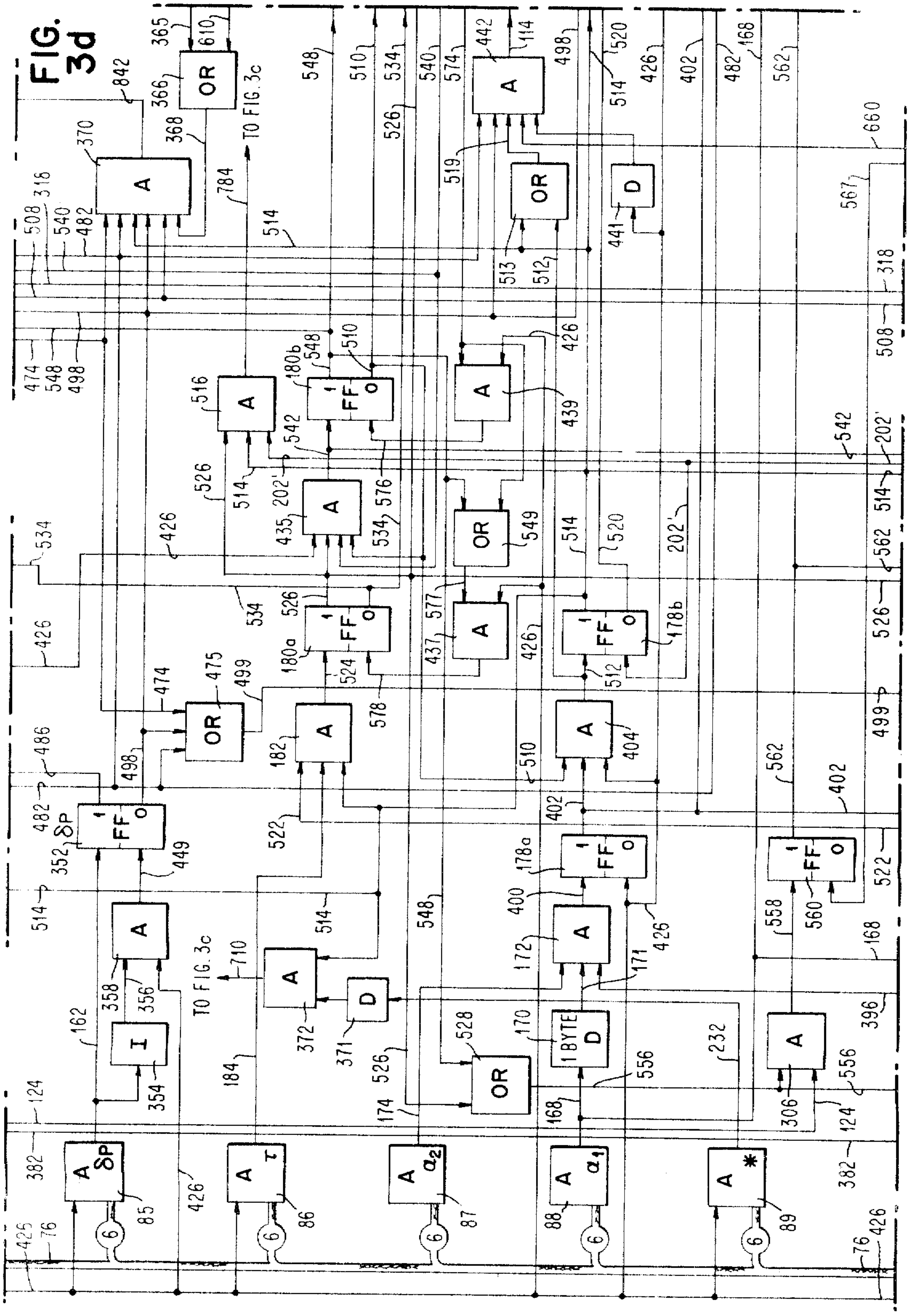
Figure 3E:
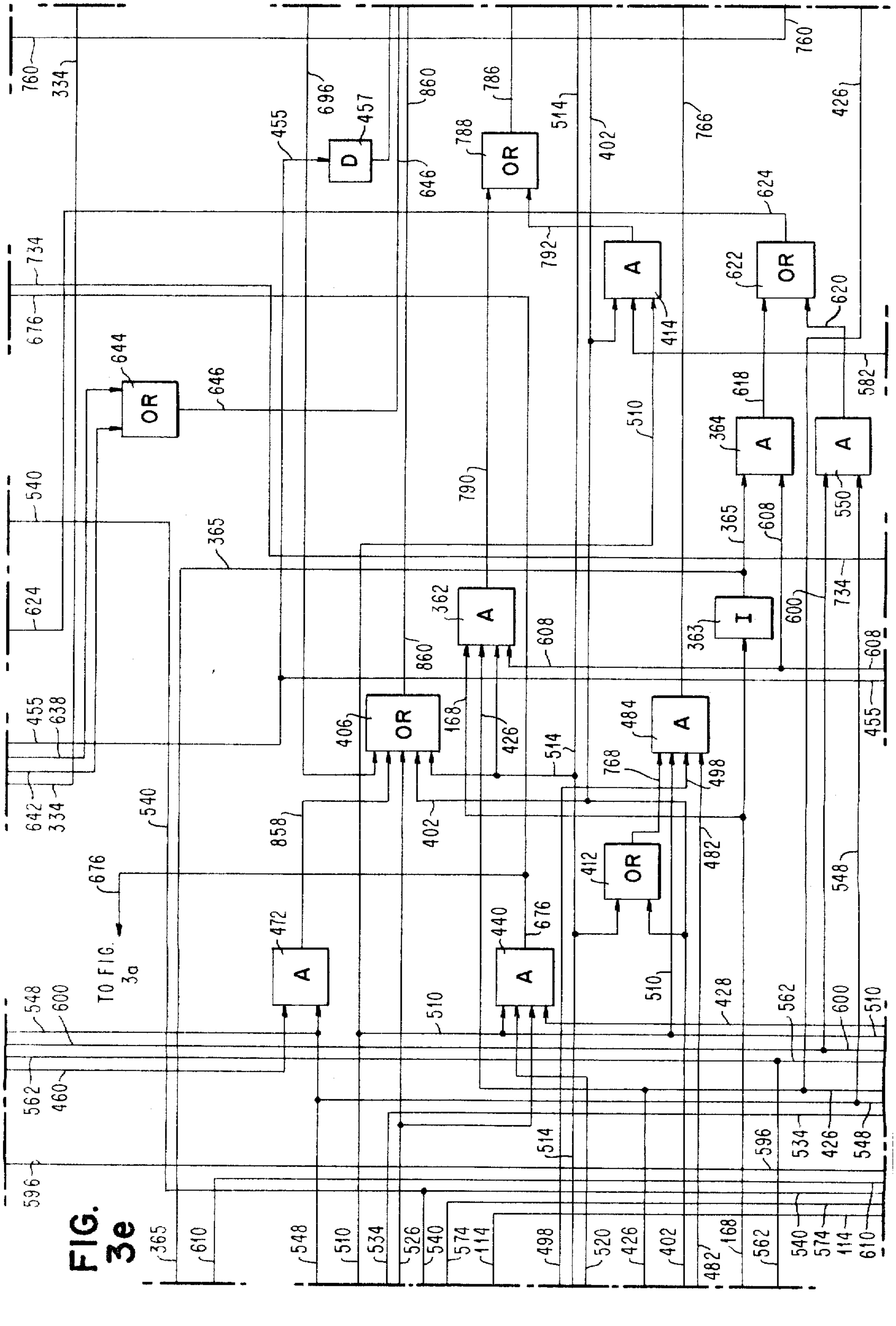
Figure 3F:
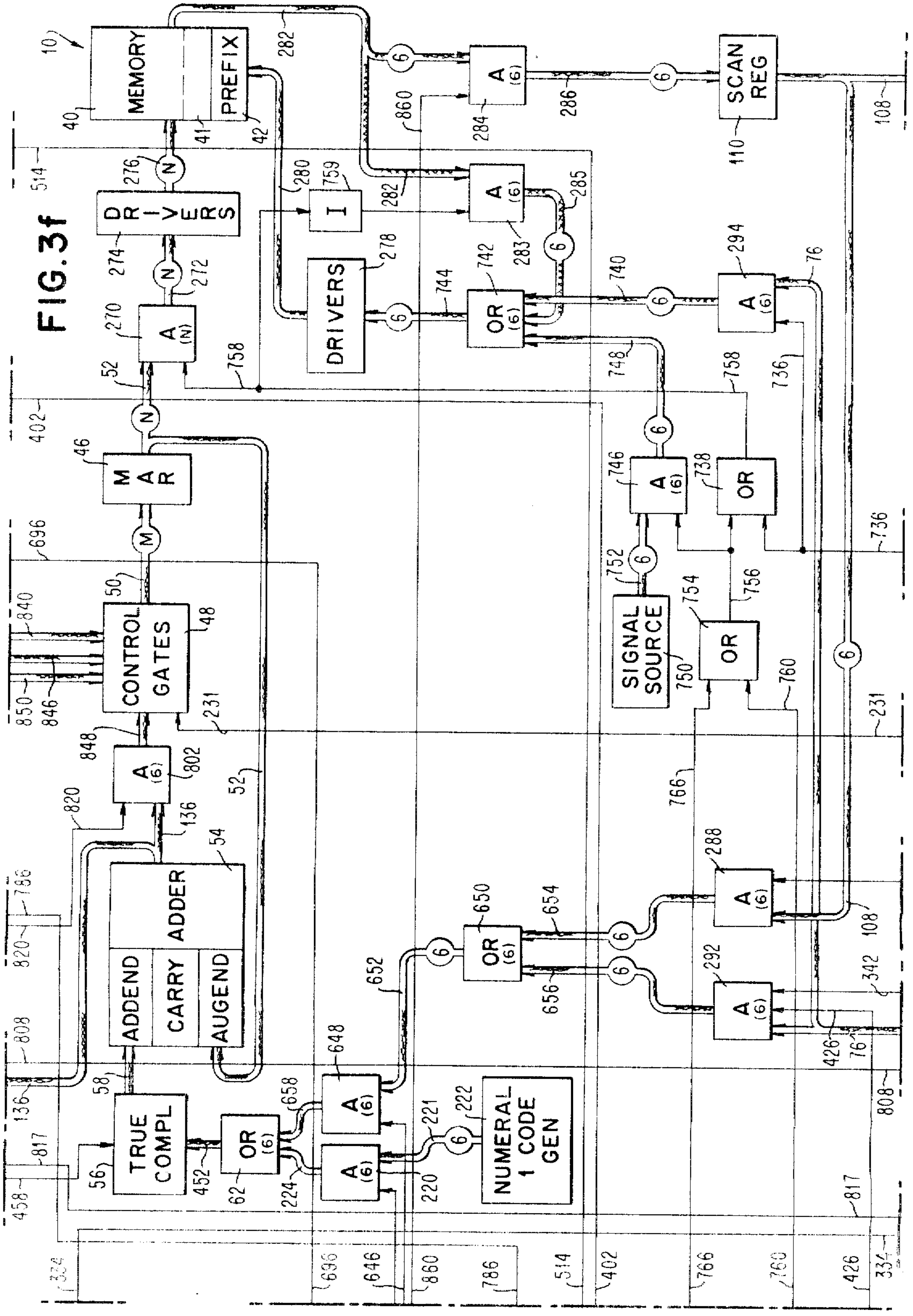

Referring now to FIG. 3*f*, it is seen that the circuit includes an addressable memory 10 which is substantially the same as the addressable memory 10 in FIG. 1*a*. This memory again is assumed to be a magnetic core matrix memory array of a type which gives nondestructive readout. Memory 10 has a normal storage region 40, an output storage region 41 and a prefix storage region 42, the significance of which will be apparent later. A six-bit byte is stored at each address in the memory. The address at which information is to be stored or from which it is to be taken in memory 10 is stored in memory address register (MAR) 46. The size of MAR and the number of output lines from it are determined by the number of addresses in memory 10. The output from MAR is applied through lines 52 as the information input to AND gates 270 and is also applied through lines 52 to the augend input of an adder 54. The outputs from AND gates 270 are applied through lines 272 to trigger drivers 274. These drivers first apply a full-read pulse to the drive line 276 linking the memory elements of the selected address and follow this with a full-write pulse. Unless it is desired to write new information into memory 10 in a manner to be described later, the output signals from memory 10 on lines 282 are fed back through AND gates 283, lines 285, OR gates 742 and lines 744 to control drivers 278. These drivers apply full-inhibit signals to such of the lines as it is desired not to read information into thereby allowing information to be written into the proper elements at the selected address. The inhibit signals from drivers 278 are applied to memory 10 over lines 280.

Figure 3G:
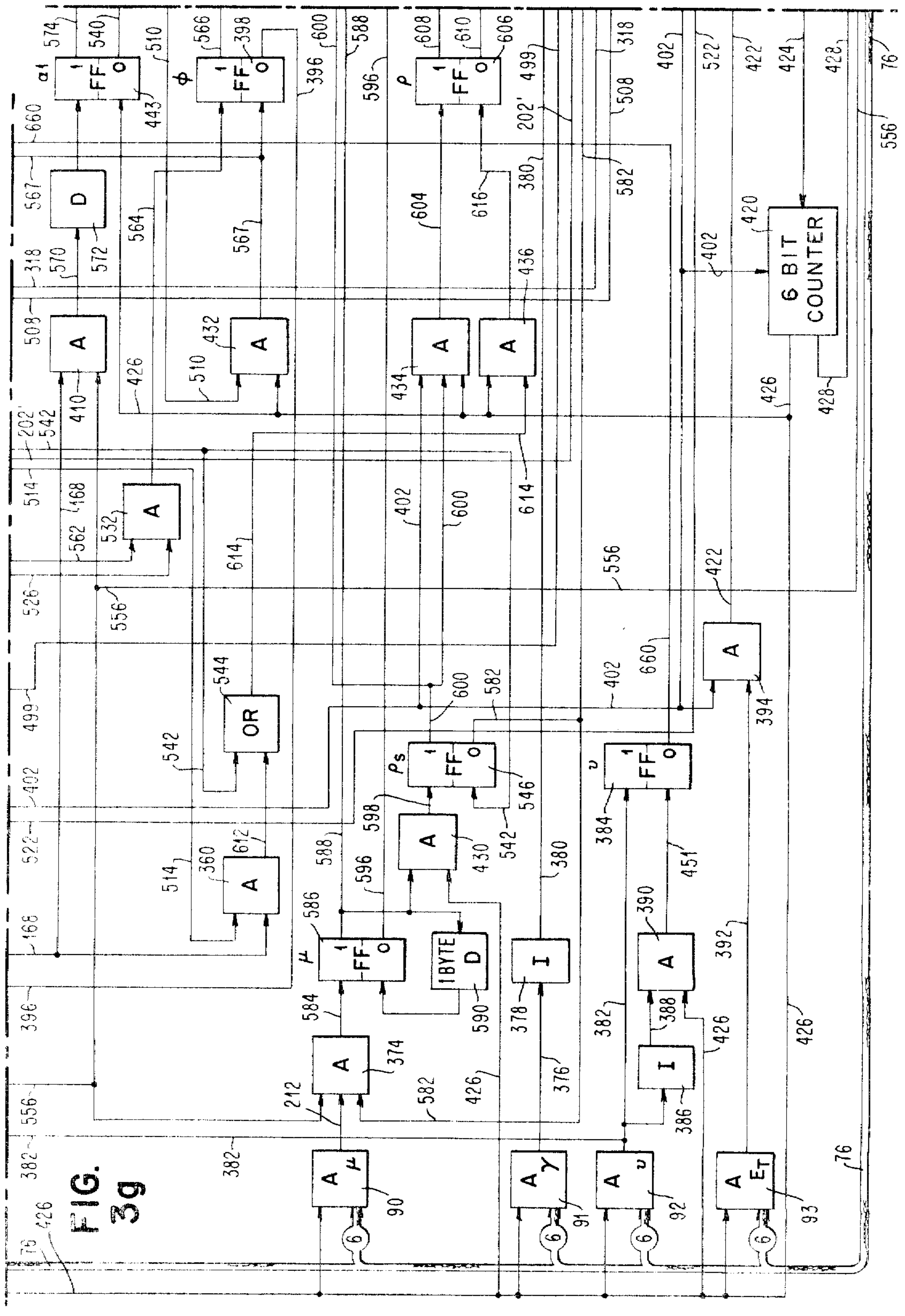

The information read out of memory 10 is applied through lines 282 as the information inputs to AND gates 284. The outputs from AND gates 284 are applied through lines 285 to 6-bit scan register 110. Output lines 108 from scan register 110 are applied as the information input to AND gates 288 and are also applied as one input to compare circuits 290*a*–290*f* (FIG. 3*i*).

Figure 3H:
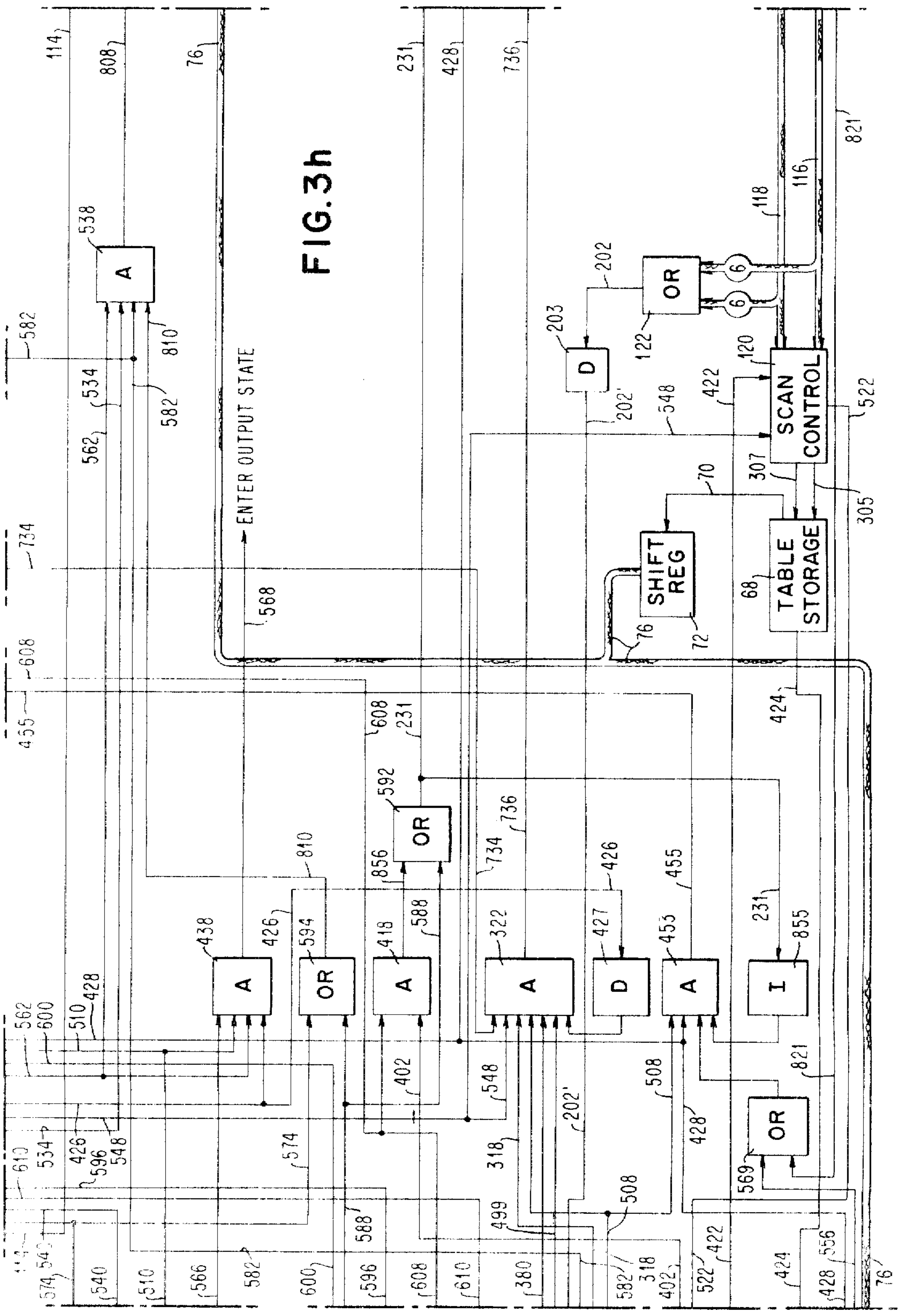
Figure 3I:
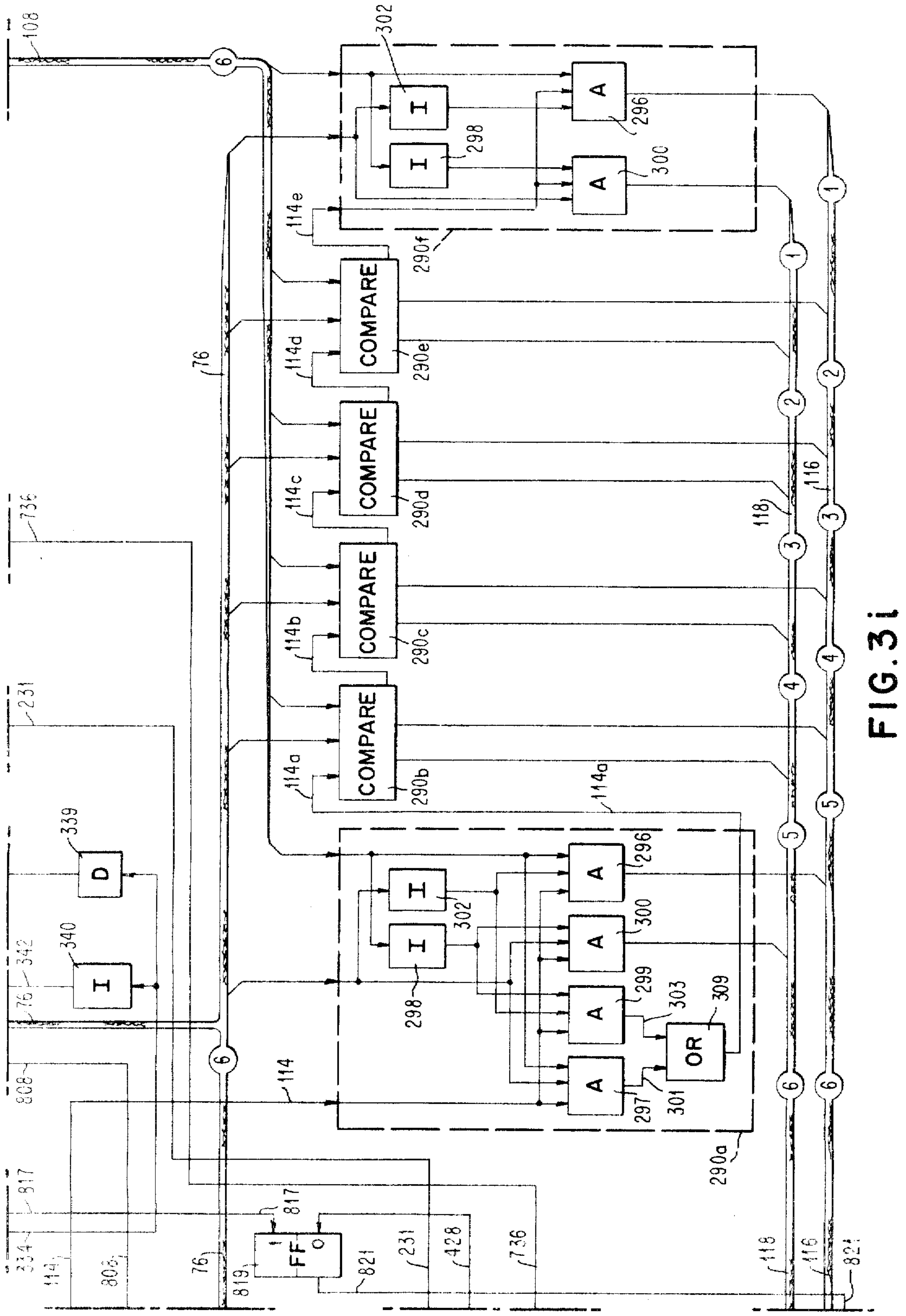

Referring to FIG. 3*h*, it is seen that the detailed circuit also has a table storage 68. Again, this storage is considered to be a rotating photographic disc having entries stored on it in concentric rings. The form of these entires and the significance of each of their characters was described in the general description section and will not be repeated here. Successive bits scanned on table storage 68 are applied to six-bit shift register 72 through line 70. The contents of shift register 72 are applied through lines 76 as the information inputs to AND gates 292 (FIG. 3*f*) and 294 and as the second information input to compare circuits 290*a*–290*f* (FIG. 3*i*).

Referring to compare circuit 290*a*, the circuitry for compare circuits 290*a*–290*e* being the same, it is seen that each of these compare circuits is made up of four AND gates, an OR gate, and two inverters. A signal on a line 108 from scan register 110 is applied directly to AND gates 296 and 297 and through an inverter 298 to AND gates 299 and 300. The signal on a line 76 from shift register 72 is applied directly to AND gates 297 and 300 and through inverter 302 and to AND gates 296 and 299. The third input to AND gates 296, 297, 299 and 300 is the line 114 the source of which will be described later.

AND gate 297 generates an output signal on line 301 when there are ONE's in corresponding bit positions in shift register 72 and scan register 110. AND gate 299 generates an output signal on line 303 when there are ZERO's in corresponding bit positions in the two registers. Lines 301 and 303 are the input lines to OR gate 309. Therefore, there is an output signal on line 114$a$ from OR gate 309 when the most significant bit in shift register 72 is the same as the most significant bit in scan register 110. Line 114$a$ is connected as an input to compare circuit 290$b$ and performs the same functions in this circuit as the line 114 performs in compare circuit 290$a$. Output lines 114$b$–114$e$ from compare circuits 290$b$–290$e$, respectively, are similarly connected as conditioning inputs to compare circuits 290$c$–290$f$, respectively. Since compare circuit 290$f$ for the least significant bits in registers 72 and 110 does not have to generate a conditioning signal, this compare circuit contains only the mismatch AND gates 296 and 300.

AND gate 296 generates an output signal when there is a ONE in the bit position in scan register 110 and there is a ZERO in the corresponding bit position in shift register 72. This indicates that, at least in that bit position, the contents of scan register 110 are greater than that of register 72. The output from an AND gate 296 is applied to a line 116. Conversely, an output signal from an AND gate 300 means that, at least for that bit position, the contents of shift register 72 are greater than the contents of scan register 110. The output from an AND gate 300 is applied to a line 118. The lines 116 and 118 are applied to scan control circuit 120 to control it in a manner described in the general description section. A signal out of scan control circuit 120 on line 305 causes a higher track on table storage 68 to be scanned and an output on line 307 causes a lower track to be scanned. A suitable scan control circuit is shown in FIG. 4 and described later. The signals on lines 116 and 118 are also applied through OR gate 122, line 202, and short delay 203 to line 202'.

The signals on lines 76 from shift register 72 (FIG. 3$h$) are applied simultaneously to a plurality of AND gates 80–93 (FIG. 3$a$, etc.). The AND gates 80–92 are identical to the AND gates bearing like numbers in FIG. 1$a$, the only difference being that these gates also have a timing pulse input which will be described later. The only additional AND gate, AND gate 93, recognizes the end of track symbol. This is a special character which appears at the end of each track of table storage 68. The detection of this character indicates that an entry search should be continued on the next lower order track.

The output line 124 from AND gate 80 (FIG. 3$a$) is applied as one input to AND gate 306 (FIG. 3$d$), as one input to AND gate 310 (FIG. 3$a$), through short delay 312 (FIG. 3b), as one input to AND gate 314, and through inverter 316 (FIG. 3$a$) and line 318, as one input to AND gates 320, and 322 (FIG. 3$h$).

The output from $\epsilon_A$-detector AND gate 81 (FIG. 3$a$) is applied through line 128, as one input to AND gate 324 (FIG. 3$b$) and as one input to AND gate 130. The output from AND $\delta_M$-detector gate 82 (FIG. 3$a$) is applied through line 138 to the ONE-side input of flip-flop 326 and through inverter 328 as one input to AND gate 330. Flip-flop 326 will in the future, also be referred to as the $\delta_M$ flip-flop. The output from $\epsilon_M$ detector AND gate 83 is applied through line 144 as one input to AND gate 146 (FIG. 3$b$), and is also applied through OR gate 332 and line 334 as one input to AND gates 336 and 338. Line 334 is also connected through short delay 339 as the conditioning input to AND gates 288 (FIG. 3$f$) and is connected through inverter 340 and line 342 as the conditioning input to AND gates 292.

The output line 158 from $\delta_N$ detector AND gate 84 (FIG. 3$a$) is connected to the ONE-side input of flip-flop 344 and is also connected through inverter 346 and line 348 as one input to AND gate 350. Flip-flop 344 will often be referred to as the $\delta_N$ flip-flop. An output from $\delta_P$ detector AND gate 85 (FIG. 3$d$) on line 162 is applied to the ONE-side input of flip-flop 352 and is also applied through inverter 354 and line 356 as one input to AND gate 358. Flip-flop 352 will often be referred to as the $\delta_P$ flip-flop.

The output line 184 from $\tau$-detector AND gate 86 is connected as one input to AND gate 182. Output line 174 from $\alpha_2$-detector AND gate 87 is connected as one input to AND gate 172. Output line 168 from $\alpha_1$-detector AND gate 88 is connected through one-byte delay 170 and 171 as a second input to AND gate 172. The signal on line 168 is also applied as one input to AND gate 360 (FIG. 3$g$), as one input to AND gate 410, as one input to AND gate 362 (FIG. 3$e$), and through inverter 363 and line 365, as one input to AND gate 364, and OR gate 366 (FIG. 3$d$). The output from OR gate 366 is applied as one input to AND gate 370.

The output from *-detector AND gate 89 (FIG. 3$d$) is applied through line 232 and short delay 371 as one input to AND gate 372. The output from $\mu$-detector AND gate 90 (FIG. 3$g$) on line 212 is applied as one input to AND gate 374. The output from $\gamma$-detector AND gate 91 on line 376 is applied through inverter 378 and line 380 as a second input to AND gate 322 (FIG. 3$h$).

The output from $\nu$-detector AND gate 92 is applied through line 382 to one input of AND gate 308, to the ONE-side input of flip-flop 384 and through inverter 386 and line 388 as one input to AND gate 390. Flip-flop 384 will sometimes be referred to as the $\nu$ flip-flop. The output from $E_t$ (end of track) detector AND gate 93 on line 392 is applied as one input to AND gate 394.

Referring back to FIG. 3$d$, it is seen that AND gate 172 derives one of its inputs from the line 171 out of delay 170 and another input from line 174 out of AND gate 87. The third input to this AND gate is the output line 396 from the ZERO-side of flip-flop 398 (FIG. 3$g$). This flip-flop will be referred to as the $\phi$ flip-flop and the significance of this flip-flop will be apparent later. Output line 400 from AND gate 172 is connected to the ONE-side input of flip-flop 178$a$. Flip-flop 178$a$ will be referred to as the compare delay flip-flop. Its primary function is to delay the start of the comparison cycle one byte time so that comparison will not start until the $\alpha_2$ character has been shifted out of shift register 72. Output line 402 from the ONE side of flip-flop 178$a$ is connected as one input to AND gate 404, as one input to OR gate 406 (FIG. 3$e$) as one input to OR gate 412 (FIG. 3$e$) as one input to AND gate 414, as one input to AND gate 415 (FIG. 3$c$), as one input to OR gate 408, as one input to AND gate 418 (FIG. 3$h$), as one input to AND gate 434 (FIG. 3$g$), as the second input to AND gate 394, and as what will be referred to as the synchronizing input to six-bit counter 420. It is noticed that when signals appear on line 392 and 402, concurrently, AND gate 394 (FIG. 3$g$) is fully conditioned to generate an output signal on line 422, which signal is applied to scan control circuit 120 to cause it to back-track one track in a manner to be described later.

With reference to six-bit counter 420, it should be remembered that, while timing considerations were more or less ignored in the discussion of FIGS. 1$a$–1$b$, timing is somewhat critical and is considered in the description of the circuit of FIGS. 3$a$–3$i$. It is particularly important that all operations of the circuit be synchronized with the scanning of characters, particularly instruction characters, on table storage 68 (FIG. 3$h$). This problem is handled by counter 420.

Assume that table storage 68 has a timing track around its periphery and that the transducer which senses this track generates an output signal on line 424 each time that a character is sensed by the transducer scanning the entries on table storage 68. The signals on line 424 are applied to increment six-bit ring counter 420. Counter 420 is always reset to ZERO whenever a signal appears on line 402. This means that whenever an $\alpha_1\alpha_2$ combination is detected, counter 420 is reset to ZERO and for each bit sensed thereafter is incremented. After six bits have been sensed, or in other words, when a complete new byte has been applied to shift register 72 (FIG. 3*h*) counter 420 generates an output signal on line 426. A signal on line 426 therefore means that a complete character is now stored in shift register 72. After only three pulses have been applied to counter 420, an output signal appears on line 428. The significance of this half-byte time signal will be apparent later.

The signal on line 426 is applied as the conditioning input to each of the detector AND gates 80–86 and 90–93. Therefore, these detector AND gates can generate an output signal only when a complete character is in shift register 72. The reason why timing pulses are not applied to AND gates 87 and 88 will be described later. The signal on line 426 is also applied as one input to AND gate 362 (FIG. 3*e*), as the final input to AND gate 292 (FIG. 3*f*), as one input to AND gate 430 (FIG. 3*g*), as one input to AND gate 432, as one input to AND gate 434, as one input to AND gate 436, as one input to AND gate 438 (FIG. 3*h*), through delay 441 (FIG. 3*d*), as one input to AND gate 442, as the second input to AND gate 330 (FIG. 3*a*), as the second input to AND gate 350, as one input to AND gate 431, as one input to AND gate 433, as one input to AND gate 435 (FIG. 3*d*), as the second input to AND gate 358, as one input to AND gate 437, as one input to AND gate 439, as the input to the ZERO side of flip-flop 178*a*, as the second input to AND gate 404, as the input to the ZERO side of flip-flop 443 (FIG. 3*g*), as the second input to AND gate 390, and through delay 427 (FIG. 3*h*) as a third input to AND gate 322.

When AND gate 330 (FIG. 3*a*) is fully conditioned an output signal appears on line 445 which is applied to the ZERO-side input of $\delta_M$ flip-flop 326. When AND gate 350 is fully conditioned, an output signal appears on line 447, which is applied to the ZERO-side input of $\delta_N$ flip-flop 344. When AND gate 358 (FIG. 3*d*) is fully conditioned, an output signal appears on line 449, which signal is applied to reset the $\delta_P$ flip-flop 352 to its ZERO state. It is seen that each of the above flip-flops is reset to its ZERO state one byte time after it is set to its ONE state unless the same instruction is applied to shift register 72 during the next byte time. Compare delay flip-flop 178*a* and flip-flop 443 (FIG. 3*g*) are automatically switched to their ZERO state by a timing pulse on line 426 one byte time after they are switched to their ONE state. When AND gate 390 (FIG. 3*g*) is fully conditioned, an output signal is generated on line 451 which is applied to the ZERO-side input of flip-flop 384. Flip-flop 384 is therefore also reset to its ZERO state one byte time after it is switched to its ONE state unless a $\nu$ character is applied to shift register 72 during the next byte time.

Half-byte time line 428 from counter 420 (FIG. 3*g*) is connected to the ZERO-side input of flip-flop 819 (FIG. 3*i*), as one input to AND gates 440 (FIG. 3*e*) and 453 (FIG. 3*h*). The conditioning inputs to AND gate 453 will be described later. When AND gate 453 is conditioned, a half-byte pulse on line 428 is passed through it and through line 455 as one input to AND gate 450 (FIG. 3*b*) as one input to AND gate 462 (FIG. 3*a*), as the second input to AND gate 415 (FIG. 3*c*) as one input to AND gates 444, 448, and 698, and through delay 457 as the conditioning input to AND gates 220 (FIG. 3*f*).

The other input to AND gates 220 (FIG. 3*f*) are the lines 221 from numeral-1 code generator 222. The output lines 224 from AND gates 220 are applied as one input to OR gates 62. The outputs from OR gates 62 are applied through lines 452 as the information input to true-complement circuit 56. True-complement circuit 56 applies to lines 58 either the character applied to it from OR gate 62 over lines 452 or the complement of that character, depending on whether flip-flop 454 (FIG. 3*b*) is in its ONE or its ZERO state, respectively. The output from the ZERO side of flip-flop 454 is connected to true-complement circuit 56 through line 458. True-complement circuit 56 is a bank of six exclusive-OR gates, one input to each of the exclusive-OR gates being one of the six lines 452 and the other input being the line 458.

Referring back to FIG. 3*a*, the output from the ONE side of $\delta_M$ flip-flop 326 is connected by line 460 as a second input to AND gates 308 and 462, as one input to AND gates 464 (FIG. 3*b*), and 466, as one input to OR gates 468, and 470, and as one input to AND gate 472 (FIG. 3*e*). The output from the ZERO side of $\delta_M$ flip-flop 326 is connected by line 474 as one input to OR gate 475 (FIG. 3d) and as a second input to AND gate 370.

The output line 476 from the ONE side of $\delta_N$ flip-flop 344 (FIG. 3*a*) is connected as one input to OR gates 478 and 480. The output line 482 from the ZERO side of the $\delta_N$ flip-flop is connected as the third input to AND gate 370 (FIG. 3*d*), as the second input to AND gate 320 (FIG. 3*a*), as the second input to AND gate 442 (FIG. 3*d*), as one input to AND gate 484 (FIG. 3*e*) and as a second input to OR gate 475 (FIG. 3*d*).

The output line 486 from the ONE side of $\delta_P$ flip-flop 352 (FIG. 3*d*) is connected as the second input to OR gate 480 (FIG. 3*a*) and as one input to OR gate 488 (FIG. 3*b*). Output line 490 from OR gate 480, the inputs to which are the ONE-side outputs from the $\delta_P$ and the $\delta_N$ flip-flops, is connected as the second input to AND gate 431, the other input to this AND gate being a timing pulse on line 426. Therefore, one byte time after either the $\delta_P$ or the $\delta_N$ flip-flop is turned on, AND gate 431 generates an output signal on line 492 which is applied to switch flip-flop 494 to its ONE state. Flip-flop 494 will sometimes be referred to as the $\delta_S$ flip-flop. The signal on line 490 from OR gate 480 is also applied as one input to AND gate 496. Output line 498 from the ZERO side of $\delta_P$ flip-flop 352 (FIG. 3*d*) is connected as a third input to OR gate 475 and AND gate 442, as a second input to AND gate 484 (FIG. 3*e*), as a third input to AND gate 320 (FIG. 3*a*), and as a fourth input to AND gate 370 (FIG. 3*d*). Output line 499 from OR gate 475 (FIG. 3*d*) is connected as a third input to AND gate 322 (FIG. 3*h*).

The output line 500 from the ONE side of $\delta_S$ flip-flop 494 (FIG. 3*a*), is connected as the second input to AND gate 433. Since the other input to this AND gate is a timing pulse on line 426, AND gate 433 generates an output signal on line 502 to switch $\delta_S$ flip-flop 494 to its ZERO state one byte time after this flip-flop is switched to its ONE state. The signal on line 500 is also applied as one input to AND gate 504, and as one input to OR gate 506 (FIG. 3*b*). Output line 508 from the ZERO side of $\delta_S$ flip-flop 494 is connected as a fourth input to AND gate 320, as a fifth input to AND gate 370 (FIG. 3*d*), as a fourth input to AND gate 322 (FIG. 3*h*), and as one of the conditioning inputs to AND gate 453.

Referring back to AND gate 404 in FIG. 3*d*, it is seen that one input to this AND gate is the output line 402 from the ONE side of compare delay flip-flop 178*a* and a second input to this AND gate is timing pulse line 426. The third input to this AND gate is the output line 510 from the ZERO side of flip-flop 180*b*. This flip-flop will be referred to as the function flip-flop, and, as will be seen later, is in its ONE state when function characters are being applied by table storage 68 to shift registers 72. Therefore, AND gate 404 is fully conditioned one byte time after compare delay flip-flop 178*a* is switched to its ONE state unless the circuit is for some reason in function readout. The output from AND gate 404 on line 512 is connected to the ONE-side input of flip-flop 178*b* and as one input to OR gate 513.

Flip-flop 178*b* will generally be referred to as the compare flip-flop. The output line 514 from the ONE side of compare flip-flop 178*b* is connected as a second input to AND gate 182, as the other input to AND gate 372, as the third input to AND gate 308 (FIG. 3*a*), as one input to AND gate 516 (FIG. 3*d*), as a second input to OR gate 513, as the second input to AND gate 360 (FIG. 3*g*), as a second input to AND gate 362 (FIG. 3*e*), as the other input to OR gate 412, as the sixth input to AND gate 370 (FIG. 3*d*), as the second input to OR gate 506 (FIG. 3*b*), as the second input to AND gate 466, as a second input to OR gate 406 (FIG. 3*e*), and as one input to AND gate 518 (FIG. 3*c*). Output line 519 from OR gate 513 (FIG. 3*d*) is connected as the fourth input to AND gate 442. Output line 520 from the ZERO side of compare flip-flop **178*b* is connected as a second input to AND gate 440** (FIG. 3*e*).

Referring back to AND gate 182 in FIG. 3*d*, it is seen that one input to this AND gate is the output line 184 from $\tau$-detector AND gate 86 and that a second input to this AND gate is the output line 514 from the ONE side of compare flip-flop **178*b*. The third input to this AND gate is the line 522 from scan control circuit 120** (FIG. 3*h*). As will be seen later, line 522 has a signal on it when an entry search is being performed on table storage 68 as opposed to a track search. It will be remembered from previous discussions, that a match had during track search could be on an entry other than the entry which would give the most significant match. Therefore, such a match is always interpreted as a less-than condition and a match is accepted only if it occurs during entry search. The application of the line 522 to AND gate 182 prevents the occurrence of a match during track search. Output line 524 from AND gate 182 is connected to the ONE-side input of flip-flop **180*a*. Flip-flop 180*a* is generally referred to as the function-delay flip-flop. The primary function of flip-flop 180*a* is to delay the start of function readout until the character $\tau$ has been shifted out of register 72** (FIG. 3*h*). Output line 526 from the ONE side of function-delay flip-flop **180*a* is connected as a second input to AND gate 435, as a second input to AND gate 516, as one input to OR gate 528, as one input to AND gate 532** (FIG. 3*g*), as a third input to AND gate 440 (FIG. 3*e*), and as a third input to OR gate 406. The output line 534 from the ZERO side of function-delay flip-flop **180*a* is connected as a second input to AND gate 310** (FIG. 3*a*), and as one input to AND gate 538 (FIG. 3*h*).

Referring back to FIG. 3*d*, it is seen that AND gate 435 has as one input a timing pulse on line 426 and as a second input the output line from line 526 and the ONE side of function-delay flip-flop **180*a*. A third input to this AND gate is the output line 510 from the ZERO side of function flip-flop 180*b* and the final input to this AND gate is the output line 540 from the ZERO side of flip-flop 443** (FIG. 3*g*). Therefore, assuming that neither flip-flop **180*b* or 443 are in their ONE states, one byte time after function delay flip-flop 180*a* is switched on, AND gate 435 generates an output signal on line 542 which signal is applied to the ONE-side input of function flip-flop 180*b*. The signal on line 542 is also applied as one input to OR gate 544** (FIG. 3*g*) and as the input to the ZERO side of flip-flop 546. Flip-flop 546 will be referred to as the $\rho_S$-flip-flop.

Output line 548 from the ONE side of function flip-flop **180*b* is connected as one input to OR gate 549 and as the second input to OR gate 528, as the fifth input to AND gate 320, as one input to AND gate 550** (FIG. 3*e*), as the fourth input to AND gate 322 (FIG. 3*h*), as the reset input to scan control circuit 120 (the significance of this will be explained later), as the second input to AND gate 472 (FIG. 3*e*), as the second input to AND gate 464 (FIG. 3*b*), as the second input to AND gate 324, as the second input to AND gate 504 (FIG. 3*a*), as the third input to AND gate 462, as one input to AND gate 552 (FIG. 3*b*), as the second input to AND gate 130, and as the second input to AND gate 448 (FIG. 3*c*). In addition to being connected as one input to AND gates 404 and 435, output line 510 from the ZERO side of function flip-flop **180*b* is connected as the fourth input of AND gate 440** (FIG. 3*e*), as a third input to AND gate 484, as a second input to AND gate 414, as a second input to AND gate 438 (FIG. 3*h*), and as the second input to AND gate 432 (FIG. 3*g*).

If there is a signal on either line 526 or line 548, meaning that either function-delay flip-flop **180*a* or function flip-flop 180*b* is in its ONE state, OR gate 528** (FIG. 3*d*) generates an output signal on line 556 which is applied as the second input to AND gate 306, the other input to this AND gate being the output line 124 from $\tau_E$ detector AND gate 80. The output line 558 from AND gate 306 is connected to the ONE-side input of flip-flop 560. Output line 562 from the ONE side of this flip-flop is connected as the second input to AND gate 532 (FIG. 3*g*), as a third input to AND gate 438 (FIG. 3*h*), as the third input to AND gate 310 (FIG. 3*a*), as a second input to OR gate 470 (FIG. 3*b*), as a third input to AND gate 314 (FIG. 3*b*), and as a second input to AND gate 538 (FIG. 3*h*).

When signals appear on lines 526 and 562, indicating that flip-flops **180*a* and 560 are in their ONE state, AND gate 532** (FIG. 3*g*) generates an output signal on line 564 which is applied to the ONE-side input of $\phi$ flip-flop 398. Output line 566 from the ONE side of flip-flop 398 is connected as the fourth input to AND gate 438. Output line 396 from the ZERO side of this flip-flop is as previously indicated connected as one input to AND gate 172. One byte time after a signal appears on line 510 (from the ZERO-side of function flip-flop **180*b*), or in other words, when a signal appears simultaneously on lines 510 and 426, AND gate 432** (FIG. 3*g*) is fully conditioned to generate an output signal on line 567 which signal is applied to the ZERO-side inputs of flip-flops 398 and 560 (FIG. 3*d*). When signals simultaneously appear on lines 426, 510, 562, and 566, AND gate 438 (FIG. 3*h*), is fully conditioned to generate an ouput signal on line 568. This signal is interpreted to mean that the properly translated sentence is stored in output region 41 of memory 40 and is ready to be read out.

Output line 556 from OR gate 528 (FIG. 3*d*) is also connected as a second input to AND gate 374 (FIG. 3*g*) as the second input to AND gate 410, and as one input to OR gate 569 (FIG. 3*h*). This means that whenever there is a signal on line 168 meaning that an $\alpha_1$ character has been detected, and there is either an output signal on line 526 or 548, indicating that either flip-flop **180*a* or 180*b* is in its ONE state, AND gate 410** (FIG. 3*g*) generates an output signal on line 570. This signal is delayed slightly for reasons to be described later in delay 572 and then applied as the input to the ONE side of flip-flop 443. During the next byte time, flip-flop 443 is reset to its ZERO state by a signal on line 426.

Output line 574 from the ONE side of flip-flop 443 (FIG. 3*g*) is connected as the other input to AND gate 439 (FIG. 3*d*), as the second input to OR gate 549, and as one input to OR gate 594 (FIG. 3*h*). Output line 576 from AND gate 439 (FIG. 3*d*) is connected to the ZERO-side input of function flip-flop **180*b* and output line 577 from OR gate 549 is connected as the second input to AND gate 437. Output line 578 from AND gate 437 is connected to the ZERO-side input of function delay flip-flop 180*a*. As was previously indicated, output line 540 from the ZERO side of flip-flop 443** (FIG. 3*g*) is connected as one input to AND gate 435 (FIG. 3*d*). The line 540 is also connected as one input to AND gate 580 (FIG. 3*b*), and as an input to AND gate 320 (FIG. 3*a*).

As indicated previously, delay-function-or-function line 556 is connected as one input to AND gate 374 (FIG. 3*g*), a second input to this AND gate being output line 212 from $\mu$ detector AND gate 90. The third input to this AND gate is output line 582 from the ZERO side of $\rho_S$ flip-flop 546. Output line 584 from AND gate 374 is connected to the ONE-side input of flip-flop 586.

Flip-flop 586 will be referred to as the $\mu$ flip-flop. Output line 588 from the ONE side of $\mu$ flip-flop 586 is connected through one-byte delay 590 to the ZERO-side input of this flip-flop. Flip-flop 586 is therefore reset to its ZERO state one byte time after it is set to its ONE state. Line 588 is also connected as the second input to AND gate 430, and as one input to OR gates 592 (FIG. 3*h*), and 594. Output line 596 from the ZERO side of $\mu$ flip-flop 586 is connected as the sixth input to AND gate 320 (FIG. 3*a*), and as a second input to AND gate 580 (FIG. 3*b*).

Since one input to AND gate 430 (FIG. 3*g*) is the output line 588, from the ONE side of $\mu$ flip-flop 586, and the other input to this AND gate is timing pulse line 426, this AND gate is fully conditioned one byte time after $\mu$ flip-flop 586 is turned on. Output line 598 from this AND gate is connected to the ONE-side input of $\rho_S$ flip-flop 546. Output line 600 from the ONE side of $\rho_S$ flip-flop 546 is connected as the third input to AND gate 434, as the second input to AND gate 550 (FIG. 3*e*), as a third input to OR gate 470 (FIG. 3*b*) and as one input to OR gate 602. Output line 582 from the ZERO side of $\rho_S$ flip-flop 546, in addition to being connected as one input to AND gate 374 is also connected as a third input to AND gate 538 (FIG. 3*h*), and as the third input to AND gate 414 (FIG. 3*e*).

AND gate 434 (FIG. 3*g*) has as one of its inputs the output line 600 from the ONE side of $\rho_S$ flip-flop 546, as a second input the output line 402 from the ONE side of compare delay flip-flop 178*a*, and as its third input timing pulse line 426. When this AND gate is fully conditioned, an output signal appears on line 604, which line is connected to the ONE-side input of flip-flop 606. Flip-flop 606 is generally referred to as the $\rho$ flip-flop. Output line 608 from the ONE side of $\rho$ flip-flop 606 is connected as the second input to AND gate 418 (FIG. 3*h*), as the second input to AND gate 364 (FIG. 3*e*) and as a third input to AND gate 362. Output line 610 from the ZERO side of $\rho$ flip-flop 606 is connected as the second input to OR gate 366 (FIG. 3*d*).

When signals appear simultaneously on line 514 from the ONE side of compare flip-flop 178*b* and on output line 168 from $\alpha_1$ detector AND gate 88, AND gate 360 (FIG. 3*g*) is fully conditioned to generate an output signal on line 612. Line 612 is connected as the second input to OR gate 544, the other input to this OR gate being the output line 542 from AND gate 435 (FIG. 3*d*). Output line 614 from OR gate 544 is connected as the second input to AND gate 436 (FIG. 3*g*), the other input to this AND gate being the timing pulse line 426. Output line 616 from AND gate 436 is connected to the ZERO-side input of $\rho$ flip-flop 606.

When signals occur simultaneously on line 365 [meaning that there is no signal on output line 168 from $\alpha_1$ detector AND gate 88 (FIG. 3*d*)] and line 608 from the ONE side of $\rho$ flip-flop 606 and AND gate 364 (FIG. 3*e*) is fully conditioned to generate an output signal on line 618. When signals occur simultaneously on output line 548 from the ONE side of function flip-flop 180*b* and output line 600 from the ONE side of $\rho_S$ flip-flop 546, AND gate 550 (FIG. 3*e*) is fully conditioned to generate an output signal on line 620. Lines 618 and 620 are the two inputs to OR gate 622, the output line 624 from which is connected as one input to OR gate 626 (FIG. 3*b*), and through inverter 628, as the second input to AND gate 450. The other input to AND gate 450 is the beforementioned timing pulse line 455. Output line 630 from AND gate 450 is connected as one input to OR gate 632. Output line 634 from OR gate 626 is connected to the ZERO-side input (the subtract side) of add-subtract flip-flop 454 while output line 636 from OR gate 632 is connected to the ONE-side input (the add-side input) of flip-flop 454. Therefore, if at the half-byte time when a signal appears on line 428 [from 6-bit counter 420 (FIG. 3*g*)], OR gate 622 (FIG. 3*e*) generates an output signal on line 624, true-complement circuit 56 (FIG. 3*f*) is then in its subtract mode while if, at this time, in the cycle, there is no signal on line 624, true-complement circuit 56 is in its add mode.

The other input to subtract OR gate 626 (FIG. 3*b*) is output line 638 from OR gate 478. One input to OR gate 478 is output line 476 from the ONE side of $\delta_N$ flip-flop 344. The other input to OR gate 478 is output line 640 from AND gate 338. ONE input to AND gate 338 is the beforementioned output line 334 from OR gate 332. The other inputs to this AND gate are index timing signals which will be described later.

The other input to add OR gate 632 is output line 642 from OR gate 488. As mentioned previously, one input to OR gate 488 is output line 486 from the ONE side of $\delta_P$ flip-flop 352. The other input to this OR gate is output line 643 from AND gate 336. Line 334 forms one input to AND gate 336, the other two inputs to this AND gate being index timing pulses which will be described later.

Output lines 638 and 642 from OR gates 478 and 488 are connected as the two inputs to OR gate 644 (FIG. 3*e*). Output line 646 from OR gate 644 is connected as the conditioning input to AND gates 648 (FIG. 3*f*). The information inputs to AND gates 648 are derived from OR gates 650 through lines 652. One set of inputs to OR gates 650 are the output lines 654 from AND gates 288 while the other set of inputs to these OR gates are the output lines 656 from AND gates 292. The inputs to the two last-mentioned AND gates have been previously described. The outputs from AND gates 648 are applied through lines 658 to OR gates 62. As mentioned previously, the outputs from OR gates 62 are applied through lines 452 to true-complement circuit 56.

Referring back to FIG. 3*g*, the output from the ZERO side of $\nu$ flip-flop 384 is applied through line 660 as the fifth and final input to AND gate 442 (FIG. 3*d*). AND gate 442 therefore generates an output signal on line 114 a short time after a timing pulse is applied to line 426 if neither the $\delta_N$, the $\delta_P$, nor the $\nu$ flip-flops are in their ONE state and the compare flip-flop is in its ONE state, or is being switched to its ONE state. As previously indicated, output line 114 from AND gate 442 is applied to condition compare circuit 290*a* (FIG. 3*i*) to start a comparison operation.

It will be remembered that FIG. 1*a* contained an index register 234 which was set to various states and started incrementing when certain operations were performed or when certain characters were detected in shift register 72 and which incremented one position during each byte time thereafter until it reached what was referred to as its fourth condition or fourth state. Flip-flops 662 and 664 in FIG. 3*c* and the circuitry related to these flip-flops perform the functions of this index register. The register is in its first state when both flip-flops 662 and 664 are in their ZERO state. Only flip-flop 662 is in its ONE state when the register is in its second state; only flip-flop 664 is in its ONE state when the register is in its third state; and both flip-flops are in their ONE state when the circuit is in its fourth state.

Flip-flop 662 is switched to its ONE state by a signal on line 666 from OR gate 668. Flip-flop 664 is switched to its ONE state by a signal on line 670 from OR gate 416. One input to OR gate 668 is output line 671 from OR gate 673 (FIG. 3*b*). One input to OR gate 673 is output line 676 from AND gate 440 (FIG. 3*e*). The four inputs to this AND gate have been previously described. The other input to OR gate 673 is output line 718 from AND gate 462 (the other inputs to which have also been previously described). Line 676 is also connected as one input to OR gate 678 (FIG. 3*a*), and line 671 is also connected as one input to OR gate 680 (FIG. 3*c*).

The other input to OR gate 668 (FIG. 3*c*) is output line 682 from AND gate 444 (FIG. 3*c*). One input to this AND gate is timing pulse line 455 and the other input to this AND gate is output line 684 from OR gate 408. One input to OR gate 408 is output line 402 from the ONE side of compare-delay flip-flop 178*a* (FIG. 3*d*). A second input to this OR gate is output line 686 from AND gate 518. The third input to this OR gate is output line 688 from AND gate 690. The two inputs to AND gate 518 are output line 514 from the ONE side of compare flip-flop 178*b* (FIG. 3*d*) and output line 689 from AND gate 691. The two inputs to AND gate 691 are output lines 692 and 702 from the ZERO side of flip-flops 662 and 664, respectively. AND gate 691 is therefore conditioned only when the circuit is in its first state. The two inputs to AND gate 690 are output lines 692 and 694 from the ZERO side of flip-flop 662 and the ONE side of flip-flop 664, respectively. This means that AND gate 690 is conditioned only when the circuit is in its third state.

One input to OR gate 416 (FIG. 3*c*) is output line 695 from AND gate 415, the inputs to this AND gate being output line 402 from the ONE side of compare-delay flip-flop 178*a* and timing pulse line 455. The other input to OR gate 416 is output line 696 from AND gate 698. The three inputs to AND gate 698 are output lines 700 and 702 from the ONE side of flip-flop 662 and the ZERO side of flip-flop 664, respectively, and timing pulse line 455. The signal on line 696 is also applied as one input to OR gate 706, and as a fourth input to OR gate 406 (FIG. 3*e*).

The input to the ZERO side of flip-flop 662 is output line 704 from OR gate 706. The input to the ZERO side of flip-flop 664 is the output line 708 from OR gate 680. One input to OR gates 680 and 706 is output line 710 from AND gate 372 (FIG. 3*d*). One input to this AND gate is the output from delay 371 (this being a signal from asterisk detector AND gate 89) and the other input to this AND gate is output line 514 from the ONE side of compare flip-flop 178*b*. A second input to OR gates 680 and 706 is output line 712 from AND gate 308 (FIG. 3*a*). The inputs to this AND gate have been previously described. A third input to OR gates 680 and 706 is output line 716 from AND gate 448. One input to this AND gate is the output line 548 from the ONE side of function flip-flop 180*b*. A second input to this AND gate is timing pulse line 455. The other two inputs to this AND gate are the output lines 694 and 700 from the ONE sides of flip-flops 664 and 662, respectively. The final input to OR gate 680 is the beforementioned output line 671 from OR gate 673 (FIG. 3*b*) and the final input to OR gate 706 is the beforementioned output line 696 from AND gate 698 (FIG. 3*c*).

In addition to the connections already indicated, output line 700 from the ONE side of flip-flop 662 is connected as one input to EXCLUSIVE OR gate 722, as one input to AND gate 724 (FIG. 3*b*), as one input to AND gate 338, and as the third input to OR gate 506. In addition to the connections previously mentioned, output line 692 from the ZERO side of flip-flop 662 is connected as one input to OR gate 726 (FIG. 3*b*) and as one input to AND gate 336. In addition to the connections previously mentioned, output line 694 from the ONE side of flip-flop 664 is connected as the other input to EXCLUSIVE OR gate 722, as the final input to AND gate 336 (FIG. 3*b*), and as the final input to OR gate 506. Finally, in addition to the connections previously mentioned, output line 702 from the ZERO side of flip-flop 664 is connected as the other input to AND gate 724 (FIG. 3*b*), as the final input to AND gate 338, and as the other input to OR gate 726.

EXCLUSIVE OR gate 722 (FIG. 3*c*) may be any standard circuit which is capable of generating an output if input signals are applied to either one or the other but not both of its input lines. Output line 730 from EXCLUSIVE OR gate 722 is connected as the second input to AND gate 146 (FIG. 3*b*), as the third input to AND gate 130, and through inverter 731 as the third input to AND gate 580. Output line 732 from AND gate 580, the inputs to which have been described, is connected as the second input to OR gate 602, the other input to this OR gate being the output line 600 from the ONE side of $\rho_S$ flip-flop 546 (FIG. 3*g*). Output line 734 from OR gate 602 is connected as the seventh and final input to AND gate 322 (FIG. 3*h*). Output line 736 from AND gate 322 is connected as the conditioning input to AND gates 294 (FIG. 3*f*) and as one input to OR gate 738. When AND gates 294 are conditioned by a signal on line 736, they pass the contents of shift register 72 on lines 76 through AND gates 294 and lines 740 to OR gates 742. Output lines 744 from OR gates 742 are connected to drivers 278. The final inputs to OR gates 742 are derived from AND gates 746 through lines 748. The information input to AND gates 746 is derived from a signal source 750 through lines 752. Signal source 750 causes signals to appear on all six lines 752. The conditioning input to AND gates 746 is derived from OR gate 754 through line 756. Line 756 is also connected as the other input to OR gate 738, the output line 758 from this OR gate being connected as the conditioning input to AND gates 270 and through inverter 759, as the conditioning input to AND gates 283. Therefore, a signal on either line 736 or 756 causes the contents of MAR to be applied to trigger drivers 274 and will cause some information to be applied through OR gate 742 to drivers 278.

One input to OR gate 754 (FIG. 3*f*) is output line 760 from AND gate 552 (FIG. 3*b*). As has been previously indicated, one input to this AND gate is the output line 548 from the ONE side of function flip-flop 180*b*. The other input to this AND gate is the output line 762 from OR gate 468. One input to the OR gate 468 is output line 460 from the ONE side of $\delta_M$ flip-flop 326. The other input to this OR gate is output line 764 from AND gate 724. The inputs to AND gate 724 are the output lines 700 and 702, from flip-flops 662 and 664, respectively. The second input to OR gate 754 (FIG. 3*f*) is output line 766 from AND gate 484 (FIG. 3*e*). Three of the inputs to this AND gate are the output lines 482, 498, and 510 from the ZERO side of the $\delta_N\delta_P$ and function flip-flops, respectively. The final input to this AND gate is output line 768 from OR gate 412. The inputs to OR gate 412 are the output lines 402 and 514 from the ONE side of the compare-delay and compare flip-flops, respectively.

All of the conditioning inputs to AND gates 130 and 146 (FIG. 3*b*) have been previously described. Output line 770 from AND gate 130 is connected through short delay 771 as the conditioning input to AND gates 134 (FIG. 3*c*), the information input to these AND gates being the output lines 136 from adder 54. Output lines 772 from AND gates 134 are connected to AIR 102. Output line 774 from AND gate 146 (FIG. 3*b*) is connected through short delay 775 as the conditioning input to AND gates 148 (FIG. 3*c*), the information input to these AND gates also being the lines 136. Output lines 776 from AND gates 148 are connected as the input to MSKR 104.

Output lines 778 from AIR 102 (FIG. 3*c*) are connected as the information input to AND gates 230. The conditioning input to these AND gates is output line 780 from OR gate 782. The output line 780 is also connected as one input to OR gate 783. One input to OR gate 782 is output line 784 from AND gate 516 (FIG. 3*d*). One input to this AND gate is the output line 526 from the ONE side of function-delay flip-flop 180*a* and a second input to this AND gate is output line 514 from the ONE side of compare flip-flop 178*b*. The final input to this AND gate is derived from mismatch line 202'. The other input to OR gate 782 (FIG. 3*c*) is output line 786 from OR gate 788 (FIG. 3*e*). The inputs to OR gate 788 are the output lines 790 and 792 from AND gates 362 and 414, respectively. The inputs to these AND gates have been previously described.

The output from MSKR 104 (FIG. 3c) is applied through lines 794 as the information input to AND gates 140. The conditioning input to these AND gates is output line 796 from OR gate 674 (FIG. 3b). Line 796 is also connected as the second input to OR gate 783. One input to OR gate 674 is output line 672 from AND gate 464. The other input to this OR gate is the output line 798 from AND gate 466. The inputs to AND gates 464 and 466 have been previously described.

Output lines 136 from adder 54 (FIG. 3f) are also connected as the information inputs to AND gates 800 (FIG. 3c) and 802 (FIG. 3f). The output lines 804 from AND gates 800 are applied to process limit register (PLR) 806. As will be seen later, this register is used to store the address in memory 10 where output data is to be stored. The conditioning input to AND gates 800 is output line 808 from AND gate 538 (FIG. 3h). Three inputs to this AND gate are the output lines 534, 562, and 582 from the ZERO side of function-delay flip-flop 180a (FIG. 3d), the ONE side of output flip-flop 560, and the ZERO side of $\rho_S$ flip-flop 546 (FIG. 3g). The final input to this AND gate is output line 810 from OR gate 594 (FIG. 3h). The inputs to OR gate 594 are the output lines 574 and 588 from the ONE sides of $\alpha_1$ flip-flop 443 and $\mu$ flip-flop 586.

Output lines 812 from PLR 806 (FIG. 3c) are connected as the information inputs to AND gates 814. The conditioning input to these AND gates is output line 816 from AND gate 314 (FIG. 3b). Line 816 is also connected as the final input to OR gate 783. The inputs to AND gate 314 have been previously described. Output line 817 from OR gate 783 is connected to the ONE-side input of flip-flop 819 (FIG. 3i). Output line 821 from the ZERO side of flip-flop 819 is connected through OR gate 569 as one of the conditioning inputs to AND gate 453.

The conditioning input to AND gates 802 (FIG. 3f) is derived from OR gate 818 (FIG. 3c) through line 820. One input to OR gate 818 is output line 822 from OR gate 824 (FIG. 3a). The inputs to AND gate 824 are the output lines 826, 828, and 830, from AND gate 496, 310, and 504, respectively. Of the inputs to these three AND gates, the only one which has not previously been described is output line 832 from OR gate 506 (FIG. 3b) which is connected as the second input to AND gate 496. All the inputs to OR gate 506 have been previously described. The other input to OR gate 818 (FIG. 3c) is output line 834 from OR gate 678 (FIG. 3a). One input to this OR gate is output line 836 from AND gate 320. All the inputs to AND gate 320 have been previously described except output line 838 from OR gate 470 (FIG. 3b). All of the inputs to OR gate 470 have been previously described except the output line 840 from OR gate 726. The second input to OR gate 678 (FIG. 3a) is the previously described output line 676 from AND gate 440 (FIG. 3e). The final input to OR gate 678 is output line 842 from AND gate 370. All of the inputs to this AND gate have been previously described.

Output lines 844, 846, 848 and 850 from AND gates 140 (FIG. 3c), 230, 802 (FIG. 3f) and 814 (FIG. 3c), respectively, are connected as inputs to control gates 48 (FIG. 3f). Signals on these output lines are applied through control gates 48 and lines 50 to MAR 46. The number ($m$) of lines 50 depends on the size of MAR which in turn depends on the size of memory 40. The final input to control gates 48 is output line 231 from OR gate 592 (FIG. 3h). Line 231 is also connected through inverter 855 as the final conditioning input to AND gate 453. One input to OR gate 592 is output line 588 from the ONE side of $\mu$ flip-flop 586. The other input to this OR gate is output line 856 from AND gate 418. The inputs to AND gate 418 are the output lines 402 and 608 from the ONE side of compare-delay flip-flop 178a and from the ONE side of $\rho$ flip-flop 606, respectively. When a signal is applied to line 231, control gates 48 cause signals to be applied to lines 50 to set the address of the last address in prefix region 42 into MAR 46.

Finally, output line 858 from AND gate 472 (FIG. 3e), the inputs to which have been previously described, is connected as the fifth and final input to OR gate 406. Output line 860 from OR gate 406 is connected as the conditioning input to AND gates 284 (FIG. 3f), the information input to these AND gates being output lines 282 from memory 10.

SCAN CONTROL CIRCUIT

FIG. 4 shows a scan control circuit suitable for use as the scan control circuit 120 in FIGS. 1b and 3h. Lines 116, the lines on which a signal appears if the contents of scan register 110 are greater than the contents of shift register 72 are connected as the inputs to OR gate 870 (FIG. 4). Output line 872 from OR gate 870 is connected as one input to AND gates 874, 876, and 878. Lines 118, the lines on which a signal appears if the contents of shift register 72 are greater than the contents of scan register 110 are connected as the inputs to OR gate 880. Output line 882 from OR gate 880 is connected as one input to AND gates 884, 886, and 888.

Output line 890 from AND gate 874 is connected to the ONE-side input of flip-flop 892. Flip-flop 892 will generally be referred to as the advance-direction flip-flop. Output line 894 from the ONE side of advance-direction flip-flop 892 is connected as the second input to AND gates 876 and 884. Output line 895 from the ZERO side of the advance-direction flip-flop is connected as a second input to AND gate 886. Output line 896 from AND gate 884 is connected to the ZERO-side input of advance-direction flip-flop 892 and to the ONE-side input of flip-flop 898. Flip-flop 898 will be referred to as the entry-search flip-flop.

The input to the ZERO side of flip-flop 898 is output line 548 from the ONE side of function flip-flop 180b (FIG. 3d). Output line 522 from the ONE side of entry-search flip-flop 898 is connected as one input to AND gate 900 and is also connected as one input to AND gate 182 (FIG. 3d). Output line 902 from the ZERO side of entry-search flip-flop 898 is connected as the other input to AND gate 874 and as the third input to AND gate 886.

Output line 904 from AND gate 886 is connected to the ONE-side input of flip-flop 906. Flip-flop 906 will be referred to as the back-direction flip-flop. Output line 908 from the ONE side of back-direction flip-flop 906 is connected as the second input to AND gates 878 and 888. Output line 910 from AND gate 878 is connected to the ZERO-side input of back-direction flip-flop 906. Output lines 912 and 914 from AND gates 888 and 900, respectively, are connected as the inputs to OR gate 916. Output line 307 from OR gate 916 is connected to an actuator mechanism (not shown) to move the transducer sensing table storage 68 to a next lower order track. Output line 305 from AND gate 876 is connected to the actuator mechanism (not shown) to move the transducer sensing table storage 68 to the next higher-order track.

DETAILED OPERATION

The operation of the circuit shown in FIGS. 3a–3i and FIG. 4 will be illustrated by showing how it performs the first few operations of the flow diagram of FIG. 5 on the sentence "he went home and ate lunch." It will be remembered that the object of the operations shown in FIG. 5 is to link verbs with their verbal complements. The first operation to be described will be a search right operation to find the end of the sentence.

*Is word end of sentence:*

Assume that the circuit has just completed a preceding step so that it is running. Then, referring to the timing chart of FIG. 7, it is seen that just before the first operation of the present step commences, function flip-flop 180*b* (FIG. 3*d*), and $\rho_S$ flip-flop 546 (FIG. 3*g*) and add-subtract flip-flop 454 are in their ONE state and all other flip-flops are in their ZERO state. MSKR 104 (FIG. 3*c*), PLR 806, and MAR 46 have various undefined addresses stored in them, and AIR 102 has the address of the asterisk for the word "he" stored in it. Region 40 of memory 10 has the sentence "he went home and ate lunch" stored in it. Prefix region 42 of memory 10 has the prefix $\rho_1$ stored in its last address position and the character $\alpha_1$ stored in its next-to-the-last address position.

At this time, an $\alpha_1$ character is applied to shift register 72 (FIG. 3*h*). This character is applied by lines 76 to AND gate 88 (FIG. 3*d*) causing an output signal on line 168 which is applied to one-byte delay 170. The signal on line 168 is also applied through AND gate 410 (which, since flip-flop **180*b* is in its ONE state, is conditioned at this time) to delay 572. A fraction of a bit time later, delay 572 applies a signal to the ONE-side input of $\alpha_1$ flip-flop 443** to switch this flip-flop to its ONE state.

One byte time later, an $\alpha_2$ character is stored in shift register 72. This character is applied by lines 76 to AND gate 87, causing an output signal on line 174. As was indicated previously, $\phi$ flip-flop 398 is in its ZERO state, so that there is a signal on ZERO-side output line 396 from this flip-flop. Since one-byte delay 170 is also generating an output signal on its line 171 at this time, AND gate 172 (FIG. 3*d*) is fully conditioned to generate an output signal on line 400, which signal switches compare-delay flip-flop **178*a*** to its ONE state.

It is noted that timing pulse line 426 is connected as a conditioning input to each of the recognizer AND gates 80–93, except the $\alpha_1$ and $\alpha_2$ recognizer AND gates 88 and 87. The reason for this is that, as was mentioned previously, the $\alpha_1\alpha_2$ character is a unique one which cannot be generated by any combination of parts of two or more successive characters. Therefore, no timing pulse is necessary to assure the proper detection of these characters, and, in fact, the detection of these characters is used to synchronize the timing pulses. This is accomplished by applying output line 402 from the ONE side of compare-delay flip-flop **178*a* to reset 6-bit counter 420** (FIG. 3*g*) to zero, thereby synchronizing it with the reading of characters from table storage 68. Line 402 is also connected as one input to AND gate 404 and as a conditioning input to AND gates 434 (FIG. 3*g*) and 418 (FIG. 3*h*).

At the same time that flip-flop **178*a* is being switched to its ONE state, the timing pulse on line 426 is being applied through AND gate 439** (FIG. 3*d*), which gate is conditioned at this time by the signal on ONE-side output line 574 from $\alpha_1$ flip-flop 443, to reset function flip-flop **180*b* to its ZERO state. The same timing pulse is also applied to reset $\alpha_1$ flip-flop 443** to its ZERO state.

One byte time later, when synchronized counter 420 generates an output signal on line 426, two functions are performed. First, the signal on line 426 is applied through now-conditioned AND gate 434 (FIG. 3*g*) and line 604, to switch $\rho$ flip-flop 606 to its ONE state. Output line 608 from the ONE side of $\rho$ flip-flop 606 is connected as the other conditioning input to AND gate 418 (FIG. 3*h*). Therefore, when flip-flop 606 is switched to its ONE state, AND gate 418 generates an output signal on line 856, which signal is applied through OR gate 592 and line 231 to control gates 48 (FIG. 3*f*) to cause the last address in prefix region 42 to be applied through lines 50 to MAR 46. Since $\delta_N$ flip-flop 344, $\delta_P$ flip-flop 352, and function flip-flop **180*b* are in their ZERO states, and compare-delay flip-flop 178*a* is in its ONE state, signals appear on lines 482, 498, 510, and 402. The signal on line 402 is applied through OR gate 412** (FIG. 3*e*) to line 768. Signals on the above-mentioned lines fully condition AND gate 484 to generate an output signal on line 766, which signal is applied through OR gate 754 (FIG. 3*f*), to line 756. The signal on line

756 is applied through OR gate 738 and line 758 to condition AND gates 270 to apply the address in MAR 46 through lines 272 to drivers 274 and is also applied to condition AND gates 746 to pass signals through lines 748, OR gates 742 and lines 744 to trigger drivers 278. This reads the prefix character $\rho_1$ stored in the last address in prefix region 42 out onto lines 282. The signal on line 402 is also applied through OR gate 406 (FIG. 3*e*) and line 860 to condition AND gates 284 (FIG. 3*f*) to apply the signals being applied to lines 282 through lines 286 to scan register 110. The prefix character $\rho_1$ is in this way stored in scan register 110.

At the same time that the above operations are being performed, the signal on line 426 is also being applied to AND gate 404 (FIG. 3*e*) which is conditioned at this time by the signals on lines 402 and 510. The resulting output signal on line 512 from AND gate 404 is applied to switch compare flip-flop **178*b*** to its ONE state.

Finally, the timing pulse on line 426 is applied to AND gate 442 (FIG. 3*f*), which AND gate is fully conditioned at this time by signals on lines 482, 498, 660, and the output line from OR gate 513 one input to which is output line 512 from fully conditioned AND gate 404. Output line 114 from AND gate 442 is connected as a conditioning input to AND gates 296, 297, 299, and 300 of comparator **290*a*** (FIG. 3*i*). A compare operation is therefore attempted between the highest-order bit of the prefix character $\rho_1$ which has been read into scan register 110 and the highest-order bit of the first character following $\alpha_1$ $\alpha_2$ in the table entry being scanned, this character being stored in shift register 72. If there is a successful comparison on the highest-order bits, AND gate 297 or 299 generates an output signal which is applied through OR gate 309 and line **114*a* to cause a comparison of the next-to-the-most-significant bits to be made in compare circuit 290*b*. Comparisons are made in succession on progressively less significant bits in compare circuits 290*c*–290*f* until either a mismatch signal occurs on a line 116 or 118** stopping further comparisons or until all bits of the characters stored in the two registers have been compared and a match found.

Assume that the prefix $\rho_1$ is greater than the character which is stored in shift register 72 at this time, and that the first mismatch occurs in the highest-order bit position. AND gate 296 of comparator **290*a* therefore generates an output signal on its output line 116, which signal is applied through OR gate 870 (FIG. 4) and line 872 as one input to AND gates 874, 876, and 878. Since all of the flip-flops in FIG. 4 are initially in their ZERO state, only AND gate 874 of the ones mentioned above is conditioned at this time, generating an output signal on line 890, which is applied to switch advance-direction flip-flop 892 to its ONE state. Since there is no output signal on either line 305 or 307, AND gate 276 not being conditioned at this time, the transducer (not shown) for table storage 68** remains on the same track.

However, the signal on line 116 is passed through OR gate 122 (FIG. 3*h*), line 202, short delay 203, and line 202', to switch compare flip-flop **178*b* to its ZERO state. The switching of compare flip-flop 178*b* to its ZERO state means that neither input to OR gate 513** (FIG. 3*d*) is present. AND gate 442 is therefore deconditioned so that no further compare-conditioning pulses are applied to line 114. Comparison is therefore stopped until a new $\alpha_1$ $\alpha_2$ bit combination is detected in shift register 72. During this period, certain automatic operations are being performed. However, their effect is negated by later operations, and they are therefore not described at this time.

When the end of the table entry on which an unsuccessful match attempt was made is reached, the special characters $\alpha_1$ and $\alpha_2$ are again applied in succession to shift register 72, causing counter 420 to be resynchronized and compare-delay flip-flop **178*a* to be switched to its ONE state in a manner previously described. The signal on ONE-side output line 402 from compare-delay flip-flop 178***a* conditions AND gates 434 (FIG. 3*g*) and 418 (FIG. 3*h*) to cause an output signal to be applied to line 231 in a manner previously described. The last address in prefix region 42 is therefore reset into MAR 46 and the $\rho_1$ character is read out into scan register 110. These operations, which have already been described once in detail, are repeated innumerable times in the discussion to follow, and therefore, unless otherwise stated, are assumed to occur whenever an $\alpha_1$ $\alpha_2$ character combination is detected in shift register 72.

One byte time later, a signal appears on line 512 to switch compare flip-flop 178*b* to its ONE state, and to recondition AND gate 442 to apply a compare-conditioning signal to line 114. Assume that the $\rho_1$ prefix stored in scan register 110 is again greater than the character stored in shift register 72 but that the first mismatch now occurs in the next-to-the-highest-order bit position. AND gate 299, for example, in compare circuit 290*a* therefore generates an output signal on line 303 which is passed through OR gate 309 and line 114*a* to condition compare circuit 290*b* to perform a compare operation. The resulting mismatch signal from AND gate 296 for compare circuit 290*b* on its output line 116, in addition to being applied through line 202' to reset compare flip-flop 178*b*, is also applied through OR gate 870 (FIG. 4) to AND gate 876. AND gate 876 is now conditioned by a D.C. level on output line 894 from the ONE side of advance direction flip-flop 892. AND gate 876 therefore generates an output signal on line 305 which is applied to table storage 68 (FIG. 3*h*) to cause the transducer (not shown) for table storage 68 to advance to the next-higher-value track.

The next significant operation is the detection of an $\alpha_1$ $\alpha_2$ character combination being shifted into shift register 72, which causes a chain of events to occur which is identical to that previously described. Assume, however, that when a signal is now applied to line 114, it is found that the character stored in shift register 72 is greater than the $\rho_1$ character stored in scan register 110 and that again the first mismatch occurs in the highest-order bit position. Now, AND gate 300 (FIG. 3*i*) of compare circuit 290*a* generates an output signal on its line 118 which signal is applied through OR gate 122 (FIG. 3*h*), line 202, delay 203, and line 202' to reset compare flip-flop 178*b* to its ZERO state, and is also applied through OR gate 880 (FIG. 4) and line 882 to conditioned AND gate 884. The resulting output signal on line 896 is applied to switch advance-direction flip-flop 892 to its ZERO state and to switch entry-search flip-flop 898 to its ONE state. This means that the proper track for beginning a detailed search has now been found and that entries on this track will be searched in succession until the first matching entry is found.

In order to complete the description of the operation of the scan control circuit shown in FIG. 4, in one place, assume that when the initial comparison was made, it was found that the contents of shift register 72 was greater than the contents of scan register 110 so that an output signal appeared on a line 118 rather than on a line 116. In this case, a signal would have been applied through OR gate 880 to line 882. Since all flip-flops in the circuit of FIG. 4 are in their ZERO state at this time, there would be signals on lines 895 and 902, thereby conditioning AND gate 886 to pass the signal applied on line 882 through line 904 to the ONE-side input of back-direction flip-flop 906. As before, this first input signal causes no output from scan control circuit 120.

Assume further that the next entry on the same track is also greater than the $\rho_1$ prefix stored in scan register 110 and that therefore, a second signal is applied through a line 118, and OR gate 880 to line 882. AND gate 888 is now conditioned by the signal on output line 908 from the ONE side of back-directional flip-flop 906 to pass the signal on line 882 through line 912 and OR gate 916 to line 307. The signal on line 307 is applied to table storage 68 to cause the transducer (not shown) to move to the next lower order track.

Assume now that the first attempted match on an entry on this new track results in a mismatch with the contents of scan register 110 being greater than that in shift register 72. At this time, AND gate 874 is conditioned by the output signal on line 902 from the ZERO side of entry-search flip-flop 898 and AND gate 878 is conditioned by the output signal on line 908 from the ONE side of back-direction flip-flop 906. The resulting mismatch causes an output signal to appear on a line 116 which is applied through OR gate 870 and line 872 to the other input of AND gates 874 and 878. As before, the output signal on line 890 from AND gate 874 switches advance-direction flip-flop 892 to its ONE state. The output signal on line 910 from AND gate 878 is applied to switch back-direction flip-flop 906 to its ZERO state. Since AND gate 876 is not conditioned at this time, the circuit does not generate an output signal to table storage 68 and the next entry scanned is therefore the next succeeding entry on the same track. From this point on, the operation is identical to that described when the first mismatch was due to the contents of scan register being greater than the contents of shift register 72 and results ultimately in entry-search flip-flop 898 being switched to its ONE state. It can therefore be seen that the circuit shown in FIG. 4 implements the scan strategy described in the general description section.

Since output line 902 from the ZERO side of entry-search flip-flop 898 is a conditioning input to the AND gates which switch advance-direction flip-flop 892 and back-direction flip-flop 906 to their ONE state, once entry-search flip-flop 898 has been switched to its ONE state, subsequent input signals on lines 116 or 118 are ineffective. Therefore, as the compare circuits 290*a*–290*f* attempt to match successive entries applied to shift register 72 with the $\rho_1$ prefix stored in scan register 110, the resulting mismatch signals on lines 116 and 118 are ineffective to vary the track on which scanning occurs but the signals are applied through OR gate 122, line 202, short delay 203, and line 202' to reset compare flip-flop 178*b* to its ZERO state each time a mismatch occurs.

Assume for the sake of illustration, that the end of a track is reached before a matching entry is found. This can happen since the particular entry scanned on a track during track search is randomly selected and it is quite possible that, when a lower track is scanned, an entry near its end is sampled, indicating that this track is too low, whereas the matching entry is in fact further up that track. The end-of-track character is a special character which appears after an $\alpha_1\alpha_2$ combination. Therefore, one byte time after the $\alpha_2$ character has been detected, when compare-delay flip-flop 178*a* is in its ONE state, a timing pulse is applied to line 426. This timing pulse finds AND gate 93 (FIG. 3*g*) fully conditioned, and is passed therethrough to line 392. The simultaneous occurrence of signals on lines 392 and 402 cause AND gate 394 to generate an output signal on line 422 which signal is applied through conditioned AND gate 900 (FIG. 4) to line 914. The signal on line 914 is applied through OR gate 916 to line 307 causing the table-storage transducer (not shown) to be stepped back to the next lower track. An entry search to find an entry beginning with the $\rho_1$ prefix is then continued on this track.

Figure 7:
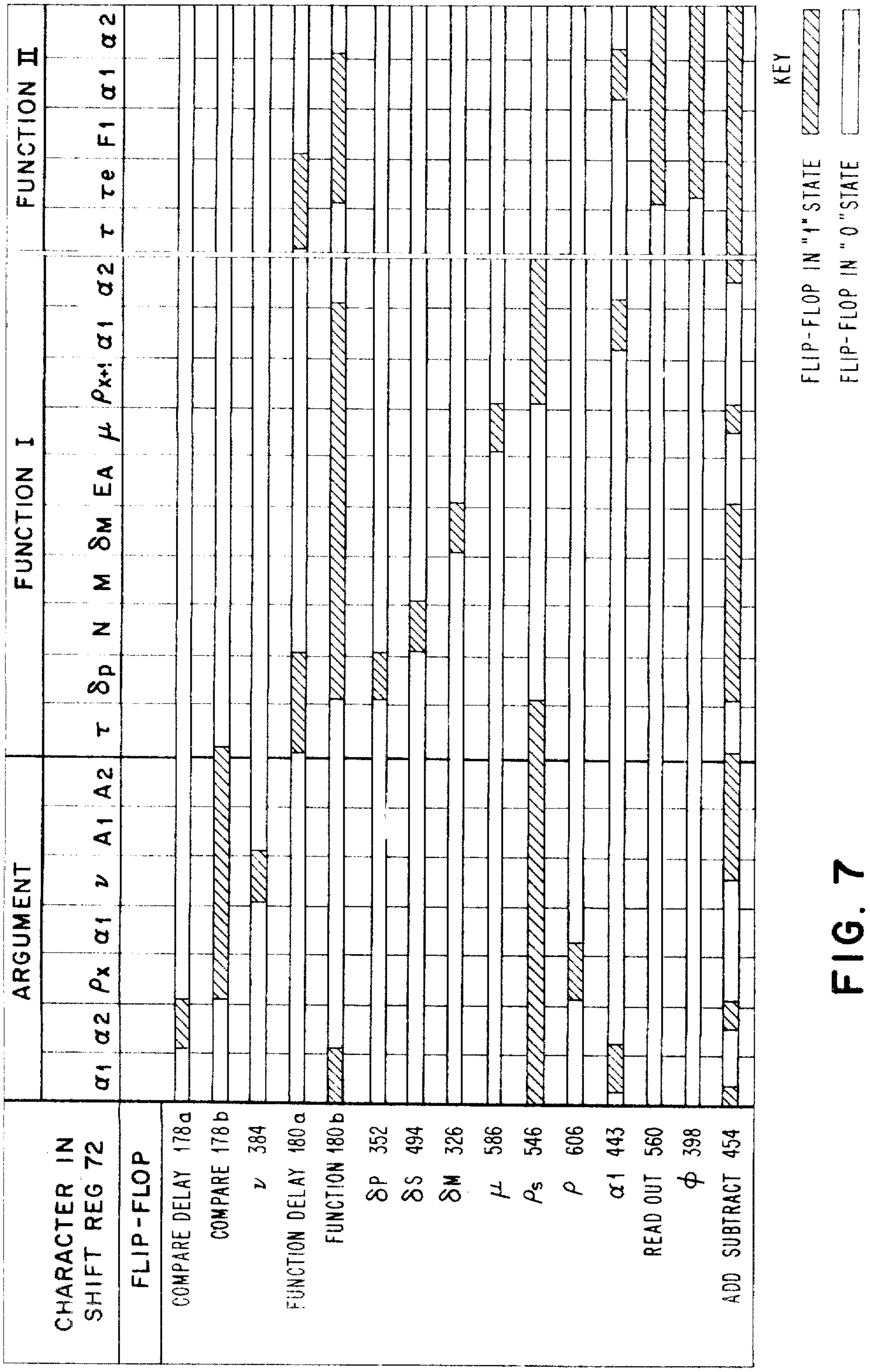
FIG. 7 is a timing chart for most of the flip-flops shown in FIGS. 3*a*–3*i*.

It will be remembered from the general operation section that the only entries in table storage 68 starting with the $\rho_1$ prefix are entries numbers 1 and 2 in the table of FIG. 6. Entry 1 is the more significant of these entries, since it includes argument characters in addition to the $\rho_1$ prefix and this entry is therefore scanned before entry number 2. Entry search therefore continues until entry number 1 in the table of FIG. 6 is located. Referring to FIG. 7, it is seen that one byte time after the $\alpha_1\alpha_2$ characters of this entry have been detected, the circuit conditions are as follows: compare-delay flip-flop 178*a* (FIG. 3*d*), $\rho_S$ flip-flop 546 (FIG. 3*g*), add-subtract flip-flop 454, and entry search flip-flop 898 (FIG. 4) are all in their ONE state, while all other flip-flops in the circuit are in their ZERO state; MAR has some indeterminate address stored in it; AIR has the address of the asterisk for the word "he" stored in it; all other registers have the address zero or some indeterminate address stored therein; and shift register 72 has the prefix $\rho_1$ stored in it. Under these conditions, a timing pulse is applied to line 426 to fully condition AND gate 434 (FIG. 3*g*) to switch $\rho$ flip-flop 606 to its ONE state, thereby conditioning AND gate 418 (FIG. 3*h*) to pass a signal through OR gate 592 and line 231 to set the last address in prefix region 42 into MAR. Since AND gate 484 (FIG. 3*e*) is fully conditioned at this time, the contents of this address, the $\rho_1$ prefix is read into scan register 110. The timing pulse on line 426 is also applied to fully condition AND gate 442 (FIG. 3*d*) to generate a compare condition signal on line 114 and to fully condition AND gate 404 to generate an output signal on line 512 to switch compare flip-flop 178*b* to its ONE state. Since a successful comparison is made in compare circuits 290*a*–290*f* (FIG. 3*i*), there is no output signal on a line 116 or 118 and the circuit conditions remained as previously indicated.

Half a byte time later, a timing pulse appears on line 428. Since there is no signal on line 231, flip-flop 819 (FIG. 3*i*) is in its ZERO state [there being no signal on any of the inputs to OR gate 783 (FIG. 3*c*)] and since $\delta_S$ flip-flop 494 is in its ZERO state, AND gate 453 (FIG. 3*h*) is conditioned to apply the signal on line 428 through line 455 to condition AND gate 450 (FIG. 3*b*) and through line 455 and short delay 457 to condition AND gates 220 (FIG. 3*f*). Since $\rho$ flip-flop 606 (FIG. 3*g*) is in its ONE state at this time and since $\alpha_1$ detector AND gate 88 is not generating an output signal on its line 168, AND gate 364 (FIG. 3*e*) is fully conditioned at this time to generate an output signal on line 618, which is applied through OR gate 622, line 624, OR gate 626 (FIG. 3*b*) and line 634 to the ZERO-side input of add-subtract flip-flop 454. A signal on output line 458 from the ZERO side of flip-flop 454 indicates to true-complement circuit 56 (FIG. 3*f*) that the information input applied to it is to be complemented before being applied to adder 54. Since there is a signal on line 624, inverter 628 (FIG. 3*b*) does not generate an output signal and therefore AND gate 450 is not fully conditioned. The coded signals for the numeral 1 applied by code generator 222 through lines 221, conditioned AND gates 220, lines 224, OR gates 62, and lines 452 to true-complement circuit 56, is therefore complemented and applied through lines 58 to adder 54. The result of this operation is that the address in MAR 46, which is applied to the augend input of adder 54 by lines 52, is decreased by one in the adder and applied by the adder to lines 136.

At this time, there is no signal on $\alpha_1$-detector-AND-gate output-line 168 so that inverter 363 applies a signal through line 365, OR gate 366 (FIG. 3*d*) and line 368 to fully condition AND gate 370. The output signal on line 842 from AND gate 370 is applied through OR gate 678, line 834, OR gate 818 (FIG. 3*c*) and the line 820 as the conditioning input to AND gates 802 (FIG. 3*f*). The new address on lines 136 is therefore applied through AND gates 802 and lines 848 to control gates 48 and from there through lines 50 to MAR 46.

AND gate 484 (FIG. 3*e*) is still fully conditioned, generating an output signal on line 766, which is applied through OR gate 754 (FIG. 3*f*) to line 756. This signal effectively conditions AND gates 746 and 270 to drive the contents of the address now stored in MAR 46, the $\alpha_1$ character stored in the next-to-the-last address position in memory 10, through lines 282, conditioned AND gate 284, and lines 286 to scan register 110.

A half byte time after this operation is performed, counter 420 (FIG. 3*g*) again applies a timing pulse to line 426, to fully condition AND gate 442 (FIG. 3*d*) to apply a compare pulse to line 114. Referring to the first entry in FIG. 6, it is seen that shift register 72 also contains an $\alpha_1$ character at this time, and therefore that a second successful match is made. However, the detection of the $\alpha_1$ character in shift register 72 at this time causes AND gate 88 (FIG. 3*d*) to generate an output signal on line 168 which signal is applied through conditioned AND gate 360 (FIG. 3*g*), line 612, OR gate 544, line 614, conditioned AND gate 436, and line 616 to reset $\rho$ flip-flop 606 to its ZERO state. The signal on line 168 occurs before the switching of $\rho$ flip-flop 606 is completed; therefore, signals occur simultaneously on lines 168, 426, 514, and 608, to fully condition AND gate 362 (FIG. 3*e*) to generate an output signal on line 790. This signal is applied through OR gate 788, line 786, OR gate 782 (FIG. 3*c*) and line 780 to condition AND gates 230 to pass the contents of AIR 102 through lines 846 and control gates 48 (FIG. 3*f*) to MAR 46. Since AIR at this time contains the address of the asterisk for the word "he," this is the address which is read into MAR at this time. The conditioning signal on line 780 is also applied through OR gate 783 (FIG. 3*c*), and line 817 to switch flip-flop 819 (FIG. 3*i*) to its ONE state. Half a byte time later, when counter 420 applies a signal to line 428, there is no conditioning signal on ZERO-side output line 821 from flip-flop 819. Since no conditioning signal is applied through OR gate 569 to AND gate 453, AND gates 220 (FIG. 3*f*) are not conditioned to apply a coded signal for the numeral 1 to true-complement circuit 56 and the address in MAR is therefore not incremented The signal on line 428 is, however, effective to switch flip-flop 819 to its ZERO state.

Since AND gate 484 (FIG. 3*e*) is still fully conditioned, a signal is still applied through line 766 and OR gate 754 (FIG. 3*f*) to line 756, to condition AND gates 746 and 270, to cause the contents of the address in MAR, to be read out through lines 282, conditioned AND gates 284, and lines 286, to scan register 110. It will be remembered from previous discussions, that this address contains the asterisk for the word "he".

When the next timing pulse is applied to line 426, the following circuit conditions exist: compare flip-flop 178*b*, $\rho_S$ flip-flop 546, and entry-search flip-flop 898 (FIG. 4) are all in their ONE state and all other flip-flops are in their ZERO state; AIR and MAR bear the address of the asterisk for the word "he" while MSKR and PLR are empty (i.e., have some indeterminate address in them); scan register 110 has the asterisk for the word "he" stored therein and shift register 72 has an asterisk stored in it. A timing pulse is now applied to line 426 which pulse fully conditions AND gate 442 (FIG. 3*d*) to generate compare-condition signal on line 114. Since both shift register 72 and scan register 110 have asterisks stored in them, there is a successful match and no signal appears on a line 116 or 118. The presence of an asterisk in shift register 72 causes an output signal from AND gate 89 (FIG. 3*d*) on line 232 but the results of this signal are not used at this time and will be described later.

One-half-byte time later, a signal is applied to line 428 which signal passes through now-conditioned AND gate 453 (FIG. 3*h*) and line 455 to condition AND gate 450 (FIG. 3*b*). Since there is no signal on line 624 at this time, neither AND gate 364 (FIG. 3*e*) nor 550 being conditioned, inverter 628 (FIG. 3*b*) applies the other conditioning input to AND gate 450, causing an output signal on line 630 which is applied through OR gate 632 and line 636 to set add-subtract flip-flop 454 to its ONE state. True-complement circuit 56 is therefore in its add mode. The signal on line 455 is also applied to short delay 457. The fraction of a bit time which the signal on line 455 is delayed in delay 457 is sufficient to allow add-subtract flip-flop 454 to be set. The output from delay 457 is applied as the conditioning input to AND gates 220 (FIG. 3*f*). The conditioning of AND gates 220 (FIG. 3*f*) allows a signal representing the code for the numeral 1 to be applied through AND gates 220, lines 224, OR gates 62 and lines 452 to true-complement circuit 56 from whence the signal is applied through lines 58 to adder 54. In adder 54, the numeral 1 is added to the address in MAR 46 applied to the adder through lines 52, the resulting output signal on lines 136 being an address one position advanced from the previously in MAR. Since $\rho$ flip-flop 606 (FIG. 3*g*) is in its ZERO state, there is a signal on its ZERO side output line 610, which is applied through OR gate 366 (FIG. 3*d*) and line 368 to fully condition AND gate 370 to generate an output signal on line 842, which signal is applied through OR gate 678 (FIG. 3*a*), line 834, OR gate 818 (FIG. 3*c*), and line 820, to condition AND gates 802 (FIG. 3*f*) to pass the new address applied to lines 136 through lines 848, control gates 48 and lines 50 to MAR. The address in MAR is thus incremented by one position. In the future, when this operation is to be performed, it will merely be stated that MAR is updated at half byte time and it will be assumed that the previously described sequence of operations occurs unless otherwise stated.

MAR now contains the address of the backward length tag for the word "he". This character is read into scan register 110 in a manner previously described. When the next timing pulse is applied to line 426, shift register 72 has the special character $\nu$ stored therein. The detection of the special character $\nu$ by AND gate 92 (FIG. 3*g*) causes an output signal to be generated on line 382 to switch $\nu$ flip-flop 384 to its ONE state. $\nu$ flip-flop 384 being switched to its ONE state, removes the conditioning signal for AND gate 442 (FIG. 3*d*) from line 660. Therefore, when the delayed timing pulse on line 426 is applied by delay 441 to AND gate 442, this gate is deconditioned, preventing an output signal on output line 114 from AND gate 442, thereby deconditioning compare circuits **290*a*–290*f*** (FIG. 3*i*). Therefore, even though the $\nu$ character in shift register 72 does not match the backward length tag in scan register 110, no mismatch signal is generated on a line 116 or 118 and the circuit proceeds as if a match had occurred. It can be seen that the $\nu$ character will give an apparent match with any input character applied to scan register 110 and, for this reason, the $\nu$ character is also referred to as the "universal character."

At the next half byte time, the address in MAR 46 is again incremented, causing the forward length tag for the word "he" to be applied to scan register 110. At the next byte time, when a timing pulse is applied to line 426, shift register 72 again contains the special character $\nu$. AND gate 92 (FIG. 3*g*) therefore again generates an output on line 382 which is applied to prevent inverter 386 from generating an output signal on line 388. Therefore, the timing pulse on line 426 finds AND gate 390 deconditioned and no output signal is applied to line 451 to switch $\nu$ flip-flop 384 to its ZERO state. Output line 660 from the ZERO side of $\nu$ flip-flop 384 therefore has no signal on it, deconditioning AND gate 442 (FIG. 3*d*) so that there is no signal on compare condition line 114. The circuit again proceeds as if a match has been made.

At the next half byte time, MAR is again incremented to cause the part-of-speech code for the word "he," in this case, the code for a pronoun, to be applied to scan register 110. At the next byte time, the end-of-sentence character P*t* is in shift register 72. The timing pulse now applied to line 426 passes through now-conditioned AND gate 390 (FIG. 3*g*) and line 451 to switch $\nu$ flip-flop 384 to its ZERO state, thereby reapplying a signal to line 660. AND gate 442 (FIG. 3*d*) is therefore fully conditioned to again apply a compare-condition signal to line 114. Since the P*t* character stored in shift register 72 is different from the pronoun character stored in scan register 110, compare circuits **290*a*–290*f*** (FIG. 3*i*) generate a mismatch signal on a line 116 or 118, which signal is applied through OR gate 122 (FIG. 3*h*) and line 202′, to switch compare flip-flop **178*b*** to its ZERO state, thereby stopping the compare operation.

The mismatch condition having been detected, no significant operation occurs until the $\alpha_1\alpha_2$ characters which end table entry 1 and start table entry 2 are detected by AND gates 88 and 87, respectively, in shift register 72. From FIG. 6, it might appear that there are actually two sets of $\alpha_1\alpha_2$ characters between the first and second entries in the table, one set serving to end the first entry and the second set serving to start the second. This, however, is not the case, there being only a single $\alpha_1\alpha_2$ character combination which performs both functions. The detection of the $\alpha_1\alpha_2$ characters results in compare delay flip-flop **178*a* being switched to its ONE state. The resulting output signal on ONE-side output line 402 from this flip-flop is applied as a conditioning input to AND gates 434** (FIG. 3*g*) and 418 (FIG. 3*h*). At the next byte time, the timing pulse on line 426 is applied through conditioned AND gate 434 and line 604 to switch $\rho$ flip-flop 606 to its ONE state. The resulting output signal on ONE side output line 608 from $\rho$ flip-flop 606 is applied through conditioned AND gate 418, line 856, OR gate 592, and line 231 to control gates 48 to cause the last address in prefix region 42 to be applied to MAR. The $\rho_1$ prefix is therefore reapplied to scan register 110 in a manner previously described.

The timing pulse on line 426 is also applied through AND gate 404 (FIG. 3*d*) which is conditioned at this time by the output signal on line 402 and through line 512 to (a) switch compare flip-flop **178*b* to its ONE state and (b) to fully condition AND gate 442 to pass a delayed version of the timing pulse on line 426 to compare-condition line 114. A compare operation is therefore performed between the $\rho_1$ prefix stored in shift register 72 and $\rho_1$ prefix stored in scan register 110. The circuit then proceeds to match on the $\rho_1$ and $\alpha_1$ characters of entry 2 in the same manner that it matched on these characters in entry 1**.

It will be remembered that the detection of the $\alpha_1$ character in shift register 72 resulted in $\rho$ flip-flop 606 being switched to its ZERO state, in the conditioning of add-subtract flip-flop 454 to be switched to its ONE or add state, and in the contents of AIR being applied through conditioned AND gates 230 (FIG. 3*c*) to MAR. One byte time after the detection of the $\alpha_1$ character in shift register 72, this register contains the special character $\tau$ while scan register 110 contains the asterisk for the word "he." The detection of the special character $\tau$ in shift register 72 at the next byte time causes $\tau$-detector AND gate 86 (FIG. 3*d*) to generate an output signal on line 184 which, since entry-search flip-flop 898 (FIG. 4) and compare flip-flop **178*b* are both in their ONE state, is passed through conditioned AND gate 182 and line 524 to switch function-delay flip-flop 180*a* to its ONE state. Since compare flip-flop 178*b* is still in its ONE state, AND gate 442 generates a compare condition signal on line 114, causing the $\tau$ character in shift register 72 to be compared with the asterisk stored in scan register 110. The resulting mismatch causes output signal from OR gate 122** (FIG. 3*h*) on line 202 which signal is delayed slightly in delay 203 in order to allow flip-flop **180*a* sufficient time to set and is then applied through line 202′ to fully condition AND gate 516** (FIG. 3*d*) and to switch compare flip-flop **178*b* to its ZERO state. The output signal from AND gate 516 on line 784 is applied through OR gate 782** (FIG. 3*c*) and line 780 to condition AND gates 230 to pass the address in AIR, the address of the asterisk for the word "he," through lines 778, AND gates 230, lines 846, control gates 48, and lines 50 to MAR 46. The signal on line 780 is also applied through OR gate 783 and line 817 to switch flip-flop 819 (FIG. 3*h*) to its ZERO state. Therefore, during the next half byte time, there is no conditioning signal on line 821 being applied through OR gate 569 to AND gate 453. However, since function-delay flip-flop 180*a* is in its ONE state at this time, there is a signal on line 526 which is applied through OR gate 528 (FIG. 3*d*), line 556 and OR gate 569 to conditioned AND gate 453 at this time, thereby permitting the address in MAR to be incremented one position. This brings the address for the backward length of the word "he" into MAR 46.

Since, by this half byte time, function-delay flip-flop 180*a* has been set to its ONE state and compare flip-flop 178*b* has been set to its ZERO state, AND gate 440 (FIG. 3*e*) is fully conditioned to pass the timing pulse on line 428 to line 676. The signal on line 676 is applied through OR gate 673, line 671, to OR gate 668 (FIG. 3*c*) and line 666 to switch flip-flop 662 to its ONE state and to OR gate 680 and line 708 to switch flip-flop 664 to its ZERO state. It will be remembered that the flip-flops 662 and 664 form the index register 234 of FIG. 1*a* and that, when flip-flop 662 is in its ONE state and flip-flop 664 is in its ZERO state, this is the second state of the register, indicating that the address of a backward length tag is in MAR, which is in fact, the case here.

Referring back to the second entry in FIG. 6, it is seen that at the next byte time, the special character $\gamma$ is in shift register 72. When a timing pulse is applied to line 426, the presence of the special character $\gamma$ in shift register 72, causes detector AND gate 91 (FIG. 3*g*) to generate a signal on line 376 to prevent inverter 378 from applying a conditioning signal through line 380 to AND gate 322 (FIG. 3*h*). Delay 427 prevents the timing pulse on line 426 from being applied to AND gate 322 until the signal on line 380 has been completely removed. Since there is no output from AND gate 322, neither AND gate 270 (FIG. 3*f*), nor 294 is conditioned, so that the contents of shift register 72 cannot be written into memory 10 at the address indicated in MAR 46. As will be seen later, if the $\gamma$ character were not present at this time, such a writing-in would occur at this time.

Since function-delay flip-flop 180*a* is in its ONE state during this byte time and flip-flops 180*b* and 443 (FIG. 3*g*) are in their ZERO state, AND gate 435 (FIG. 3*d*) is fully conditioned to pass the timing pulse on line 426 through line 542 to switch function flip-flop 180*b* to its ONE state. The signal on line 542 is also applied to the ZERO side input of $\rho_s$ flip-flop 546 (FIG. 3*g*), resetting this flip-flop, and through OR gate 544, line 614, conditioned AND gate 436 and line 616 to reset $\rho$ flip-flop 606 to its ZERO state. It will be remembered that $\rho$ flip-flop 606 had been previously reset so that this last operation is not necessary at this time. However, under certain conditions, this operation is necessary at this time and it is performed as a precautionary measure.

A half-byte time later, a signal is applied through line 428 and now conditioned AND gate 453 (FIG. 3*h*) to cause MAR to be incremented in a previously described manner. This results in the address of the forward length tag for the word "he" being read into MAR. The signal on output line 455 from AND gate 453 is also gated through AND gate 698 (FIG. 3*c*) which is conditioned at this time by the output lines 700 and 702 from the ONE side of flip-flop 662 and the ZERO side of flip-flop 664, respectively. The resulting signal on output line 696 from AND gate 698 is applied through OR gate 416 and line 670 to switch flip-flop 664 to its ONE state and is also applied through OR gate 706 and line 704 to switch flip-flop 662 to its ZERO state. The result of this operation is to switch the index register to its third state, indicating that a forward length tag is now stored or is now to be stored in scan register 110. The signal on line 696 is also applied through OR gate 406 (FIG. 3*e*) and line 860 to gate the desired forward length tag through AND gate 284 and line 286 to scan register 110.

At the next byte time, the special character $\epsilon_A$ is stored in shift register 72. The timing pulse on line 426 which occurs at this time, is gated through AND gate 81 (FIG. 3*a*) which is conditioned at this time by the presence of the $\epsilon_A$ character in shift register 72 to line 128 and is applied through line 128 as one input to AND gates 324 (FIG. 3*b*) and 130. Since function flip-flop 180*b* is in its ONE state, there is a signal on line 548 which conditions AND gate 324 (FIG. 3*b*), to pass the signal on line 128 through line 331 and OR gate 332 to line 334. The signal on line 334 is applied as one input to AND gate 336, the other two inputs to this AND gate being the output lines 692 and 694 from the ZERO side of flip-flop 662 and the ONE side of flip-flop 664, respectively. Since all these lines are conditioned at this time, AND gate 336 generates an output signal on line 643 which is applied through OR gate 488, line 642, OR gate 632 and line 636 to switch add-subtract flip-flop 454 to its ONE or add state. The signal on line 642 is also applied through OR gate 644 (FIG. 3*e*) and line 646 to condition AND gates 648. The signal on line 334 is delayed slightly in delay 339 in order to give flip-flop 454 an opportunity to set and then applied to condition AND gates 288 (FIG. 3*f*) to pass the forward length tag stored in scan register 110 through lines 108, AND gates 288, lines 654, OR gates 650, lines 652, previously conditioned AND gates 648, lines 658, OR gates 62, and lines 452 to true-complement circuit 56. As was previously indicated, this circuit is now in its add mode so that the forward length tag applied to its passed through lines 58 to adder 54 where this forward length tag is added to the contents of MAR. It will be remembered that the result of this addition is the address of the asterisk for the word following that previously operated on, in this case, the address of the asterisk for the word "went." This address is applied through lines 136 as the information input to AND gates 134 (FIG. 3*c*). Since there is a signal on line 694 at this time, but no signal on line 700, EXCLUSIVE OR gate 722 generates an output signal on line 730 which is applied as one input to AND gate 130 (FIG. 3*b*). As was mentioned previously, the second input to this AND gate is the signal on line 128 and the third input is derived from line 548 which also has a signal on it at this time. AND gate 130 therefore generates a conditioning signal on line 770 which is delayed in delay 771 and then applied to gate the address information applied by lines 136 to AND gates 134 through these gates and through lines 772 to AIR 102. The address of the asterisk for the word "went" is in this manner stored in AIR 102.

The next significant operation occurs one byte time later when the special character $\mu$ is stored in shift register 72. In response to the combined occurrence of the $\mu$ character in shift register 72, and the timing pulse on line 426, $\mu$ detector AND gate 90 (FIG. 3*g*) generates an output signal on line 212 which is applied as one input to AND gate 374. Since function flip-flop 180*b* is in its ONE state at this time, a signal is applied through line 548 and OR gate 528 (FIG. 3*d*) to line 556 and, since $\rho_B$ flip-flop 546 is in its ZERO state at this time, a signal appears on its ZERO side output line 582. AND gate 374 is therefore fully conditioned at this time to pass the signal applied to line 212 through line 584 to switch $\mu$ flip-flop 586 to its ONE state. Output line 588 from the ONE side of $\mu$ flip-flop 586 is connected through OR gate 592 (FIG. 3*h*) to line 231. Therefore, when $\mu$ flip-flop 586 is switched to its ONE state, a signal is applied through line 231 to control gates 48, causing the last address in prefix region 42 to be stored in MAR 46. The signal on line 231 is also applied to inverter 855 (FIG. 3*h*) thereby deconditioning AND gate 453. Therefore, one-half byte time later, the timing pulse applied to line 428 is blocked at AND gate 453 and MAR is not updated.

At the next byte time, the address of the last address in prefix region 40 is still in MAR 46 and the prefix character $\rho_1$ is stored in shift register 72. The timing pulse on line 426 is passed through AND gate 430 (FIG. 3*g*), which is conditioned at this time by the signal on ONE-side output line 588 from $\mu$ flip-flop 586 to switch $\rho_S$ flip-flop 546 to its ONE state. At this time, one byte delay 590 also applies an output signal to the ZERO-side input of $\mu$ flip-flop 586 to reset this flip-flop to its ZERO state. Output line 600 from the ONE side of $\rho_S$ flip-flop 546 is connected through OR gate 602 (FIG. 3*b*) and line 734 as one input to AND gate 322 (FIG. 3*h*). Since neither a $\tau_E$ nor a $\gamma$ character is in shift register 72, $\delta_S$ flip-flop 494 is in its ZERO state and function flip-flop 180*b* is in its ONE state, AND gate 322 is fully conditioned at this time, generating an output signal on line 736 which is applied to condition AND gates 294 (FIG. 3*f*) and is also applied through OR gate 738 and line 758 to condition AND gates 270. The conditioning of these two sets of AND gates causes the $\rho_1$ prefix stored in shift register 72 to be written into memory 10 at the address indicated in MAR 46. In this way, the prefix character $\rho_1$ is stored in the last address position in prefix region 42.

The signal on ONE-side output line 600 from $\rho_S$ flip-flop 546 is also applied through AND gate 550 (FIG. 3*e*) which is conditioned at this time by the signal on ONE-side output line 548 from function flip-flop 180*b*, line 620, OR gate 622, line 624, OR gate 626 and line 634 to the ZERO or subtract side of add-subtract flip-flop 454. Therefore, at the next half-byte time when a timing pulse on line 428 is passed through now-conditioned AND gate 453 (FIG. 3*h*), the contents of MAR are decremented one position rather than incremented. This brings the address of the next-to-the-last address in prefix region 42 into MAR 46. At the next byte time, the special character $\alpha_1$ is in shift register 72. The signal which is applied to line 426 at this time, after a short delay in delay 427 (FIG. 3*h*), fully conditions AND gate 322 to again generate an output signal on line 736 to conditioned AND gates 270 (FIG. 3*f*) and 294, resulting in the writing of the $\alpha_1$ character into the next-to-the-last address in prefix region 42.

The presence of the $\alpha_1$ character in shift register 72 also causes $\alpha_1$ detector AND gate 88 (FIG. 3*d*) to generate an output signal on line 168 which signal is stored in one-byte delay 170. Function flip-flop 180*b* being in its ONE state, AND gate 410 (FIG. 3*g*) is conditioned at this time to pass the signal on 168 through line 570 and short delay 572 to set $\alpha_1$ flip-flop 443 to its ONE state. Short delay 572 is to prevent function flip-flop 180*b* from being reset prematurely.

The next significant operation occurs one byte time later, when the special character $\alpha_2$ is stored in shift register 72. At this time, a timing pulse is applied by line 426 to AND gate 439 (FIG. 3*d*) which AND gate is conditioned at this time by a signal on output line 574 from the ONE side of $\alpha_1$ flip-flop 443. The output from AND gate 439 is applied through line 576 to reset function flip-flop 180*b* to its ZERO state, thereby terminating the function operation and deconditioning AND gate 322 (FIG. 3*h*) so as to prevent the reading of the $\alpha_2$ character into memory 10. The presence of the $\alpha_2$ character in shift register 72 causes AND gate 87 (FIG. 3*d*) to generate an output signal on line 174, this signal and the signal now being generated by delay 170 fully conditioning AND gate 172 to switch compare-delay flip-flop 178*a* to its ONE state.

The next significant operations occur one byte time later when the timing pulse on line 426 is applied through conditioned AND gates 404 (FIG. 3*d*) and 434 (FIG. 3*g*) to switch compare flip-flop 178*b* and $\rho$ flip-flop 606 to their ONE state. The switching of $\rho$ flip-flop 606 to its ONE state causes the last address in prefix region 42 to be stored in MAR and the contents of this address, the $\rho_1$ prefix, to be read into scan register 110 in a manner previously described. AND gate 442 (FIG. 3*d*) is fully conditioned at this time to cause a compare operation to be performed between this prefix character and the prefix character then stored in shift register 72.

Since AIR 102 now contains the address of the asterisk for the second word of the sentence, the word "went" the circuit is now proceeding to determine if this word is the end of the sentence. The manner of doing this is exactly the same as that previously described for determining if the word "he" was the end of the sentence. Since the word "went" is not the end of the sentence, the circuit then proceeds on in a similar manner to test the words "home," "and," "ate," and "lunch," to see if these words are the end of the sentence. As with the word "went," the operations for testing each of these words are the same as the operations which were performed to test the word "he" and therefore, will not be described again.

Assume now that the address of the asterisk for the end-of-sentence word is in AIR 102, and that the $\alpha_1\alpha_2$ characters for entry 1 in the table of FIG. 6 have been detected and the $\rho_1$ and $\alpha_1$ characters matched on all in a manner previously described. As was indicated previously, the detection of the $\alpha_1$ character results in $\rho$ flip-flop 606 (FIG. 3*g*) being set to its ZERO state, thereby allowing true-complement circuit 56 to return to its add mode and in the transfer of the address in AIR, the address of the asterisk for the end-of-sentence word into MAR 46. At the next byte time when the asterisk is stored in shift register 72, compare flip-flop 178*b*, $\rho_S$ flip-flop 546, and entry search flip-flop 898 (FIG. 4) are in their ONE state and all other flip-flops are in their ZERO state. Scan register 110 has the asterisk for the end-of-sentence word stored in it. AND gate 442 (FIG. 3*d*) being fully conditioned at this time, a successful compare operation is performed in compare circuits 290*a*–290*f* (FIG. 3*i*) and a half-byte time later, MAR 46 is incremented one address position. During the next two byte times, the backward length tag and the forward length tag for the end-of-sentence entry are masked over by two $\nu$ characters in a manner previously described. A half-byte time later, MAR 46 is again incremented to bring the address of the end-of-sentence character P*t* into MAR 46 causing this character to be read into scan register 110. At the next byte time, the end-of-sentence character P*t* is also stored in shift register 72. Another successful compare operation is therefore performed in compare circuits 290*a*–290*f*.

The next significant operation occurs one byte time later when the special character $\tau$ is in shift register 72. The combined occurrence of this character in shift register 72, and a timing pulse on line 426 causes $\tau$ detector AND gate 86 (FIG. 3*d*) to generate an output signal on line 184 which, since compare flip-flop 178*b* and entry-search flip-flop 898 (FIG. 4) are in their ONE state, passes through conditioned AND gate 182 and line 524 to switch function-delay flip-flop 180*a* to its ONE state. The signal on line 426 also conditions AND gate 442 (FIG. 3*d*) to generate a compare condition signal on line 114, the resulting mismatch occurring in a compare circuit 290*a*–290*f*, causing a signal on line 202′ which is applied through now-conditioned AND gate 516 (FIG. 3*d*) line 784, OR gate 782 (FIG. 3*c*) and line 780 to condition AND gates 230 to apply the address of the asterisk for the end-of-sentence word stored in AIR 102 through lines 846 and control gates 48 to MAR 46. The mismatch signal on line 202′ is also applied to reset compare flip-flop 178*b* to its ZERO state.

A half-byte time later, the signal on line 428 is applied through AND gate 453 (FIG. 3*h*), which gate is conditioned at this time by a signal on line 526 passing through OR gate 528 (FIG. 3*d*) line 556 and OR gate 569, to line 455 to increment MAR one position, bringing the address of the backward length tag for the end-of-sentence word into MAR 46 and causing this backward length tag to be stored in scan register 110. The signal on line 428 is also applied through conditioned AND gate 440 (FIG. 3*e*) and line 676 to (*a*) OR gate 678 (FIG. 3*a*) line 834, OR gate 818 (FIG. 3*c*), and line 820 to condition AND gates 802 (FIG. 3*f*) to pass the new address into MAR 46 and (*b*) OR gate 673 (FIG. 3*b*), line 671, and OR gate 668 (FIG. 3*c*) to set flip-flop 662 to its ONE state and OR gate 680 to set flip-flop 664 to its ZERO state. This latter operation sets the index register to its second state indicating that a backward length tag is now stored in scan register 110.

At the next byte time, a variety of operations are performed. For one thing, the signal on line 426 is applied through conditioned AND gate 435 (FIG. 3*d*), and line 542 to set function flip-flop **180*b* to its ONE state and to reset $\rho_S$ flip-flop 546 and $\rho$ flip-flop 606 to their ZERO state. Secondly, since the $\epsilon_A$ character is stored in shift register 72, AND gate 81** (FIG. 3*a*) is fully conditioned generating an output signal on line 128 which is applied as a conditioning input to AND gate 130 (FIG. 3*b*) and through now-conditioned AND gate 324, line 331, OR gate 332, and line 334 to condition AND gate 338. Since flip-flop 662 (FIG. 3*c*) is in its ONE state and flip-flop 664 is in its ZERO state, signals appear on lines 700 and 702 to fully condition AND gate 338 to generate an output signal on line 640. The signal on line 640 is passed through OR gate 478 (FIG. 3*b*) and line 638 to (a) pass through OR gate 626 and line 634 to switch add-subtract flip-flop 454 to its ZERO or minus condition and (b) to pass through OR gates 644 (FIG. 3*c*) and line 646 to condition AND gates 648 (FIG. 3*f*). The previously mentioned signal on line 334 is also applied through short delay 339 to condition AND gates 288, thereby allowing the backward length tag stored in scan register 110 to be applied through lines 108, now-conditioned AND gates 288, lines 654, OR gate 650, lines 652, conditioned AND gates 648, lines 658, OR gates 62, and lines 452 to true-complement circuit 56. Since there is a signal on line 458 at this time, the backward length tag is complemented in true-complement circuit 56 and the complement of this length tag is applied through lines 58 to adder 54, where the backward length tag is effectively subtracted from the address in MAR applied to adder 54 through lines 52. The resulting address, the address of the asterisk for the word preceding the end-of--sentence word, the address of the asterisk for the word "lunch," is applied through lines 136 to AND gates 134 (FIG. 3*c*). Since just prior to this time, there is a signal on line 700 but no signal on line 694, exclusive OR gate 722 generates an output signal on line 730 which fully conditions AND gate 130 to generate a conditioning signal on line 770 is delayed slightly in delay 771 and then applied to allow AND gates 134 to pass the address information applied to them on lines 136 through lines 772 to AIR 102. The address of the asterisk for the word "lunch" is in this manner stored in AIR 102.

Referring to the flow diagram of FIG. 5, it is seen that, having found the end of the sentence, a new operation, namely, a search left to find a verb which takes a complement, is now initiated. Since a new operation is to be preformed, a new prefix character, $\rho_2$, is to be stored in the last address of prefix region 42. The manner of storing the $\rho_2$ prefix and the $\alpha_1$ character following it in prefix region 42 is identical to the procedure previously described for storing the $\rho_1$ prefix and the $\alpha_1$ character following it, and will not be described again here. The detection of the $\alpha_1\alpha_2$ bit combination in shift register 72 ends the first operation and starts the operation of searching for a verb which takes a complement.

*Is word a verb which takes a complement*:

Since the $\rho_2$ prefix is now stored in the prefix region 42, a track search is initiated to find a table entry starting with the prefix character $\rho_2$. As was indicated in the general-description-of-operation section, the only three entries which start with the prefix character $\rho_2$ are the entries 3, 4, and 5 in the table of FIG. 6. The most significant of these entries is entry 3 and therefore, this is always the first of the three entries contained in the $\rho_2$ prefix which is located.

Assume that a track search has been performed, the proper track located, an entry search initiated, and that the $\alpha_1$ $\alpha_2$ characters for entry 3 have just been located. A match is then made on the $\rho_2$ and $\alpha_1$ characters and the address of the asterisk for the word "lunch" shifted into MAR 46. The circuit then matches on the asterisk, and the backward and forward length tags for the word "lunch" are masked over by the two $\nu$ characters in entry 3. During the next byte time, scan register 110 contains the $C_v$ character, the part-of-speech character for the word "lunch" signifying that it is a verbal complement, while shift register 72 contains the V character signifying the part-of-speech character code for a verb. A mismatch therefore occurs, causing compare flip-flop **178*b* to be reset to its ZERO state, thereby stopping comparison. A similar mismatch occurs when an attempt is made to match on entry 4**. The details of the preceding two operations have not been given since they are identical to operations previously described.

The $\alpha_1\alpha_2$ characters for entry 5 are then detected causing a new compare operation to be initiated and the $\rho_2$ and $\alpha_1$ characters of this entry are matched on in the standard manner. This being a breakpoint entry, one byte time later, the special character $\tau$ is stored in shift register 72. The detection of this character in shift register 72 causes function delay flip-flop **180*a* to be switched to its ONE state and the resulting $\tau$ mismatch causes a mismatch signal on line 202′ which is applied to reset compare flip-flop 178*b* and is also applied through conditioning AND gate 516** (FIG. 3*d*) to condition AND gates 230 (FIG. 3*c*) to apply the address of the asterisk for the word "lunch" to MAR 46. A half-byte time later, this address is incremented to bring the address for the backward length tag for the word "lunch" into MAR 46. At the same time that this occurs, AND gate 440 (FIG. 3*e*) is fully conditioned to generate an output signal on line 676 causing the index register flip-flops 662 (FIG. 3*c*) and 664 to be set with flip-flop 662 in its ONE state and flip-flop 664 in its ZERO state. At this same time the signal on ONE-side output line 526 from function-delay flip-flop **180*a* is applied through OR gate 406 and line 860 to condition AND gates 284** (FIG. 3*f*) to store the backward length tag in scan register 110. At the next byte time, scan register 72 contains the special character $\epsilon_A$. The presence of this character in shift register 72 causes the backward length tag stored in scan register 110 to be subtracted from the contents of MAR in adder 58 in a manner previously described; the resulting address, the address of the asterisk for the word "ate" being stored in AIR 102. During the next three byte times, the necessary operations for restoring the $\rho_2$ and $\alpha_1$ characters in the last address and next-to-the-last address, respectively, of prefix region 42 are performed in a previously described manner. The detection of the $\alpha_1\alpha_2$ characters at the end of entry 5 serve to initiate a new attempt to find a verb which takes a complement.

Assume that entry 3 has again been located in table storage 68, that its $\alpha_1\alpha_2$ initial characters have been detected, that a match has been had on the prefix character $\rho_2$ and $\alpha_1$ character following it, and that, in response to the detection of the $\alpha_1$ character, the address of the asterisk for the verb "ate" has been applied to MAR 46. Assume further that a match is had on this asterisk and that the backward and forward length tags for the verb "ate" are then masked over by the two $\nu$ characters in entry 3. The manner in which the circuit of FIGS. 3*a*–3*i* operate to perform these functions has been described in detail with reference to previous similar entries and is therefore not described again at this point.

A half-byte time after the masking over of the forward length tag, a timing pulse is applied through line 428, conditioned AND gate 453 (FIG. 3*h*) and line 455 to cause the address in MAR to be incremented one position. This brings the address of the part-of-speech code character, the character V, into MAR 46 and causes this character to be stored in scan register 110.

At the next byte time, the character V is also stored in shift register 72. On the application of a compare-condition signal to line 114 by fully conditioned AND gate 442 (FIG. 3*d*), a successful compare operation is therefore performed in compare-circuits 290*a*–290*f*. During the next half-byte time, MAR is again updated to bring some character into scan register 110.

At the next byte time, the special character $\tau$ is in shift register 72, causing an output signal on line 184 from AND gate 86 (FIG. 3*d*), which fully conditions AND gate 182 to switch function-delay flip-flop 180*a* to its ONE state. A signal is also applied to line 114 at this time, causing a compare operation to be performed. The resulting $\tau$ mismatch causes a signal on line 202′ which is applied through conditioned AND gate 516 (FIG. 3*d*) to condition AND gates 230 (FIG. 3*c*) to pass the address of the asterisk for the word "ate" into MAR. The mismatch signal on line 202′ is also applied to the ZERO-side input of compare flip-flop 178*b* to reset this flip-flop to its ZERO state. One half byte time later, the address in MAR is incremented in the standard fashion, bringing the address of the backward length tag for the word "ate" into MAR, and AND gates 284 (FIG. 3*f*) are conditioned to pass the contents of this address, the backward length tag, into scan register 110. At this time, AND gate 440 (FIG. 3*e*) is also fully conditioned to cause flip-flop 662 (FIG. 3*c*) to be switched to its ONE state and flip-flop 664 to be switched to its ZERO state.

Before describing the sequence of operations which follow, reference should again be made to FIG. 5. From this figure, it is seen that when a verb which takes a complement is located, a search right is initiated to find the verbal complement of this verb. Since, at a later time, it is necessary to refer back to the verb, it is also necessary that the address of the asterisk for the verb be stored at this time. The following sequence of operations perform these two functions.

At the next byte time, shift register 72 contains the $\epsilon_M$ instruction. In response to the combined occurrence of this instruction in shift register 72 and a timing pulse on line 426, detector AND gate 83 (FIG. 3*a*) generates an output signal on line 144, which signal is applied through OR gate 332 (FIG. 3*b*) to line 334 and as one input to AND gate 146. Since lines 700 and 702 have signals on them at this time, the signal on line 334 is applied through conditioned AND gate 338, line 640, OR gate 478, and line 638 to (a) OR gate 626 and line 634 switching add-subtract flip-flop 454 to its ZERO or subtract state and (b) OR gate 644 (FIG. 3*e*) and line 646 to condition AND gates 648. The signal on line 334 is also applied through short delay 339 to condition AND gates 288 (FIG. 3*f*) allowing the backward length tag stored in scan register 110 to be applied through lines 108, AND gates 288, OR gates 650, conditioned AND gates 648, OR gates 62 and lines 452 to true-complement circuit 56, where, since a signal is applied to line 458 by flip-flop 454, this quantity is complemented and applied through lines 58 to adder 54. This results in the backward length tag being substracted from the address in MAR applied to adder 54 through lines 52, the difference output on lines 136 being the address of the asterisk for the word "and." Since there is a signal on line 700 at this time, but no signal on line 694, exclusive OR gate 722 (FIG. 3*c*) generates an output signal on line 730, which fully conditions AND gate 146 to apply a conditioning signal through line 774 and short delay 775 to condition AND gates 148 to pass the new address on lines 136 through lines 776 to MSKR 104. As the first step in the operation, the address of the asterisk for the word "and" is thus stored in MSKR 104.

One-half byte time later, a timing pulse is applied to line 455, causing MAR to be updated in the standard manner to bring the address of the forward length tag for the verb "ate" into MAR, and the contents of this address, the forward length tag for the word "ate," is read into scan register 110. The signal on line 455 is also passed through conditioned AND gate 698, (FIG. 3*c*) and line 696 to pass (a) through OR gate 416 and line 670 to switch flip-flop 664 to its ONE state and (b) through OR gate 706 and line 704 to switch flip-flop 662 to its ZERO state. The index register is in this way set to its third state.

At the next byte time, the special character $\epsilon_A$ is stored in shift register 72. While the operation of this special character has been described in detail previously, a brief description of its operation will be included again here to illustrate that, depending on the state in which the index register is in, this instruction may cause either an add or a subtract operation to be performed. However, whether an add or a subtract operation is performed, when an $\epsilon_A$ character is in shift register 72, the results of the operation are always stored in AIR 102. In this case, since there are signals on line 692 and 694, AND gate 336 (FIG. 3*b*) is conditioned, generating an output signal on line 643 which is applied through OR gates 488 and 632 to switch add-subtract flip-flop 454 to its ONE or add state. The forward length tag stored in scan register 110 is therefore added to the contents of MAR in adder 54 and the resulting address, the address of the asterisk for the word "lunch" is stored in AIR 102. As will be seen presently, this operation prepares the circuit to start the search-right operation for the verbal complement.

The next significant operation occurs one byte time later when a $\delta_M$ instruction is detected in shift register 72. AND gate 82 (FIG. 3*a*) operates in response to the combined occurrence of the $\delta_M$ character in shift register 72 and a timing pulse on line 426 to generate an output signal on line 138, which signal is applied to switch $\delta_M$ flip-flop 326 to its ONE state. The resulting output signal on line 460 is applied through conditioned AND gate 464 (FIG. 3*b*) line 672, OR gate 674, and line 796, to conditioned AND gates 140 (FIG. 3*c*) to apply the address stored in MSKR 104, the address of the asterisk for the word "and," through lines 844 control gates 48 and lines 50 to MAR 46. The signal on line 460 is also applied through OR gate 468 (FIG. 3*b*), line 762, and conditioned AND gate 552 to line 760. The signal on line 760 is passed through OR gate 754 (FIG. 3*f*) to line 756. It will be remembered that the line 756 conditions AND gates 746 and is passed through OR gate 738 and line 758 to condition AND gates 270. The combined conditioning of AND gates 270 and 746 causes the character stored at the address indicated in MAR 46 to be read out from memory 40 onto lines 282. Finally, the signal on line 460 is applied through conditioned AND gate 472 (FIG. 3*e*), line 858, and OR gate 406 to line 860 to condition AND gates 284 (FIG. 3*f*) to pass the character on lines 282 through lines 286 to scan register 110.

At the next half-byte time, AND gate 453 (FIG. 3*h*), is fully conditioned (i.e. even though flip-flop 819 is in its ONE state, there is a signal on line 556) to pass the timing pulse on line 428 to line 455, thereby causing MAR to be incremented one position. At this same time, AND gate 462 (FIG. 3*a*) is fully conditioned, causing an output signal on line 718 which is passed through OR gate 673 (FIG. 3*b*) and line 671, to set flip-flop 662 (FIG. 3*c*) to its ONE state, and flip-flop 664 to its ZERO state in a manner previously described.

At the next byte time, the backward length tag for the word "and" has been read into scan register 110. The signal on line 426 at this time is passed through conditioned AND gate 330 (FIG. 3*a*) and line 445 to reset $\delta_M$ flip-flop 326 to its ZERO state. At this time, shift register 72 contains the $\gamma$ character. AND gate 91 (FIG. 3*g*) therefore generates an output signal on line 376 to prevent inverter 378 from applying a conditioning signal through line 380 to AND gate 322 (FIG. 3*h*). The circuit is therefore not conditioned to copy the contents of shift register 72 into memory 10.

One half byte time later, a signal is applied by line 428 through conditioned AND gate 453 (FIG. 3*h*) to again increment the address in MAR one position and, since there are conditioning signals on lines 700 and 702, AND gate 698 (FIG. 3*c*) is fully conditioned to generate an output signal on line 696, which sets flip-flop 662 to its ZERO state and flip-flop 664 to its ONE state. The signal on line 696 is also applied to gate the forward length tag for the word "and" stored at the address indicated in MAR into scan register 110.

At the next byte time, the special character $\epsilon_M$ is again in shift register 72. As has been previously indicated, when flip-flop 662 is in its ZERO state and flip-flop 664 is in its ONE state, add-subtract flip-flop 454 is in its ONE state, causing true-complement circuit 56 to operate in its add mode. The $\epsilon_M$ instruction in shift register 72 at this time, therefore causes the forward length tag in scan register 110 to be added to the address in MAR in adder 54 and the result of this addition to be stored in MSKR 104. The result of this addition is the address of the asterisk for the verb "ate." This operation has therefore caused the address of the verb to be stored in MSKR. Therefore, both of the operations which were initially set out to be performed, have been performed.

During the next three byte times, the $\rho_3$ prefix is stored in the last address of prefix region 42 and the $\alpha_1$ character is stored in the next-to-the-last address of this region in a previously described manner. The circuit is now ready to begin its search for the verbal complement of the verb "ate."

*Is word a verbal complement:*

Since a $\rho_3$ prefix is stored in the last address of prefix region 42, only an entry starting with this prefix may be matched on. Referring to the chart of FIG. 6, it is seen that entries 6, 7 and 8 all start with a $\rho_3$ prefix. While only these three entries are shown in FIG. 6, there are actually five entries which start with the $\rho_3$ prefix, the entry for recognizing the end of a sentence and the entry recognizing a predicative verb having been omitted from the chart. These entries would be very similar in form to entry 7 used to recognize a subordinate conjunction and it is felt that their inclusion would not contribute to an understanding of the circuit. Since entry 6, the entry for recognizing the verbal complement, is the most significant of the three entries 6–8 of FIG. 6, this is the one which is found first during a search operation.

Assume that a track search and an entry search have made, that the $\alpha_1\alpha_2$ characters for entry 6 have been passed through shift register 72, and that a match has been had on the $\rho_3$ prefix and the $\alpha_1$ character in a manner previously described. It will be remembered that the detection of the $\alpha_1$ character in shift register 72 causes $\rho$ flip-flop 606 to be reset to its ZERO state and causes the address of the asterisk for the word "lunch" to be read from AIR 102 into MAR 46. It will be further remembered that this operation causes AND gate 453 to be deconditioned during the next half-byte time so that at the next byte time, the address of the asterisk is still in MAR 46 and the asterisk itself has been read into scan register 110. Finally, it will be remembered that the detection of the $\alpha_1$ character causes flip-flop 454 (FIG. 3*b*) to be switched to its ONE state, thereby putting true-complement circuit 56 in its add mode. The circuit then matches on the asterisk in a manner previously described and, during the next two byte times, the backward and forward length tags for the word "lunch" are masked over by $\nu$ characters. A half-byte time after the masking over of the forward length tag, MAR is again incremented to bring the address of the part of speech code for the word "lunch" into MAR 46 and to cause this character, the $C_v$ character representing a verbal complement, to be read into scan register 110. While it is recognized that the word "lunch" may have other parts of speech codes besides the verbal complement, this problem is avoided at this point by assuming that the $C_v$ code is the first of these possible codes. The problem is met and solved later in this section. At the next byte time a compare-condition signal is applied to line 114, causing a comparison to be performed in compare circuits 290*a*–290*f*. This comparison being successful, the circuit remains in its compare state.

One byte time later, the special character $\tau$ is stored in shift register 72. The detection of this character by AND gate 86 (FIG. 3*d*) causes a previously described sequence of operations to occur, which results in function-delay flip-flop 180*a* being in its ONE state, in compare flip-flop 178*b* being reset to its ZERO state, and in the address in AIR, the address of the asterisk for the word "lunch," being applied to MAR 46. One-half byte time later, a signal is applied to line 455, causing the address in MAR to be incremented one position to bring the backward length tag for the word "lunch" into scan register 110, and to cause AND gate 440 (FIG. 3*e*) to be fully conditioned to generate an output signal on line 676 which is applied in a manner previously described to set flip-flop 662 (FIG. 3*c*) to its ONE state and flip-flop 664 to its ZERO state, thereby setting the index register to its second state.

Referring back to FIG. 5, it is seen that when a verbal complement is found for a verb, both the verb and the complement are modified to indicate the linkage and a search is then initiated, starting from the verb to the left, to find the next verb in the sentence. The instructions following the $\tau$ character in entry 6 perform these three functions.

At the next byte time, shift register 72 contains the $\delta_P$ instruction. A backward length tag is in scan register 110 at this time, but this is not used. The presence of a $\delta_P$ instruction in shift register 72 causes $\delta_P$ detector AND gate 85 (FIG. 3*d*) to generate an output signal on line 162 which is applied to switch $\delta_P$ flip-flop 352 to its ONE state. One-half byte time later, MAR is updated to bring the address of the forward length tag into MAR 46. At the next byte time, the numeral 4 is stored in shift register 72. Since $\delta_P$ flip-flop 352 is still in its ONE state at this time, a signal is applied through line 486 and OR gate 488 (FIG. 3*b*) to line 642. The signal on line 642 is applied through OR gate 632 and line 636 to switch add-subtract flip-flop 454 to its ONE or add state (this occurring as soon as flip-flop 352 switches to its ONE state) and is also applied through OR gate 644 (FIG. 3*e*) and line 646 to condition AND gates 648. There being no signal on line 334 at this time, inverter 340 (FIG. 3*i*) applies a conditioning signal through line 342 to AND gates 292. This allows the numeric character 4 to be applied through AND gates 292, lines 656, OR gates 650, lines 652, conditioned AND gates 648, lines 658, OR gates 62, and lines 452 to true-complement circuit 56. Since the true-complement circuit is in its add mode at this time, the numeric character 4 is applied through lines 58 to one input of adder 54, the other input being the forward length tag address in MAR 46 which is applied through lines 52. The resulting address, an address four positions advanced from the forward length tag is applied to lines 136. This is the address to which a modifying character is to be applied to indicate that a match has been had between this verbal complement and a verb.

The signal on line 426 at this time is applied through AND gate 431 (FIG. 3*a*) which is conditioned at this time by an output signal on line 490 from OR gate 480, and line 492 to switch $\delta_S$ flip-flop 494 to its ONE state. The switching of $\delta_S$ flip-flop 494 to its ONE state fully conditions AND gate 504 to generate an output signal on line 830, which signal is applied through OR gate 824, line 822, OR gate 818 (FIG. 3*c*), and line 820 to conditioned AND gates 802 (FIG. 3*f*) to apply the address information on lines 136 through lines 848, control gates 48 and lines 50 to MAR 46. Since $\delta_S$ flip-flop 494 is in its ONE state at this time, there is no signal on its ZERO side output line 508 deconditioning AND gate 322 (FIG. 3*h*) so as to prevent the writing of information into memory 10 during this byte time. Finally, the signal on line 426 is applied through conditioned AND gate 358 (FIG. 3*d*) and line 449 to switch $\delta_P$ flip-flop 352 to its ZERO state.

At the next half-byte time, $\delta_S$ flip-flop 494 is still in its ONE state, thereby preventing a signal from appearing on line 508. AND gate 453 (FIG. 3*h*) is therefore deconditioned to prevent an incrementing signal from being applied to AND gates 220 (FIG. 3*f*) and 450 (FIG. 3*b*). The desired address therefore remains in MAR 46.

At the next byte time, the modifying character M is stored in shift register 72. At this time, AND gate 433 (FIG. 3*a*) is conditioned to pass the timing pulse on line 426 to line 502 to reset $\delta_S$ flip-flop 494 to its ZERO state. A signal is therefore reapplied to line 508 reconditioning AND gate 322 (FIG. 3*h*). The signal on line 426 is delayed slightly in delay 427 in order to give flip-flop 494 a chance to reset and is then applied through fully conditioned AND gate 322 to line 736. The signal on line 736 is applied to conditioned AND gates 294 (FIG. 3*f*) and is applied through OR gate 738 and line 758 to conditioned AND gates 270. This results in the character M being read into memory 10 at the address position indicated in MAR, the address position four positions ahead of the forward length tag for the word "lunch." The word "lunch" is in this way modified, to indicate that the desired match has been made.

It will be remembered that the address of the asterisk of the verb "ate" is stored MSKR 104. At the next byte time the $\delta_M$ instruction is stored in shift register 72. The detection of the $\delta_M$ character in shift registers 72 by AND gate 82 (FIG. 3*a*) causes $\delta_M$ flip-flop 326 to be switched to its ONE state. As was indicated previously, the switching of $\delta_M$ flip-flop 326 to its ONE state results in the address in MSKR 104 being transferred through conditioned AND gates 140 (FIG. 3*c*) to MAR 46 and in the contents of this address being read into scan register 110. Since function flip-flop 180*b* is in its ONE state at this time, AND gate 453 (FIG. 3*h*) is conditioned one-half byte time later to pass the timing pulse on line 428 causing MAR 46 to be incremented one address. This brings the address of the backward length tag for the word "ate" into MAR 46 and causes this character to be stored in scan register 110. The timing pulse on line 455 at this half byte time is also applied through conditioned AND gate 462 (FIG. 3*a*) and line 718 to cause index register flip-flops 662 (FIG. 3*c*) and 664 to be set with flip-flop 662 in its ONE state and flip-flop 664 in its ZERO state. At the next byte time, shift register 72 contains the $\epsilon_A$ instruction. The circuit operates in response to this instruction in a manner previously described to calculate the address of the asterisk for the word "and" and to store this address in AIR 102. This conditions the circuit for the search left operation for a verb which is to follow.

During the next three byte times, a modifying character M is read into the fourth byte position following the forward length tag of the verb "ate." This is done in the same manner as was used to read the modifying character into the corresponding position in the verbal complement "lunch," the only difference being that, since the $\delta_P$ instruction now occurs when the address of the forward length tag is in MAR 46, the $\epsilon_A$ instruction having been performed during the time period when the address of the backward length tag of the word "ate" was in MAR 46, only three addresses are jumped over rather than four as was indicated previously. After the modifying character M has been read into, the proper position in the word "ate," the $\rho_2$ prefix character and the $\alpha_1$ character are read into prefix region 42 of memory 10 during the next three byte times in a manner previously described.

Referring back to entries 3, 4 and 5, it is seen that restoring of the $\rho_2$ prefix character in prefix region 42 causes a search for a verb which takes a complement to be re-initiated. Referring to the flow diagram of FIG. 5, it is seen that this is exactly what is desired after the verb and verbal complement have been modified to indicate the linkage. A search-left operation is therefore initiated to find the next verb which is the verb "went." When the verb went and its verbal complement "home" have both been modified, a search left is again initiated to find another verb. Since there are no further verbs in the sentence, the next match will occur on entry 4 when the beginning of the sentence is reached. The matching on this entry causes some instructions to be performed, the instruction depending on what the next lexical step is to be, and a prefix $\rho_n$ to be stored in prefix region 42, this prefix being the prefix for the first operation of the next step.

*Matching on subordinate conjunction:*

If instead of operating on the sentence "he went home and ate lunch." the sentence had instead been "he said that he went home." then, during the search-right operation to find a verbal complement after finding the verb "said," the subordinate conjunction "that" would have been found rather than a verbal complement. A match would therefore have been on entry 7 in the table of FIG. 6, rather than on entry 6. Referring simultaneously to FIG. 5 and to the function of entry 7 in FIG. 6, it is seen that the first step to be performed is to go back to the verb, this being performed by the $\delta_M$ instruction. The $\epsilon_A$ instruction following the $\delta_M$ instruction then causes the address for the asterisk for the next word to the left to be computed and stored in AIR 102, this being a manner of causing a search-left operation to be started. Finally a $\rho_4$ prefix is stored in the last address of prefix region 42, the $\rho_4$ prefix being the prefix for performing operations 10, 11, 12, 13 and 14, shown in FIG. 5.

*Part of speech problem:*

In the example described above, all of the instruction characters have appeared in the function portion of the table entries. However, instruction characters are also used in the argument of a table entry. It will be remembered that when a match was had on the verbal complement "lunch," it was assumed that the part-of-speech code for the verbal complement was the first of the possible part-of-speech codes for this word, thus avoiding solving the problem of matching on the proper part-of-speech code. One way of solving the part-of-speech problem is to provide a separate byte position in which a part-of-speech code, or a group of part-of-speech codes are inserted, if, in fact, the word is or may be the part-of-speech for the byte position. When searching, byte positions in which undesired part-of-speech codes are stored are masked over. One way of masking over byte positions has been described above; namely, using one or more $\nu$ instructions. Another way of masking over characters, and the one which is employed where several bytes are to be masked over, is to use a $\delta_P$ instruction followed by the number of bytes to be skipped. Therefore, assuming that the verbal complement code was the third of the possible part-of-speech codes for the word "lunch," the argument portion of instruction 6, FIG. 6, would appear as follows:

$$\alpha_1\ \alpha_2\ \rho_3\ \alpha_1\ *\ \delta_P\ 4C_v\ \tau$$

In operation, the circuit would proceed to match on the $\alpha_1\ \alpha_2\ \rho_3\ \alpha_1$ and * characters in the same manner as that previously described. As indicated previously, the detection of the $\delta_P$ character in shift register 72 at byte time causes flip-flop 352 to be switched to its ONE state. This switches add-subtract flip-flop 454 to its ONE or add state and conditions AND gates 431 (FIG. 3*a*) and 648 (FIG. 3*f*) so that during the next byte time, $\delta_S$ flip-flop 494 is switched to its ONE state and the numeral stored in shift register 72 is applied to true-complement circuit 56 to be added to the existing address in MAR and the new address, the address in which the $C_v$ code is, if it is present, is computed and inserted in MAR 46. $\delta_S$ flip-flop 494 being in its ONE state, prevents MAR from being incremented during the next half-byte time and during the next byte time, the desired comparison is performed. After matching of the $C_v$ character, the circuit proceeds in the same manner as indicated in the previous example.

*Use of the $\delta_N$ instruction:*

The examples described above utilize all but two of the instructions which the circuit is capable of performing. The first instruction not illustrated is the $\delta_N$ instruction. This instruction is identical to the $\delta_P$ instruction except that the number following it is subtracted from the address in MAR rather than added to it. As an example of where this instruction would be used, assume that a character 3 positions advanced from a forward length tag is modified and it is then desired to go back to the backward length tag for the same word. To accomplish this function, the modificating character is followed by a $\delta_N$ character and the number 6.

During the half-byte time after the modifying character is read into memory 10, MAR is updated to the address four positions advanced from the forward length tag, and 5 positions advanced from the backward length tag, the address which it is desired to back to. At the next byte time, shift register 72 contains the $\delta_N$ instruction. This is detected by AND gate 84 (FIG. 3*a*) causing an output signal on line 158 which switches $\delta_N$ flip-flop 344 to its ONE state. During the next half-byte time, MAR is again incremented so that it now contains the address 6 positions advanced from the backward length tag.

At the next byte time, the timing pulse on line 426 is applied through conditioned AND gate 431 (FIG. 3*a*) and line 492 to switch $\delta_S$ flip-flop 494 to its ONE state. The signal on line 476 from the ONE side of $\delta_N$ flip-flop 344 is applied through OR gate 478 (FIG. 3*b*) to line 638. The signal on line 638 is applied through OR gate 626 and line 634 to switch add-subtract flip-flop 454 to its ZERO or subtract state. The signal on line 638 is also applied through OR gate 644 (FIG. 3*e*) and line 646 to condition AND gates 648. Since there is no signal on line 334 at this time, inverter 340 (FIG. 3*i*) applies a conditioning signal through line 342 to AND gates 292 (FIG. 3*f*). This allows the numeral 6 stored in shift register 72 to be applied through lines 76, conditioned AND gates 292, lines 656, OR gates 650, lines 652, conditioned AND gates 648, lines 658, OR gates 62, and lines 452 to true-complement circuit 56. Since true-complement circuit 56 is in its subtract mode at this time, the complemented version of this number is applied through lines 58 to adder 54. This results in the number 6 being subtracted from the address in MAR 46 and the result of this subtraction being applied to lines 136. The output from the ONE side of $\delta_S$ flip-flop 494 (FIG. 3*a*) is applied through conditioned AND gate 504 and OR gate 824, line 822, OR gate 818 (FIG. 3*c*) and line 820 to condition AND gate 802 (FIG. 3*f*) to pass the signals on lines 136 through lines 848, control gates 48 and lines 50 to MAR 46. The desired addresses in this way are stored in MAR 46.

*Final readout operation:*

The second operation which is not illustrated by the previous examples, is the final readout of the translated language. Assume now that all of the desired operations on the words stored in memory 10 have been performed and that the desired modifying characters have been applied to the words where indicated. The final step is to go through the sentence stored in memory 10, matching on each of the words in their modified form in total, perform any word re-ordering or other operations required, and read out the translated version of the words in the proper order.

A table entry for this final pass has the following form:

$$\alpha_1\alpha_2\rho_Z\alpha_1{}^*\nu\nu P_S aaamam\tau(\text{instruction})\tau_E ffff\mu\rho_Z\alpha_1\alpha_2$$

Where: $\rho_Z$ is the prefix character for the final step. $P_S$ represents the part of speech (this would be V if it was a verb or $C_v$ if it was a verbal complement etc.). The small *a*'s are unmodified argument characters, the small *m*'s, modified argument characters, and the small *f*'s are the characters of the translated version of the matched-on word.

The final entry to be matched-on during the final pass has the following form:

$$\alpha_1\alpha_2\rho_Z\alpha_1{}^*\upsilon\upsilon P_t\tau\tau_E\phi\alpha_1\alpha_2$$

Where $P_t$ is the end of sentence character previously mentioned, $\phi$ is the terminal punctuation, and all the other characters have the same significance as above. It should be noted that the $\tau\tau_E$ combination in sequence is used to indicate that the end of the sentence has been reached.

Assume now that all of the processing steps have been performed on the sentence stored in memory 10 and that the address in MAR has been stepped back to the beginning of the sentence. Assume further that the $\rho_Z$ prefix is now stored in prefix region 42, that a match has been made on one of the words in memory 10, and that the special character $\tau$ is now in shift register 72. It will be remembered that the presence of this character in shift register 72 causes function-delay flip-flop 180*a* to be switched to its ONE state and causes the address in AIR to be read into MAR. At the next half byte time, MAR is incremented by 1 and at the next byte time, some instruction is performed. If, for example, a word re-orientation were to be performed, the word having been matched on to be inserted after the word following it, suitable instructions would appear at this position to implement this operation. In any event, the $\tau$ and $\tau_E$ characters would be separated by at least a $\gamma$ character so as to prevent the $\tau\tau_E$ character combination from occurring. It will be seen that when the $\tau\tau_E$ character combination does occur, this is interpreted as being the end of a sentence.

One byte time after the last instruction has been performed, the character $\tau_E$ is in the shift register 72. The detection of this character by AND gate 80 (FIG. 3*a*) causes an output signal on line 124 which signal is applied through conditioned AND gate 306 (FIG. 3*d*) and line 558, to switch readout flip-flop 560 to its ONE state. The signal on ONE-side output line 562 from readout flip-flop 560 is applied through AND gate 314 (FIG. 3*b*), which AND gate is conditioned at this time by a delayed signal from output line 124 of AND gate 80, and through line 816 to conditioned AND gates 814 (FIG. 3*c*) to apply the contents of PLR register 806 through lines 850, control gates 48 and lines 50 to MAR 46. PLR 806 at this time, contains the address in memory 10 where the normal region 40 ends and the output region 41 begins. This permits part of memory 10 to be used as an output register. It should be noted that the presence of a signal on line 124 at this time prevents inverter 316 (FIG. 3*a*) from generating an output signal on line 318, thereby inhibiting AND gate 322 (FIG. 3*h*) from generating an output signal on line 736. The $\tau_E$ character stored in shift register 72 is therefore not read into memory 10.

A half byte time later, MAR 46 is incremented in the usual fashion to bring the first address of the output region into MAR 46. It will be seen later that if the word being operated upon is not the first word of the sentence, then the address in MAR at this time will be the first address following the last address in which information was stored during the previous readout operation.

At the next byte time, shift register 72 contains the first character (*f*) to be read into the output region of memory 10. AND gate 322 (FIG. 3*h*) is fully conditioned at this time [AND gate 580 (FIG. 3*b*) being fully conditioned to supply the necessary signal on line 734] to pass the delay timing pulse from line 426 through line 736 to condition AND gates 294 (FIG. 3*f*) and through an OR gate 738 and line 758 to condition AND gates 270. The character stored in shift register 72 is therefore written into memory 10 at the address indicated in MAR. At the next half byte time, MAR 46 is again incremented and during the next byte time, the next translated character (f) is read into memory 10 at the desired address.

This reading of information into successive addresses in the output region of memory 10, continues until the special character $\mu$ is shifted into shift register 72. The detection of this character by AND gate 90 (FIG. 3*g*) causes an output signal on line 212, which is applied through conditioned AND gate 374 and line 584 to switch $\mu$ flip-flop 586 to its ONE state. The removal of the signal from line 596, the ZERO-side output line from $\mu$ flip-flop 586, deconditions AND gate 580 (FIG. 3*b*), thereby removing a signal from line 734 which deconditions AND gate 322 (FIG. 3*h*), preventing the character $\mu$ from being read into memory 10. Delay 427 prevents a signal from being applied to line 736 while $\mu$ flip-flop 586 is being set. The signal on ONE-side output line 588 from $\mu$ flip-flop 586 is also applied through OR gate 594 (FIG. 3*h*) and line 810 to fully condition AND gate 538. The resulting output signal on line 808 is applied to condition AND gates 800 to cause the information on lines 136 to be applied through AND gates 800 and lines 804 to PLR 806. Since time-complement circuit is applying no input to adder 54 at this time, the only input to the adder is the address in MAR on lines 52. This address will therefore be on lines 136. The address in the output region of memory 10 at which subsequent data is to be stored is in this way read into PLR 806. During the next two byte times, the $\rho_Z$ prefix and $\alpha_1$ character are read into the last two addresses of prefix region 42 in a manner previously described.

The last word to be matched on in the sentence is the end-of-sentence word. One byte time after the last character of this word has been matched on, the special character $\tau$ is in shift register 72. As before, the detection of this character in shift register 72 causes an output signal from AND gate 86 (FIG. 3*d*) on line 184 which is applied through conditioned AND gate 182 and line 524 to switch function-delay flip-flop 180*a* to its ONE state. One byte time later, the $\tau_E$ character has been shifted into shift register 72. The resulting output signal from AND gate 80 (FIG. 3*a*) on line 124 is applied through conditioned AND gate 306 (FIG. 3*d*) and line 558 to switch readout flip-flop 560 to its ONE state. The switching of flip-flop 560 to its ONE state causes an output signal to appear on ONE-side output line 562, which signal is applied through conditioned AND gate 314 (FIG. 3*b*) to line 816. The signal on line 816 conditions AND gates 814 (FIG. 3*c*) to apply the address in PLR 806 through lines 850, control gates 48, and lines 50 to MAR 46. Since function-delay flip-flop 180*a* is still in its ONE state at this time, AND gate 532 (FIG. 3*g*) is conditioned to pass the signal on line 562 through line 564 to switch $\phi$ flip-flop 398 to its ONE state.

During the next byte time, the terminal punctuation character $\phi$ is in shift register 72. AND gate 322 (FIG. 3*h*) being fully conditioned at this time, this character is read into the output region of memory 10 at the address indicated in MAR 46.

One byte time later, the character $\alpha_1$ is in shift register 72. The resulting output signal on line 168 is applied through conditioned AND gate 410 (FIG. 3*g*) and short delay 572 to switch $\alpha_1$ flip-flop 443 to its ONE state. The resulting output signal on line 574 is applied through OR gate 594 (FIG. 3*h*) and line 810 to fully condition AND gate 538 to apply an output signal through line 808 to condition AND gates 800 to store the address in MAR 46 in PLR 806 in a manner previously described. One byte timer later, when the character $\alpha_2$ is in shift register 72, a timing pulse is applied through line 426 to conditioned AND gate 439 (FIG. 3*d*), causing an output signal on line 576 which switches function flip-flop 180*b* to its ZERO state. The resulting output signal on line 510 is applied as a third conditioning input to AND gate 438 (FIG. 3*h*). One byte time later, the timing pulse on line 426 is applied through fully conditioned AND gate 438 to line 568, to cause the circuit to enter its output state. The timing pulse on line 426 is also applied through conditioned AND gate 432 (FIG. 3*g*) and line 567 to reset $\phi$ flip-flop 398 and readout flip-flop 560 to their ZERO state. When the circuit is in its output state, the contents of output region 41 of memory 10 are read into some sort of output device.

While the invention has been particularly shown and described with reference to a preferred embodiment thereof, it will be understood by those skilled in the art that various changes in form and detail may be made therein without departing from the spirit and scope of the invention.

What is claimed is:

1. A device for manipulating coded units of data comprising:
addressable means for storing said coded data units;
means for requesting and utilizing selected ones of said data units;
means for storing the address in said addressable means of the data being utilized by said utilizing means;
means operable in response to an instruction from said utilizing means for utilizing the address in said address storing means to calculate the address in said addressable means of the beginning of a selected data unit;
and means operable when said selected data unit is required for applying said calculated address to said address storing means.

2. A device for manipulating coded units of data comprising:
means for applying length tags to said coded data units;
addressable means for storing said coded data units including said length tags;
means for requesting and utilizing selected ones of said data units;
means for storing the address in said storing means of the data being utilized by said utilizing means;
means operable in response to an instruction from said utilizing means for calculating from said length tags and the address in said address storing means the address in said addressable storing means of the beginning of a selected data unit;
and means operable when said selected data unit is required for applying said calculated address to said address storing means.

3. A device for manipulating coded units of data comprising:
means for applying length tags to said coded data units;
addressable means for storing said coded data units including said length tags;
means for utilizing selected ones of said data units, said utilizing means being operative to supply control instructions to said device;

first register means for storing the address in said storing means of the data being utilized by said utilizing means;

second register means for storing the address in said addressable storing means of the beginning of the next data unit to normally be utilized;

means responsive to an instruction from said utilizing means for calculating from the address in said first register means and a length tag for the data unit being utilized the address of the beginning of the next data unit to normally be utilized and for storing this address in said second register means;

and means responsive to another instruction from said utilizing means for applying the address in said second register means to said first register means.

4. A device of the type described in claim 3 including:

third register means;

means including in part said address calculating means operable in response to an instruction from said utilizing means for calculating from the address in said first register means and a length tag for the data being utilized the address of the beginning of an adjacent data unit and for storing this address in said third register means;

and means responsive to an instruction from said utilizing means for applying the address in said register means to said first register means.

5. A device for manipulating coded units of data comprising:

means for applying a backward length tag and a forward length tag to each coded data unit;

addressable means for storing said coded data units including said length tags;

an address register for storing the address of the data being accessed in said addressable storing means;

index means for giving a first indication when the address of a backward length tag is in said address register and giving a different indication when the address of a forward length tag is in said address register;

means for applying a compute instruction to said device;

means responsive to said compute instruction and said first indication from said index means for computing the address of the beginning of the preceding data unit by subtracting the backward length tag at the address indicated by the address register from the address in the address register, and responsive to said compute instruction and said different indication from said index means for computing the address of the beginning of the succeeding data unit by adding the forward length tag at the address in the address register to the address in the address register;

means for applying a store instruction to said device;

and means responsive to said store instruction for applying said computed address to said address register.

6. A device for manipulating coded units of data comprising:

means for applying a backward length tag and a forward length tag to each coded data unit;

addressable means for storing said coded data units including said length tags;

an address register for storing the address of the data being accessed in said addressable storing means;

index means for giving a first indication when the address of a backward length tag is in said address register and giving a different indication when the address of a forward length tag is in said address register;

means for storing the address of the beginning of the next data unit to normally be accessed;

means for applying a first compute instruction to said device;

means responsive to said compute instruction and said first indication from said index means for subtracting the backward length tag at the address indicated by the address register from the address in the address register and responsive to said compute instruction and said different indication from said index means for adding the forward length tag at the address indicated by the address register to the address in the address register and for storing the resulting address of either computation in said beginning address storing means;

means for applying store instructions to said device;

and means responsive to said store instructions for applying the address stored in said beginning address storing means to said address register.

7. A device of the type described in claim 6 including:

second beginning address storing means;

means for applying a second compute instruction to said device;

means, including in part, said compute instruction responsive means, responsive to said second compute instruction and said first indication from said index means for subtracting the backward length tag at the address indicated by the address register from the address in the address register, responsive to said second compute instruction and said different indication from said index means for adding the forward length tag at the address indicated by the address register to the address in the address register and for storing the resulting address of either computation in said second beginning address store means;

means for applying a second store instruction to said device;

and means responsive to said second store instruction for applying the address stored in said second beginning address storing means to said address register.

8. A device for manipulating coded units of data comprising:

means for applying a backward length tag followed by a forward length tag to each coded data unit;

addressable means for storing said coded data units including said length tags;

an address register for storing the address of the data being accessed in said addressable storing means;

an index means for giving a first indication when the address of a backward length tag is in said address register and giving a different indication when the address of a forward length tag is in said address register;

an adder, one input to which is the address in said address register;

means for applying the other input to said adder, said means including means responsive to said first indication from said index means for causing the complement of the second input to be applied to said adder and responsive to said different indication from said index means for causing the second input to be applied to said adder in uncomplemented form;

means for applying a compute instruction to said device;

means responsive to said compute instruction for applying the contents of the address indicated by said address register to said other input applying means;

whereby if the contents of said address is a backward length tag, it is subtracted from the address stored in said address register in said adder and, if the contents of said address is a forward length tag, it is added to the address stored in said address register;

means for applying a store instruction to said device;

and means responsive to said store instruction for applying the address computed by said adder to said address register.

9. A device for manipulating coded units of data comprising:

means for applying a backward length tag followed by a forward length tag to each coded data unit;

addressable means for storing said coded data units including said length tags;
an address register for storing the address of the data being accessed in said addressable storing means;
an index means for giving a first indication when the address of a backward length tag is in said address register and giving a different indication when the address of a forward length tag is in said address register;
an adder, one input to which is the address in said address register;
means for applying the other input to said adder, said means including means responsive to said first indication from said index means for causing the complement of the second input to be applied to said adder and responsive to said different indication from said index means for causing the second input to be applied to said adder in uncomplemented form;
means for storing the address of the beginning of another data unit;
means for applying a compute instruction to said device;
means responsive to said compute instruction for applying the contents of the address indicated by said address register to said other input applying means and for storing the resulting output from said adder in said beginning address storing means;
whereby if the contents of said address is a backward length tag, it is subtracted from the address stored in said address register in said adder and, if the contents of said address is a forward length tag, it is added to the address stored in said address register and the new address computed by either of the above operations is stored in said beginning address storing means;
means for applying a store instruction to said device;
and means responsive to said store instruction for applying the address stored in said beginning address storing means to said address register.

10. A device of the type described in claim 9 including:
second beginning address storing means;
means for applying a second compute instruction to said device;
means, including in part said compute instruction responsive means, responsive to said second compute instruction for applying the contents of the address indicated by said address register to said other input applying means and for storing the resulting output from said adder in said second beginning address store means;
means for applying a second store instruction to said device;
and means responsive to said second store instruction for applying the address stored in said second beginning address storing means to said address register.

11. A device for determining the characteristics of a coded data unit and for performing certain operations as a result of the determination comprising:
addressable means for storing said coded data unit;
an address register for storing the address being accessed in said addressable storing means;
table means for storing coded characters representing the particular characteristics sought followed by instruction characters for the operations to be performed;
means for comparing data at the address indicated by said address register with a coded character from said table means;
means for normally incrementing the address in said address register;
and means responsive to a match being detected between a complete set of coded characaters in said table means and all or part of a data unit for causing the operations indicated by the instruction characters following the matched coded characters to be performed.

12. A device for determining the particular characteristics of a sequence of coded data units and for performing certain operations as a result of the determination comprising:
addressable means for storing said coded data units;
an address register for storing the address being accessed in said addressable storing means;
table means for storing sets of coded characters representing the particular characteristics sought, said sets of coded characters being divided into subsets having instruction characters interpersed between them and being followed by instruction characters for the operations to be performed;
means for comparing data at the address indicated by said address register with a coded character from said table means;
means for normally incrementing the address in said address register;
means responsive to a match being detected between a subset of coded characters which are followed bv one or more instruction characters and all or part of a data unit for causing the address of a new data unit to be applied to said address register under control of the instruction characters following said subset;
and means responsive to a match being detected between the last subset of a set of coded characters and all or part of a data unit for causing the operations indicated by the instruction characters following the matched set of coded characters to be performed.

13. A device for determining whether a coded data unit has various characteristics and for performing certain operations in response to each of said determinations comprising:
an addressable storage means having a normal region in which said data unit is stored and a prefix region in which a prefix character specifying the determination being made is stored;
an address register for storing the address in said addressable storage means being accessed;
table means for storing coded characters representing the particular characteristics sought, each set of said coded characters being preceded by a prefix character specifying the determination being made and followed by instruction characters for the operations to be performed;
means for comparing the contents of the address indicated by said address register with characters from said table means;
means for initially applying the address where said prefix character is stored to said address register;
means responsive to a mismatch between the prefix character in said addressable storage means and a prefix character in said table means for causing the prefix character for a new set of coded characters in said table means to be applied to said comparing means;
means for storing the address of the beginning of said coded data unit;
means responsive to a match prefix characters from said addressable storage means and said table means for causing the address in said beginning address storing means to be applied to said address register;
means operable in response to successive successful comparisons in said comparing means for successively incrementing the address in said address register;
and means responsive to a match being detected between a complete set of coded characters in said table means and all or part of a data unit for causing the operations indicated by the instruction characters following the matched coded characters to be performed.

14. A device for determining whether a coded data unit has a particular characteristic and for modifying said data unit in response to said determination comprising:

addressable means for storing said coded data unit;

an address register for storing the address being accessed in said addressable storing means;

table means for storing coded characters representing the particular characteristics sought followed by instruction characters for the operations to be performed and characters for the modify operation to be performed;

means for comparing data at the address indicated by said address register with a coded character from said table means;

means for normally incrementing the address in said address register;

means for storing the address of the beginning of said data unit;

means responsive to a match being detected between a complete set of coded characters in said table means and all or part of a data unit for causing the instruction characters following the matched set of coded characters to be accessed;

means responsive to an instruction character following the matched set of coded characters for causing the address where said data unit is to be modified to be read into said address register;

and means for applying a modifying character following said instruction character in said table means to said addressable storing means at the address indicated in said address register.

15. A device for determining whether a specified relationship exists between two coded data units stored in either adjacent or non-adjacent address positions in an addressable storing means and for modifying said data units in response to said determination comprising:

addressable means for storing said coded data unit;

an address register for storing the address being accessed in said addressable storing means;

table means for storing coded characters representing the particular characteristics sought followed by instruction characters for the operations to be performed;

means for comparing data at the address indicated by said address register with a coded character from said table means;

means for normally incrementing the address in said address register;

first means for storing the address of the beginning of the data unit being matched on;

means responsive to a match being detected between a complete set of coded characters in said table means and all or part of a data unit for causing the address in said beginning address storing means to be applied to said address register;

second means for storing the address of the beginning of a data unit;

means responsive to instruction characters following the matched set of coded characters for causing the address of the beginning of the matched data unit to be stored in said second storing means, for causing the address of the beginning of a new data unit to be stored in said first storing means, and for causing a search to begin at the address indicated in said first storing means for a second data unit bearing a desired relationship to the match-on data unit;

means responsive to a match being detected between a second complete set of coded characters in said table means and all or part of a second data unit for causing the address of the beginning of said second data unit to be applied to said address register;

means responsive to instruction characters following said second set of coded characters for causing the address where said second data unit is to be modified to be read into said address register and for applying a modifying character to said addressable storing means at the address indicated in said address register;

and means, including in part said last-mentioned means, for causing the address stored in said second storing means to be applied to said address register, for causing the address in said address register to be incremented to the address where the first data unit is to be modified, and for applying a modifying character to said addressable storing means at the address indicated in said address register.

16. A device of the type described in claim 15 wherein said data unit is a word and wherein the modifying characters applied to the words indicate a semantic or syntactic linkage between the words.

17. A device for processing information, which information is applied to the device as discrete units comprising:

first means for storing a modified form of said information units, said modified form including length tags;

second means for storing a table of entries, each of said entries having an argument and a function, said arguments being of a form to match in whole or in part various ones of said information units, and said functions including instruction characters;

means for comparing an information unit in said first storing means with an entry argument in said second storing means;

means responsive to a mismatch between said information unit and said entry argument for causing a new entry argument to be applied to said comparing means;

and means responsive to a match between whole or part of said information unit and said entry argument for causing a new information unit to be applied to said compare means, said last-mentioned means including an adder for computing the address in said first storing means of said new information unit by use of said length tags and under control of the instruction characters in the function of the matched-on entry argument.

18. A device of the type described in claim 17, including:

means responsive to a match between a unit of information and a table entry argument and to instruction characters in the function of the matched-on table entry for causing selected bits in said entry function to be read into selected addresses in said first storing means.

19. A device for performing a plurality of processing operations on coded discrete units of data comprising:

means for applying length tags to said data units;

first means for storing said coded data units, said data units including said length tags;

second means for storing a table of entries having arguments and functions, each of said arguments having a prefix character indicating which processing operation is being performed followed by units of data of a type to match, either in whole or in part, the coded data units in said first storing means, and said functions including instruction characters;

third means for storing the prefix character for the processing operation presently being performed;

means for comparing the contents of said third storage means with a table entry argument;

means responsive to a mismatch signal from said comparing means for causing a new entry argument to be applied to said comparitor;

first means responsive to a match between the contents of said third storage means and a portion of an entry argument for causing a selected data unit in said first storing means to be applied to said comparing means;

second means responsive to a match between the contents of said third storage means and a complete entry argument for changing the data unit which is applied to said comparing means when a match is detected by said first match responsive means;

and means responsive to a match between a complete entry argument and whole or part of a data unit in said first storing means for causing the operations indicated by the instructions in the function of the matched-on table entry to be performed and for storing a new prefix character in said third storing means.

20. A device for performing semantic and syntactic analysis on a sentence comprising:

addressable means for storing said sentence with coded characters representing additional information about the words of said sentence;

an address register for storing the address in said addressable storing means presently being accessed;

means for storing a table of entries having arguments and functions, each of said arguments having coded characters of a type to match, either in whole or in part, the words of said sentence, and each of said functions including instruction characters;

means for comparing characters of a table entry with the contents of the address indicated by said address register;

means for indicating that a proper table entry for the step in the analysis being performed is being applied to said comparing means;

means responsive to a mismatch in said compare means for causing a new table entry to be applied to said compare means;

first means for storing the address of the beginning of the word being analyzed;

second means for storing the address of the beginning of a word;

means responsive to a match between a complete entry argument and whole or part of a first word in said addressable storing means for causing the address of the beginning of the first word to be stored in said second beginning address storing means, for causing the address of the beginning of another word to be applied to said first beginning address storing means, and for causing a new step in the analysis to be initiated;

and means responsive to a match being detected between a second table entry argument and whole or part of a second word for causing modifying characters to be applied to said first and second words at predetermined address positions, thereby indicating that a desired relationship exists between the two words.

21. A device for performing semantic and syntactic analysis on a sentence comprising:

addressable means for storing said sentence with coded characters representing additional information about the words of said sentence;

an address register for storing the address in said addressable storing means presently being accessed;

means for storing a table of entries having arguments and functions, each of said arguments having a prefix character indicating what step in the analysis is being performed followed by coded characters of a type to match, either in whole or in part, the words of said sentence, and said functions including instruction characters;

means for storing the prefix character for the step in the analysis presently being performed in said addressable storing means;

means for comparing characters of a table entry with the contents of the address indicated by said address register;

means for applying the address of said prefix storing means to said address register at the beginning of each step in the analysis;

means responsive to a mismatch in said compare means for causing a new table entry to be applied to said compare means;

first means for storing the address of the beginning of the word being analyzed;

first means responsive to a match between the contents of said prefix storing means and a complete entry argument for causing the address of the beginning of a new word to be applied to said beginning address storing means;

second means responsive to a match between the contents of said prefix storing means and part of an entry argument for causing the address in said beginning address storing means to be applied to said address register;

second means for storing the address of the beginning of a word;

means responsive to a match between a complete entry argument and whole or part of a first word in said addressable storing means for causing the address of the beginning of the first word to be stored in said second beginning address storing means, for causing the address of the beginning of another word to be applied to said first beginning address storing means, and for causing a new prefix character to be applied to said prefix storing means;

and means responsive to a match being detected between a second table entry argument and whole or part of a second word for causing modifying characters to be applied to said first and second words at predetermined address positions, thereby indicating that a desired relationship exists between the two words.

22. A device for performing semantic and syntactic analysis on a sentence comprising:

means for applying length tags to the words of said sentence;

addressable means for storing said sentence with said length tags and with coded characters representing additional information about the words of said sentence;

an address register for storing the address in said addressable storing means presently being accessed;

means for storing a table of entries having arguments and functions, each of said arguments having a prefix character indicating what step in the analysis is being performed followed by coded characters of a type to match, either in whole or in part, the words of said sentence, and said functions including instruction characters;

means for storing the prefix character for the step in the analysis presently being performed in said addressable storing means;

means for comparing characters of a table entry with the contents of the address indicated by said address register;

means for applying the address of said prefix storing means to said address register at the beginning of each step in the analysis;

means responsive to a mismatch in said compare means for causing a new table entry to be applied to said compare means;

first means for storing the address of the beginning of the word being analyzed;

a calculator;

means responsive to an instruction character following a complete entry argument which matches the contents of said prefix storing means for causing said calculator to operate on the address stored in said address register and a length tag for the word being operated on to compute the address of the beginning of a new word and to cause the computed address to be applied to said first storing means;

means responsive to a match between the contents of said prefix storing means and part of an entry argument for causing the address in said first storing means to be applied to said address register;

second means for storing the address of the beginning of a word;

means including in part said beforementioned instruction responsive to instructions following a complete entry argument which matches in whole or part a first word in said addressable storing means for causing the address of the beginning of the first word to be stored in said second storing means, for causing said calculator to compute from the address in said address register and a length tag for said first word the address of the beginning of another word and for applying said computed address to said first storing means, and for causing a new prefix character to be applied to said prefix storing means;

and means responsive to instructions following a second table entry argument which matches in whole or part a second word for causing said calculator to compute address positions where modifying characters are to be applied to said first and second words and for causing modifying characters to be applied to said first and second words at said address positions, thereby indicating that a desired relationship exists between the two words.

23. A system for accessing desired data units stored in an addressable storing means comprising:

means for generating length tags for each data unit;

means for storing said length tags with said data units at address positions in said addressable storing means;

means for storing the address presently being accessed in said addressable storing means; and means for linearly combining a length tag for a given data unit with the address for the length tag stored in said address storing means to derive the address of the beginning of an adjacent data unit.

24. A system for performing semantic and syntactic analysis on a sentence comprising:

means for storing a table of entries having arguments of a form to match in whole or in part a word of the sentence if the word has particular characteristics and having functions containing instructions for the operations to be performed on the sentence if the word has the particular characteristic;

means for determining if the table entry is a proper one for the operation in the analysis being performed;

means for comparing the argument of the proper table entry with words of the sentence to determine which, if any, of the words have a desired characteristic;

means responsive to the finding of a first word having a desired characteristic for causing said above-mentioned two means to be utilized to find a second word bearing a predetermined relationship to the first word found;

and means for modifying the first and second words to indicate their relationship.

References Cited by the Examiner

UNITED STATES PATENTS

| | | | |
|---|---|---|---|
| 3,126,523 | 3/1964 | Rabenda et al. | 340—172.5 |
| 3,141,151 | 7/1964 | Gilson | 340—172.5 |
| 3,195,109 | 7/1965 | Behnke | 340—172.5 |

ROBERT C. BAILEY, *Primary Examiner.*

W. M. BECKER, P. L. BERGER, P. J. HENON, *Assistant Examiners.*

PO-1050
(5/69)

UNITED STATES PATENT OFFICE
CERTIFICATE OF CORRECTION

Patent No. 3,312,946 Dated April 4, 1967

Inventor(s) John L. Craft and Warren B. Strohm

It is certified that error appears in the above-identified patent and that said Letters Patent are hereby corrected as shown below:

IN THE CLAIMS:

Claim 4, line 26, after "said", insert --third--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents